United States Patent
Woods et al.

(10) Patent No.: US 8,117,564 B2
(45) Date of Patent: Feb. 14, 2012

(54) SYSTEMS AND METHODS FOR GENERATING A MEDIA GUIDANCE APPLICATION WITH MULTIPLE PERSPECTIVE VIEWS

(75) Inventors: Thomas Steven Woods, Arlington Heights, IL (US); Jason Conness, Los Angeles, CA (US); Christopher Bauder, Berlin (DE)

(73) Assignee: United Video Properties, Inc., Santa Clara, CA (US)

( * ) Notice: Subject to any disclaimer, the term of this patent is extended or adjusted under 35 U.S.C. 154(b) by 308 days.

(21) Appl. No.: 12/571,186

(22) Filed: Sep. 30, 2009

(65) Prior Publication Data

US 2010/0262938 A1 Oct. 14, 2010

Related U.S. Application Data

(60) Provisional application No. 61/212,414, filed on Apr. 10, 2009.

(51) Int. Cl.
G06F 3/048 (2006.01)
(52) U.S. Cl. .......................................... 715/850; 715/721
(58) Field of Classification Search .......... 715/721–726, 715/848–852, 712–713, 855; 725/39, 40, 725/52; 709/232; 345/474, 158, 419
See application file for complete search history.

(56) References Cited

U.S. PATENT DOCUMENTS

| | | | |
|---|---|---|---|
| 4,429,385 A | 1/1984 | Cichelli et al. | |
| 4,625,080 A | 11/1986 | Scott | |
| 4,706,121 A | 11/1987 | Young | |
| 4,751,578 A | 6/1988 | Reiter | |
| 4,761,684 A | 8/1988 | Clark et al. | |
| 4,787,063 A | 11/1988 | Muguet | |
| 4,908,707 A | 3/1990 | Kinghorn | |
| 5,036,314 A | 7/1991 | Barillari et al. | |
| 5,089,885 A | 2/1992 | Clark | |
| 5,113,259 A | 5/1992 | Romesburg et al. | |

(Continued)

FOREIGN PATENT DOCUMENTS

DE 31 51 492 7/1983

(Continued)

OTHER PUBLICATIONS

Robertson G. et al., "Information Visualization Using 3D Interactive Animation," Communications of the Association for Computing Machinery, ACM, New York, NY, vol. 36, No. 4, Apr. 1, 1993, pp. 57-71.

(Continued)

Primary Examiner — Steven Sax
(74) Attorney, Agent, or Firm — Ropes & Gray LLP

(57) ABSTRACT

Systems and methods are provided for navigating a media guidance application with multiple perspective views. A first of a plurality of media guidance objects may be displayed in a first perspective view that appears flat on the screen. A second media guidance object may be displayed in a second perspective view that appears to be going into the screen creating the appearance of a fold between the first and second media guidance application objects at a location where the first perspective view changes into the second perspective view. The second media guidance object in the second perspective view may be caused to slide through the fold into the first perspective view. The second media guidance object displayed in the first perspective view may be selected. An action may be performed for a media asset corresponding to the selected media guidance object.

10 Claims, 29 Drawing Sheets

U.S. PATENT DOCUMENTS

| | | | |
|---|---|---|---|
| 5,132,992 A | 7/1992 | Yurt et al. |
| 5,155,591 A | 10/1992 | Wachob |
| 5,223,924 A | 6/1993 | Strubbe et al. |
| 5,233,423 A | 8/1993 | Jernigan et al. |
| 5,253,066 A | 10/1993 | Vogel |
| 5,335,277 A | 8/1994 | Harvey et al. |
| 5,353,121 A | 10/1994 | Young et al. |
| 5,359,367 A | 10/1994 | Stockill |
| 5,382,983 A | 1/1995 | Kwoh et al. |
| 5,410,326 A | 4/1995 | Goldstein |
| 5,414,756 A | 5/1995 | Levine |
| 5,455,570 A | 10/1995 | Cook et al. |
| 5,465,113 A | 11/1995 | Gilboy |
| 5,469,206 A | 11/1995 | Strubbe et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,485,197 A | 1/1996 | Hoarty |
| 5,502,504 A | 3/1996 | Marshall et al. |
| 5,509,908 A | 4/1996 | Hillstead et al. |
| 5,515,488 A | 5/1996 | Hoppe et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,534,911 A | 7/1996 | Levitan |
| 5,550,576 A | 8/1996 | Klosterman |
| 5,559,548 A | 9/1996 | Davis et al. |
| 5,559,549 A | 9/1996 | Hendricks et al. |
| 5,559,550 A | 9/1996 | Mankovitz |
| 5,570,295 A | 10/1996 | Isenberg et al. |
| 5,572,442 A | 11/1996 | Schulhof et al. |
| 5,579,239 A | 11/1996 | Freeman et al. |
| 5,583,560 A | 12/1996 | Florin et al. |
| 5,585,838 A | 12/1996 | Lawler et al. |
| 5,585,865 A | 12/1996 | Amano et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,606,374 A | 2/1997 | Bertram |
| 5,617,526 A | 4/1997 | Oran et al. |
| 5,619,249 A | 4/1997 | Billock et al. |
| 5,621,456 A | 4/1997 | Florin et al. |
| 5,623,613 A | 4/1997 | Rowe et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,640,484 A | 6/1997 | Mankovitz |
| 5,654,748 A | 8/1997 | Matthews et al. |
| 5,657,072 A | 8/1997 | Aristides et al. |
| 5,666,293 A | 9/1997 | Metz et al. |
| 5,675,390 A | 10/1997 | Schindler et al. |
| 5,678,015 A | 10/1997 | Goh |
| 5,682,206 A | 10/1997 | Wehmeyer et al. |
| 5,692,214 A | 11/1997 | Levine |
| 5,694,163 A | 12/1997 | Harrison |
| 5,699,107 A | 12/1997 | Lawler et al. |
| 5,710,601 A | 1/1998 | Marshall et al. |
| 5,734,853 A | 3/1998 | Hendricks et al. |
| 5,734,893 A | 3/1998 | Li et al. |
| 5,748,191 A | 5/1998 | Rozak et al. |
| 5,748,716 A | 5/1998 | Levine |
| 5,758,257 A | 5/1998 | Herz et al. |
| 5,758,259 A | 5/1998 | Lawler |
| 5,781,246 A | 7/1998 | Alten et al. |
| 5,787,259 A | 7/1998 | Haroun et al. |
| 5,788,507 A | 8/1998 | Redford et al. |
| 5,790,202 A | 8/1998 | Kummer et al. |
| 5,793,964 A | 8/1998 | Rogers et al. |
| 5,798,785 A | 8/1998 | Hendricks et al. |
| 5,812,931 A | 9/1998 | Yuen |
| 5,828,420 A | 10/1998 | Marshall et al. |
| 5,844,620 A | 12/1998 | Coleman et al. |
| 5,850,218 A | 12/1998 | LaJoie et al. |
| 5,858,866 A | 1/1999 | Miller et al. |
| 5,867,233 A | 2/1999 | Tanaka |
| 5,880,768 A | 3/1999 | Lemmons et al. |
| 5,886,732 A | 3/1999 | Humpleman |
| 5,907,323 A | 5/1999 | Lawler et al. |
| 5,914,746 A | 6/1999 | Matthews, III et al. |
| 5,977,964 A | 11/1999 | Williams et al. |
| 5,988,078 A | 11/1999 | Levine |
| 6,002,394 A | 12/1999 | Schein et al. |
| 6,014,184 A | 1/2000 | Knee et al. |
| 6,097,441 A | 8/2000 | Allport |
| 6,104,334 A | 8/2000 | Allport |
| 6,130,726 A | 10/2000 | Darbee et al. |
| 6,177,931 B1 | 1/2001 | Alexander et al. |
| 6,208,384 B1 | 3/2001 | Schultheiss |
| 6,233,734 B1 | 5/2001 | Macrae et al. |
| 6,239,794 B1 | 5/2001 | Yuen et al. |
| 6,263,501 B1 | 7/2001 | Schein et al. |
| 6,268,849 B1 | 7/2001 | Boyer et al. |
| 6,310,886 B1 | 10/2001 | Barton |
| 6,331,877 B1 | 12/2001 | Bennington et al. |
| 6,354,378 B1 | 3/2002 | Patel |
| 6,357,043 B1 | 3/2002 | Ellis et al. |
| 6,388,714 B1 | 5/2002 | Schein et al. |
| 6,463,585 B1 | 10/2002 | Hendricks et al. |
| 6,564,378 B1 | 5/2003 | Satterfield et al. |
| 6,611,654 B1 | 8/2003 | Shteyn |
| 6,622,148 B1 * | 9/2003 | Noble et al. .................. 707/792 |
| 6,756,997 B1 | 6/2004 | Ward, III et al. |
| 6,760,537 B2 | 7/2004 | Mankovitz |
| 6,813,775 B1 | 11/2004 | Finseth et al. |
| 6,837,789 B2 | 1/2005 | Garahi et al. |
| 6,950,624 B2 | 9/2005 | Kim et al. |
| 6,990,637 B2 | 1/2006 | Anthony et al. |
| 7,020,704 B1 | 3/2006 | Lipscomb et al. |
| 7,069,518 B2 | 6/2006 | Card et al. |
| 7,088,952 B1 | 8/2006 | Saito et al. |
| 7,107,549 B2 | 9/2006 | Deaton et al. |
| 7,134,092 B2 | 11/2006 | Fung et al. |
| 7,165,098 B1 | 1/2007 | Boyer et al. |
| 7,328,450 B2 | 2/2008 | Macrae et al. |
| 7,385,600 B2 * | 6/2008 | Marion ........................ 345/419 |
| 7,480,929 B2 | 1/2009 | Klosterman et al. |
| 7,493,641 B2 | 2/2009 | Klosterman et al. |
| 7,581,182 B1 * | 8/2009 | Herz .............................. 715/713 |
| 7,685,619 B1 * | 3/2010 | Herz .............................. 725/52 |
| 2002/0056087 A1 | 5/2002 | Berezowski et al. |
| 2002/0174430 A1 | 11/2002 | Ellis et al. |
| 2003/0110499 A1 | 6/2003 | Knudson et al. |
| 2003/0164858 A1 | 9/2003 | Klosterman et al. |
| 2003/0188311 A1 | 10/2003 | Yuen et al. |
| 2003/0196201 A1 | 10/2003 | Schein et al. |
| 2004/0021668 A1 * | 2/2004 | Chevallier et al. ............ 345/474 |
| 2004/0103432 A1 * | 5/2004 | Barrett ............................ 725/39 |
| 2004/0113915 A1 | 6/2004 | Ohtsuki et al. |
| 2005/0028208 A1 | 2/2005 | Ellis |
| 2005/0120373 A1 | 6/2005 | Thomas et al. |
| 2005/0204388 A1 | 9/2005 | Knudson et al. |
| 2005/0251827 A1 | 11/2005 | Ellis et al. |
| 2005/0280631 A1 * | 12/2005 | Wong et al. ................... 345/158 |
| 2006/0031883 A1 | 2/2006 | Ellis et al. |
| 2006/0233055 A1 * | 10/2006 | Hendrickson et al. ............ 369/1 |
| 2007/0005795 A1 * | 1/2007 | Gonzalez ...................... 709/232 |
| 2008/0062141 A1 | 3/2008 | Chandhri |
| 2008/0104057 A1 | 5/2008 | Billmaier et al. |
| 2008/0126934 A1 | 5/2008 | Bray |
| 2009/0303231 A1 * | 12/2009 | Robinet et al. ................ 345/419 |
| 2010/0083165 A1 | 4/2010 | Andrews et al. |
| 2010/0262995 A1 * | 10/2010 | Woods et al. ................... 725/40 |

FOREIGN PATENT DOCUMENTS

| | | |
|---|---|---|
| DE | 195 31 121 | 2/1997 |
| DE | 197 40 079 | 3/1999 |
| EP | 0 447 095 | 9/1991 |
| EP | 0774853 | 5/1997 |
| EP | 0793225 | 9/1997 |
| EP | 0 805 594 | 11/1997 |
| GB | 2265792 | 10/1993 |

| | | |
|---|---|---|
| JP | 03022770 | 1/1991 |
| JP | 08-56352 | 2/1996 |
| JP | 09102827 | 4/1997 |
| WO | WO-87/03766 | 6/1987 |
| WO | WO-89/03085 | 4/1989 |
| WO | WO-94/14282 | 6/1994 |
| WO | WO-95/01056 | 1/1995 |
| WO | WO-95/01059 | 1/1995 |
| WO | WO-95/10910 | 4/1995 |
| WO | WO-95/28055 | 10/1995 |
| WO | WO-95/32585 | 11/1995 |
| WO | WO-96/07270 | 3/1996 |
| WO | WO-96/13932 | 5/1996 |
| WO | WO-96/20555 | 7/1996 |
| WO | WO-97/13368 | 4/1997 |
| WO | WO-97/31480 | 8/1997 |
| WO | WO-97/36422 | 10/1997 |
| WO | WO-97/47106 | 12/1997 |
| WO | WO-97/47143 | 12/1997 |
| WO | WO-97/49237 | 12/1997 |
| WO | WO-97/50251 | 12/1997 |
| WO | WO-98/10589 | 3/1998 |
| WO | WO-98/16062 | 4/1998 |
| WO | WO-98/17064 | 4/1998 |
| WO | WO-98/26584 | 6/1998 |
| WO | WO-99/14947 | 3/1999 |
| WO | WO-99/30491 | 6/1999 |
| WO | WO 2005/013146 | 2/2005 |

OTHER PUBLICATIONS

U.S. Appl. No. 09/332,244, filed Jun. 11, 1999, Ellis.
U.S. Appl. No. 09/492,713, filed Jan. 27, 2000, Forrer.
U.S. Appl. No. 11/324,202, filed Dec. 29, 2005, Yates.
"Why Jini Now?", from the internet at http://java.sun.com/products/jini/whitepapers/whyjininow.pdf, printed on Jan. 25, 1999. The document bears a copyright date of 1998.
Von Andreas Neumann, "WDR Online Aufbau Und Perspektiven Automatisierter Online-Dienste Im WDR," Rundfunktechnische Mitteilungen, vol. 41, pp. 56-66, Jun. 1997.
Von Gerhard Eitz, "Zukunftige Informations-Und Datenangebote Beim Digitalen Fernsehen—EPG Und "Lesezeichen"," Rundfunktechnische Mitteilungen, vol. 41, pp. 76-72, Apr. 30, 1997.
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998.
"Jini Architecture Overview," by Jim Waldo, from the Internet at http://Java.sun.com/products/jini/whitepapers/architectureoverview.pdf/ printed on Jan. 25, 1999. The document bears a copyright date of 1998.
"Reaching your subscribers is a complex and costly process-until now," from the Internet at http://www.evolveproducts.com/info.html, printed on Dec. 28, 1998.
Curt Rogers, "Telcos vs. Cable TV: the Global View," Data Communications, No. 13, New York, pp. 75, 76, 78 and 80, Sep. 1995.
"Sun's Next Steps in Digital Set-Tops," article in Cablevision, p. 56, Nov. 16, 1998.
"The Evolve EZ Guide. The Remote. Control," from the Internet at http://www.evolveproducts.com/display2.html, printed on Dec. 28, 1998.
"Using Starsight 2," published before Apr. 19, 1995.
"What is Jini?", from the Internet at http://java.sun.com/products/jini/whitepapers/whatsjini.pdf, printed on Jan. 25, 1999.
Jaidev, "EXSLT—a Wired and Wireless Case Study," http://csharpcomputing.com/XMLTutorial/Lession15.htm, Oct. 14, 2005.
Randerson, J., "Let Software Catch the Game for You," New Scientist, Jul. 3, 2004.
Papers Delivered (Part 1), 61st National Conference, Information Processing Society of Japan, Oct. 3-5, 2000.
Index Systems Inc., "Gemstar Service Object Model," Data Format Specification, Ver. 2.0.4, pp. 58-59, Dec. 20, 2002.
Pogue, D., "State of the Art: For TiVo and Replay, New Reach," N.Y. Times, May 29, 2003.

* cited by examiner

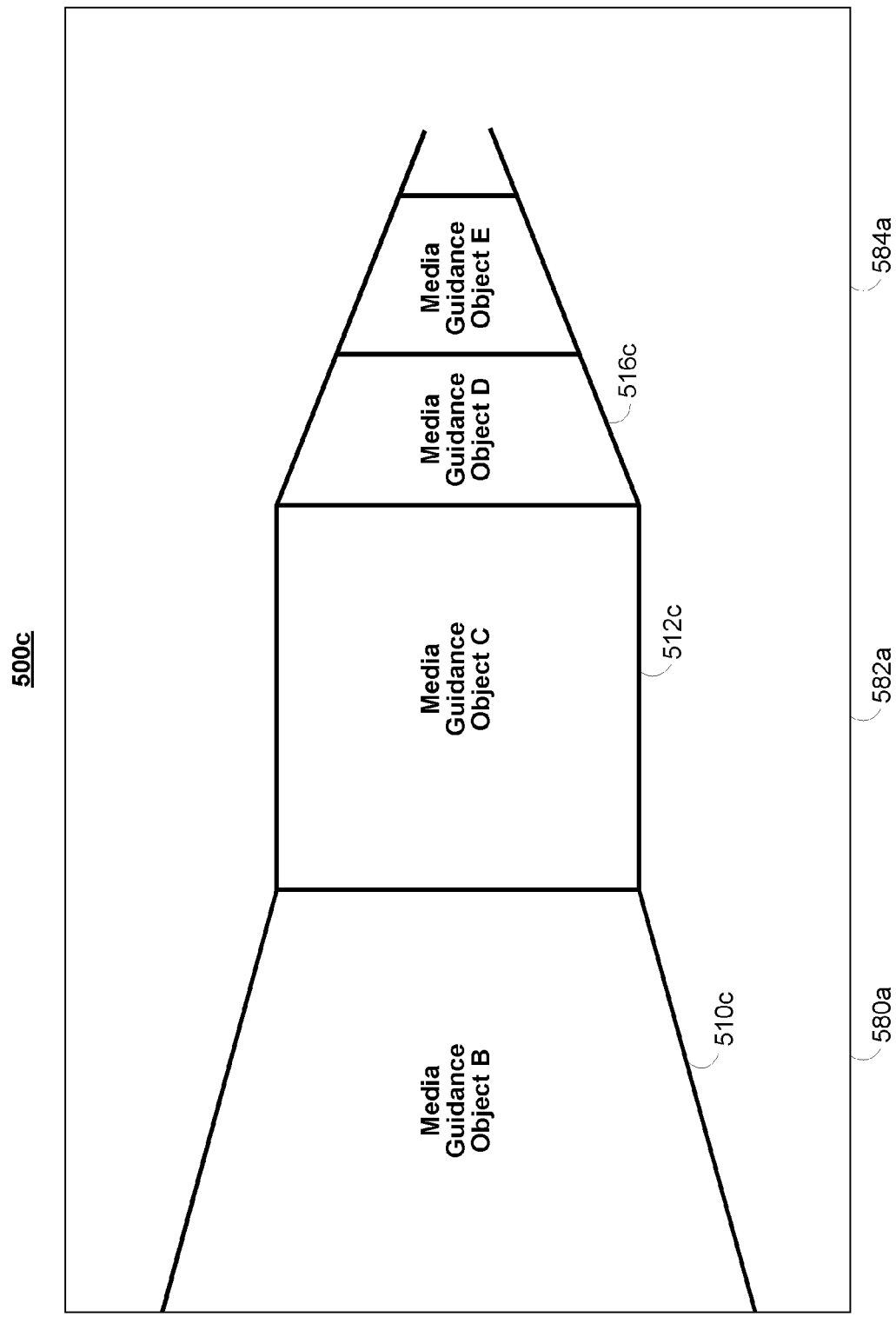

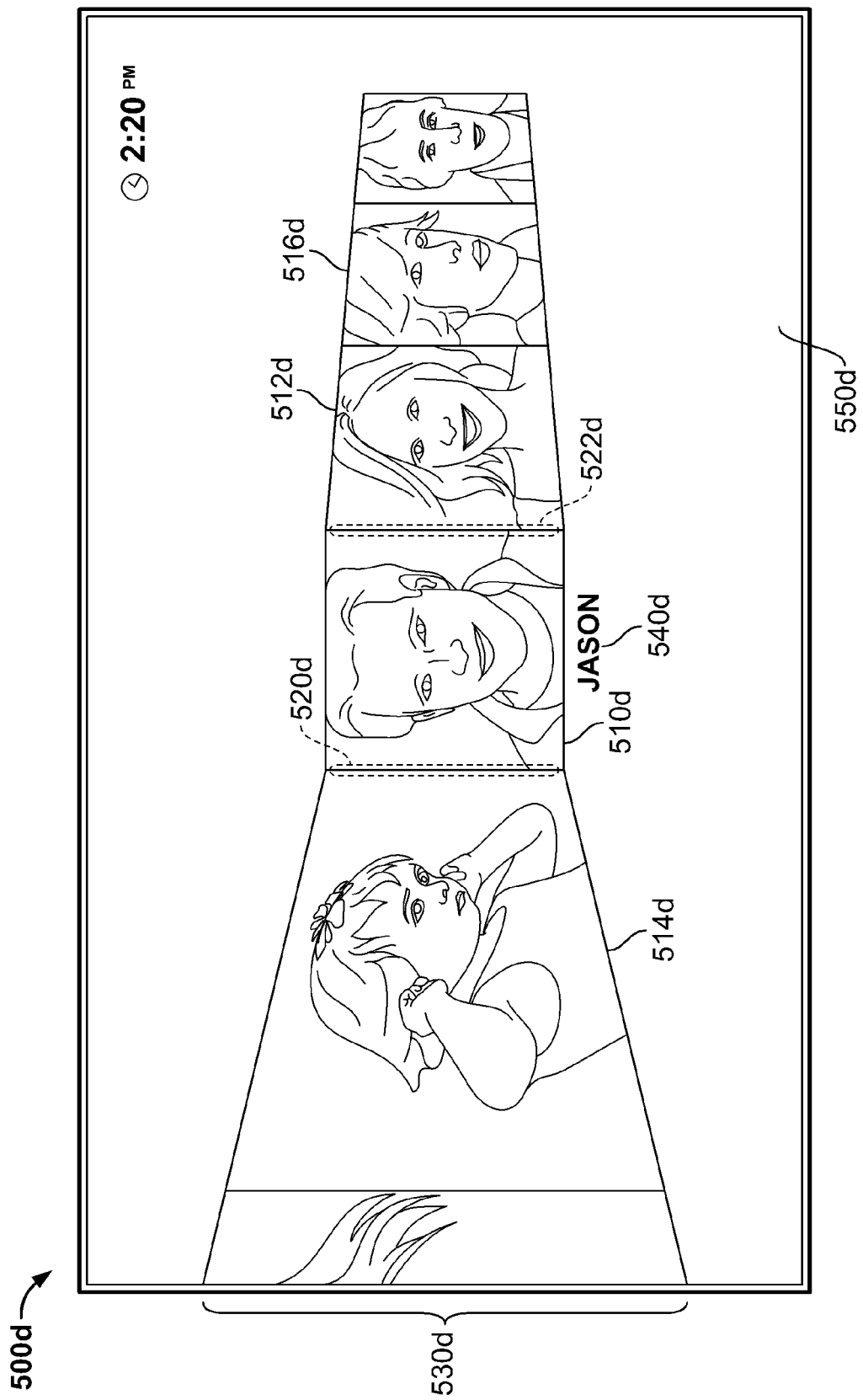

SYSTEMS AND METHODS FOR GENERATING A MEDIA GUIDANCE APPLICATION WITH MULTIPLE PERSPECTIVE VIEWS

CROSS-REFERENCE TO RELATED APPLICATION

This application claims the benefit of U.S. Provisional Application No. 61/212,414, filed Apr. 10, 2009, the disclosure of which is hereby incorporated by reference herein in its entirety.

BACKGROUND OF THE INVENTION

Due to the overwhelming volume of media content (e.g., video and audio) available to the average person (e.g., via the Internet, cable and satellite television and radio), interactive media guidance applications, such as interactive program guides, have gained widespread popularity. Typically, interactive program guides present guide listings in a single perspective view grid indexed by time and program source (e.g., a television channel). In particular, the guide listings appear flat on the screen. These guidance applications also present other guide related data (e.g., user profiles, recommendations) in a single perspective view.

SUMMARY OF THE INVENTION

In view of the foregoing, systems and methods for navigating a media guidance application with multiple perspective views in accordance with various embodiments of the present invention are provided.

In some embodiments, a first media guidance application object may be displayed in a first perspective view. The first media guidance application object that is displayed in the first perspective view may be the media guidance application object that is in focus. The first perspective view may be a view that is similar to the two dimensional representation of objects in a typical program guide. More specifically, media guidance application objects displayed in the first perspective view may appear flat on the screen.

A second media guidance application object may be displayed in a second perspective view different from the first perspective view. In some implementations, the second perspective view may be a view that appears to go into the screen. In particular, media guidance objects displayed in the second perspective view may appear to go into the screen where media guidance application objects gradually decrease in size. A fold or crease may appear between the first and second media guidance application objects at a point where the first perspective view changes into the second perspective view.

In some embodiments, media guidance application objects may include user profile representations, media asset representations, one or more program guide listings, widgets, websites, one or more menus of selectable items, visual keypads, search results, or any combination of the same. In some implementations, the media guidance application objects may be arranged in a particular predefined order. In particular, media guidance objects may be arranged in alphabetical order, numerical order, user defined order, an order according to size of a corresponding media asset, an order according to length of a corresponding media asset, an order based on last access to a corresponding media asset, an order based on type of a corresponding media assets, chronological order, an order based on time intervals associated with corresponding media assets, or some other suitable order such as in order of relevance to the user.

In some embodiments, the user may input a command to cause the second media guidance application object displayed in the second perspective view to slide through a fold or crease from the second perspective view into the first perspective view. In some implementations, the user may press a right arrow key, to shift media guidance application objects from the second perspective view into the first perspective view and shift out of the first perspective view the media guidance application object that was in focus. More specifically, the user may navigate to earlier or later media guidance application objects by pressing a right/left arrow key to bring those media guidance application objects into the first perspective view and thereby into focus.

In some embodiments, the media guidance application object that is displayed in the first perspective view (e.g., the media guidance application object that is in focus) may be selected by the user. In some implementations, the user may press a confirm key to select the media guidance application object that is in focus. In some implementations, selecting the media guidance application object that is in focus may allow the user to login, access, playback, schedule for recording, schedule a reminder, receive detailed information or otherwise perform an action relative to a media asset associated with the media guidance application object in focus.

In some embodiments, additional perspective views may be provided for other media guidance application objects. In particular, media guidance application objects that come earlier in an order or sequence than the first media guidance application object that is in focus, may appear in a third perspective view. In some implementations, the media guidance application objects that are in the third perspective view may appear to come out of the screen towards the user. Media guidance application objects that come earlier in the order or sequence than the media guidance application object that is in focus may appear to be gradually increasing in size in the third perspective view. A second fold or crease may appear between the first media guidance application object and the media guidance application objects in the third perspective view at a point where the first perspective view changes into the third perspective view. In some implementations, the second and third perspective views include media guidance objects on opposite sides of the first media guidance object displayed in the first perspective view.

In some embodiments, media guidance objects displayed in the third perspective view may be static. In particular, as the user slides media guidance objects from the second perspective view into the first perspective view through the fold or crease, media guidance objects in the third perspective view may remain unchanged or static and thereby not be moved. More specifically, the first media guidance object may be removed from display instead of sliding from the first perspective view through another crease into the third perspective view when the second media guidance object slides from the second perspective view into the first perspective view.

In some embodiments, at least two of the media guidance application objects may be displayed adjacent or next to the first media guidance application object. When taken together, the first media guidance application object and the at least two of the media guidance application objects may appear to form an array of media guidance application objects with a crease in the point of adjacency between the first media guidance application object and one of the at least two media guidance application objects. In some implementations, the array of media guidance application objects may be continuous such that no other data or objects separates any two media guidance objects.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 5a-c show an illustrative display screens of media guidance objects displayed in different perspectives in accordance with an embodiment of the invention;

FIG. 5d shows an illustrative display screen of user profile representations displayed in different perspectives in accordance with an embodiment of the invention;

DETAILED DESCRIPTION OF EMBODIMENTS

Figure 1:
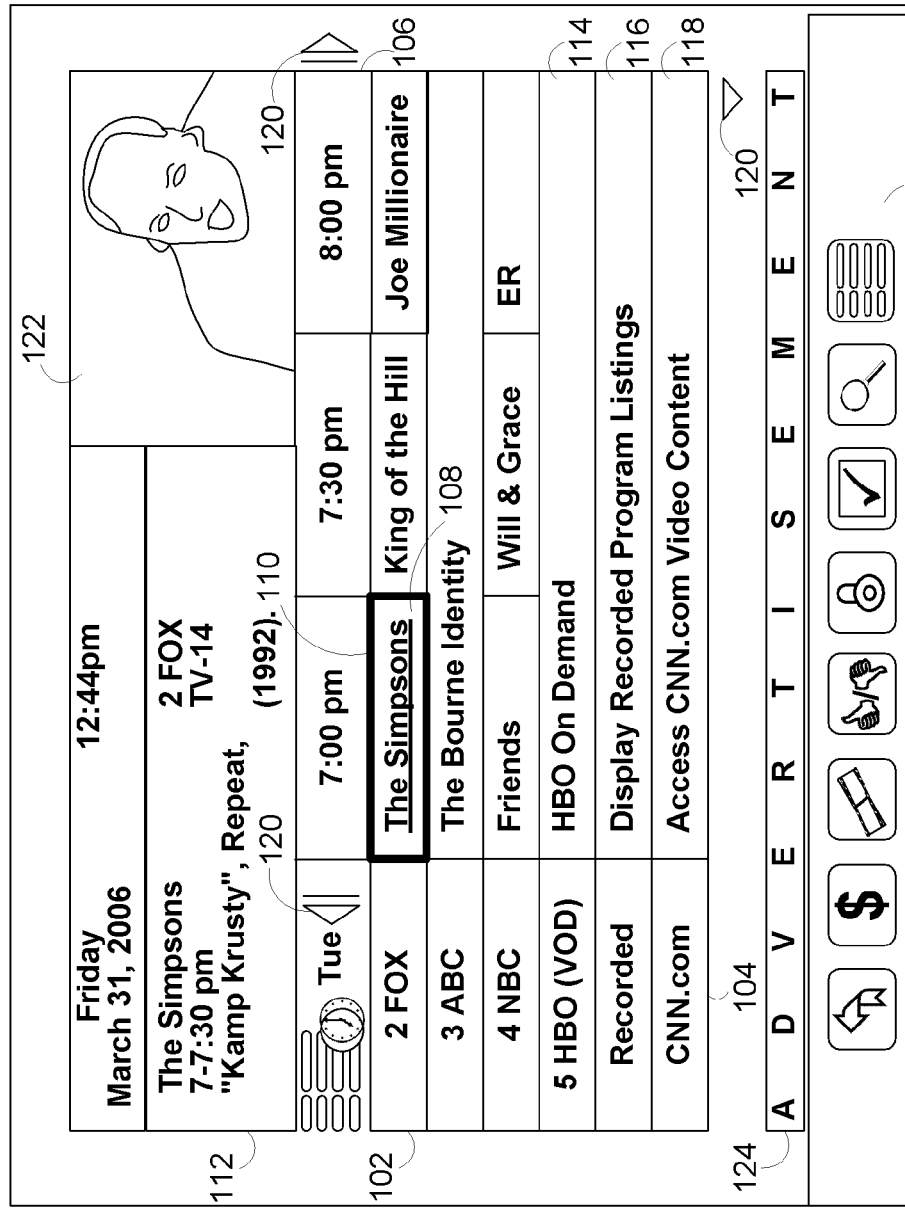
FIGS. 1 and 2 show illustrative display screens that may be used to provide media guidance application listings in accordance with an embodiment of the invention.

This invention generally relates to navigating a media guidance application with multiple perspective views. In particular, an object of a plurality which is in focus (e.g., a user profile, media asset, or program schedule information) is displayed in a first perspective view and the remaining objects in the plurality are displayed in a different second perspective view. More specifically, the object in focus may be displayed to appear flat on the screen and other objects may be displayed to appear as though they are coming out or going into the screen. As defined herein, an asset or media asset refers to any type of media (or data file) that may be played, accessed, recorded and/or viewed. As referred to herein, the term "focus" or being into focus should be understood to mean to change the appearance of a displayed item or object to make the item or object more visually prominent than other items or objects.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 2:
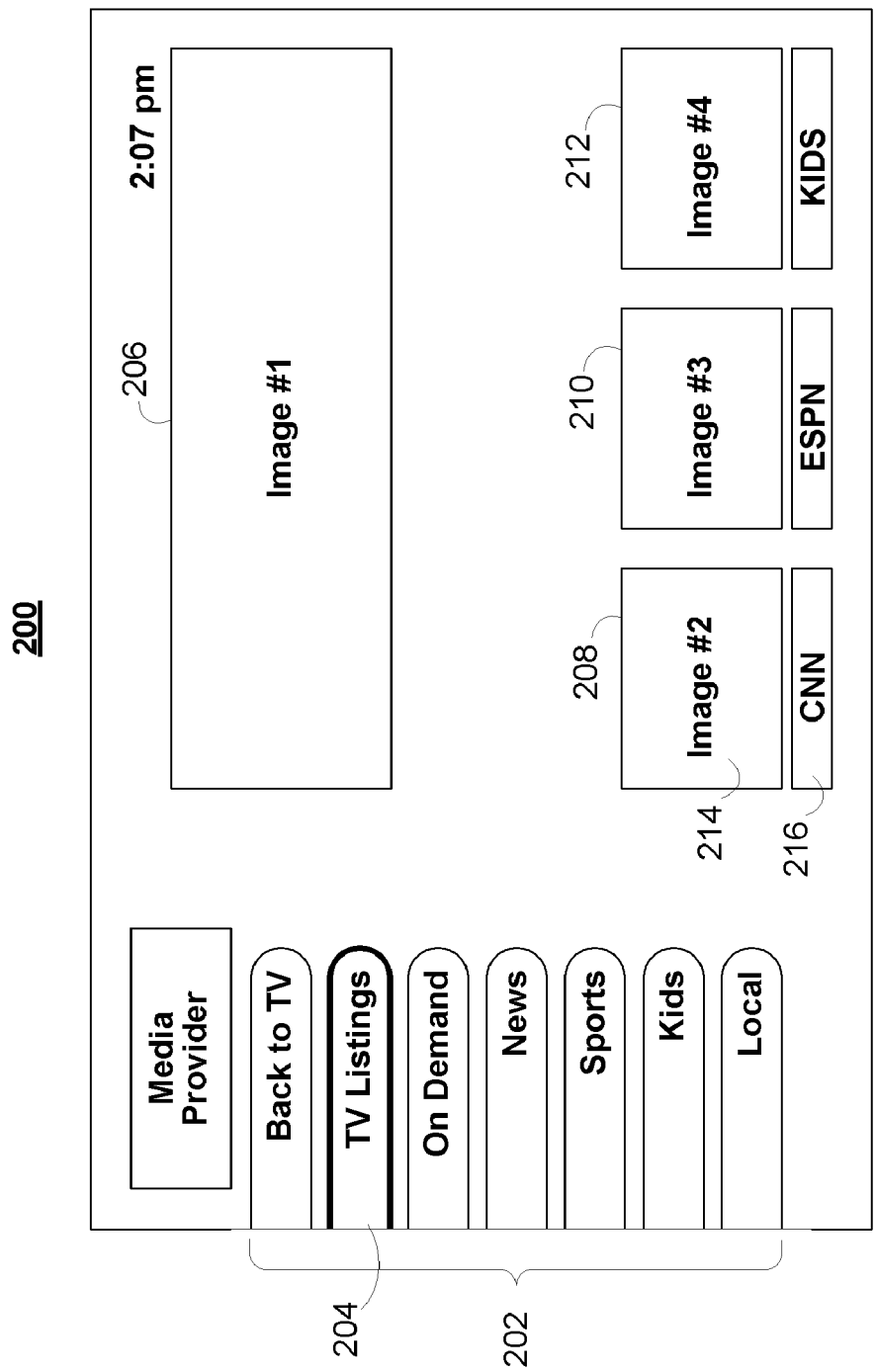

One of the functions of the media guidance application is to provide media listings and media information to users. FIGS. 1-2 show illustrative display screens that may be used to provide media guidance, and in particular media listings. The display screens shown in FIGS. 1-2 and 5-18 may be implemented on any suitable device or platform. While the displays of FIGS. 1-2 and 5-18 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site (e.g., HULU or YOUTUBE) or other Internet access (e.g., FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to (i.e., be related to) or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, scheduling a reminder for a program, ordering a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. Pat. No. 7,165,098, issued Jan. 16, 2007, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, still frames of a video associated with the listing, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
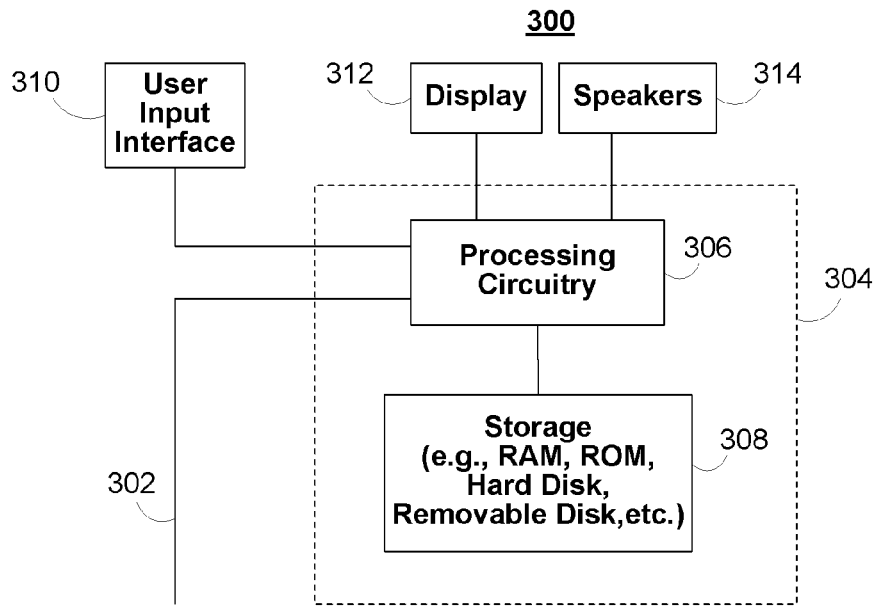
FIG. 3 shows an illustrative user equipment device in accordance with another embodiment of the invention.

Users may access media content and the media guidance application (and its display screens described above and below) from one or more of their user equipment devices. FIG. 3 shows a generalized embodiment of illustrative user equipment device 300.

More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
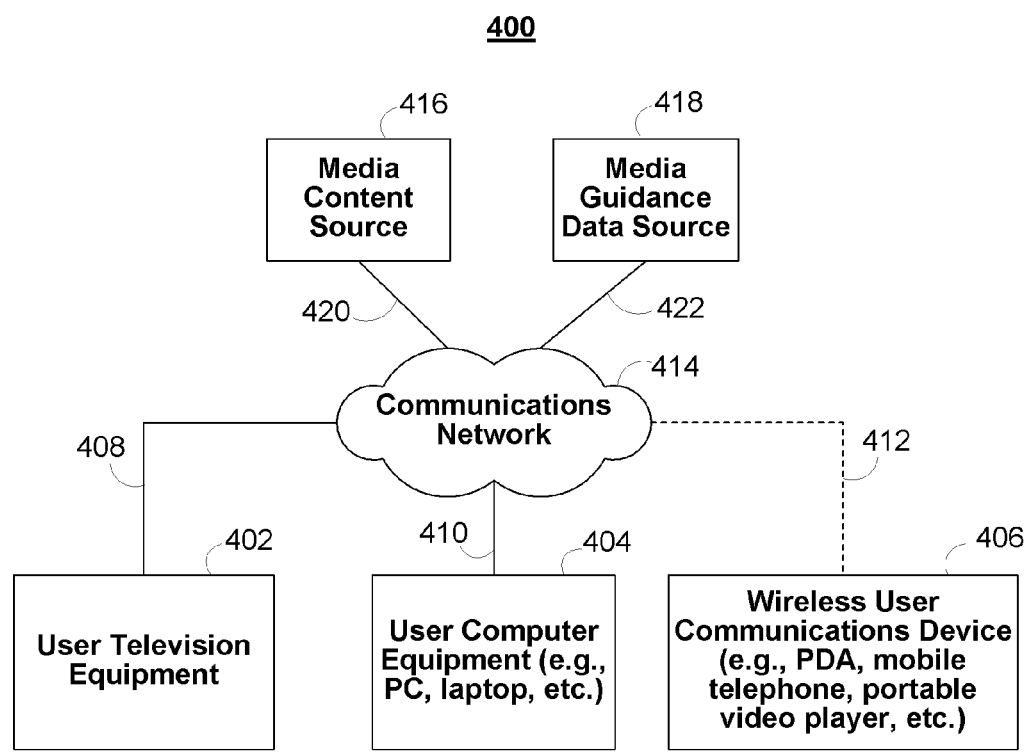
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content or scheduled media asset events (e.g., reminders for media assets). For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, program orders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments, media guidance application objects or media guidance objects may be displayed in different perspective views. In particular, one of the media guidance objects may be displayed in a first perspective view (e.g., the media guidance object appears flat on the screen) and other media guidance objects may be displayed in a second perspective view (e.g., the media guidance objects appear as though they are going into the screen or coming out of the screen). As referred to above and below a fold or crease is the point, line, position, place or location at which one perspective view changes into another perspective view.

It should be understood that, in accordance with the present invention, media guidance objects within a certain perspective view have lines converging at the same vanishing point. More specifically, the a line drawn between two points of one media guidance object within a certain perspective view converges at the same vanishing point as the line drawn between the same two points of another media guidance object within the perspective view. For example, when two media guidance objects resemble substantially the same square shape, the line drawn between the top corners of one of the squares converges at the same vanishing point as the line drawn between the top corners of a second one of the squares. Similarly, when media guidance objects in the same perspective view are of different types/shapes, a line drawn between two reference points of the media guidance object (e.g., the line drawn between the center point of one eye of a face and the center point of the second eye of the face) converge at the same vanishing points as the line drawn, when the media guidance object is displayed elsewhere in the same perspective view, between the same two reference points of the media guidance object (e.g., the center points of the eyes of the face).

For example, a media guidance application object displayed in a first perspective view has lines converging at one vanishing point and a media guidance application object displayed in a second perspective view has lines converging at a different second vanishing point. In some implementations, the media guidance application object may be displayed in a first perspective view such that it appears to be flat on the screen. In such a perspective view, the media guidance application object lines may never converge as the object appears flat on the screen and all lines are parallel.

Although the description above and below relates to the appearance of media guidance objects on a flat surface (e.g., a two-dimensional display screen), it should be understood that the same teaching may be applied to a display device that provides hologram representations of the media guidance objects (e.g., a holographic television or display apparatus). Holographic display devices are described in greater detail in Teacherson U.S. Pat. No. 4,359,758, filed Apr. 5, 1979, and Brown et al. U.S. Pat. No. 4,376,950, filed Sep. 29, 1990, each of which is incorporated herein by reference in its entirety. In particular, in a hologram implementation, all media guidance objects within a certain perspective view, as shown in the two-dimensional display, may be positioned within a respective plane in the hologram. Additionally, in the hologram implementation, each respective plane may have its own perspective views within the plane such that multiple media guidance objects in the plane of the hologram may be displayed similarly to the two-dimensional display.

The media guidance objects displayed in a first perspective view may be moved into a second perspective view for selection by sliding the media guidance object through a fold or crease into the first perspective view. The media guidance object displayed in the first perspective view may be selected by the user.

As defined herein, the term media guidance object or media guidance application object means any website, live video feed, or recorded video feed playback or visual representation of media guidance application data such as a visual representation of a user profile, a media asset, previously recorded media asset, media asset recommendation, email message, notification, reminder, scheduled recording, favorite channel, photograph, icon, sketch, Short Message Service (SMS) message, Multimedia Messaging Service (MMS) message, service provider message, new media asset release, media category, a queue that includes media assets to be viewed at a future time, a playlist of media assets, or home video, or any combination of the same.

Figure 5A:
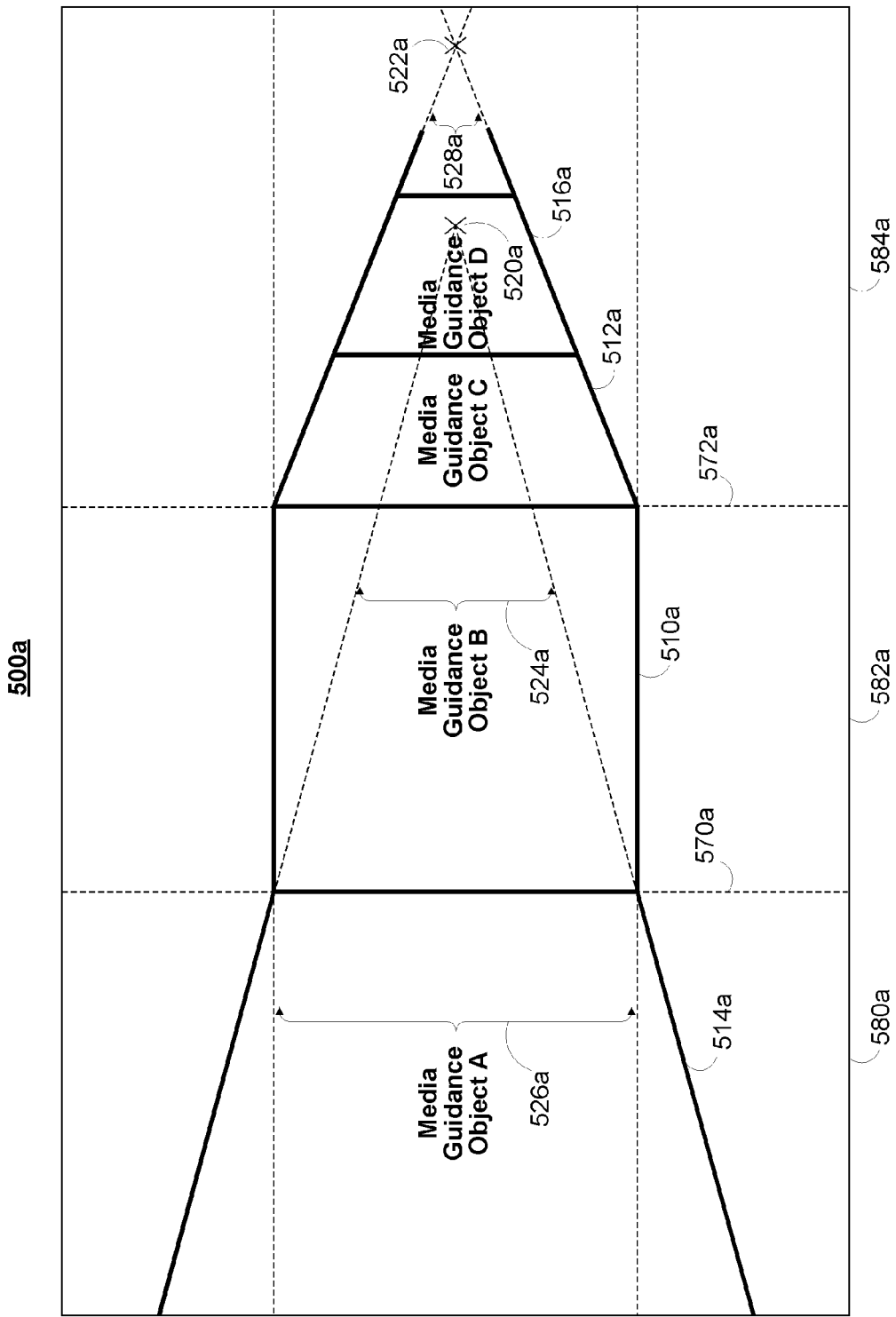

FIG. 5a shows an illustrative display screen 500a of media guidance objects displayed in different perspectives in accordance with an embodiment of the invention. In particular, screen 500a may include a first media guidance object 514a, a second media guidance object 510a, a third media guidance object 512c, a fourth media guidance object 516a, a first perspective view 580a, a second perspective view 582a and a third perspective view 584a. Although four media guidance objects are shown in screen 500a, any number of media guidance objects may be displayed in any of the different perspectives. Also, although three different perspective views are shown in screen 500a, any number of perspective views may be provided.

First media guidance object 514a may be displayed in first perspective view 580a. First media guidance object 514a may be for example a user profile representation, a media asset representation, a program guide listing, or any other media guidance object discussed above and below or combination of the same. First media guidance object 514a may be displayed such that lines 524a converge at a first vanishing point 520a. All lines that emerge from media guidance objects displayed in first perspective view 580a may converge at first vanishing point 520a. First media guidance object 514a appears to be coming out of screen 500a.

Second media guidance object 510a may be displayed in second perspective view 582a. Second perspective view 582a may be different from first perspective view 580a. Second media guidance object 510a may be for example a user profile representation, a media asset representation, a program guide listing, or any other media guidance object discussed above and below or combination of the same. Second media guidance object 510a may be of the same type as first media guidance object 514a or of a different type.

Second media guidance object 510a may be displayed such that lines 526a are parallel and may never converge at a vanishing point. All lines that emerge from media guidance objects displayed in second perspective view 582a may be parallel and never converge at a vanishing point. Second media guidance object 510a appears to be flat on screen 500a.

Third and fourth media guidance objects 512a and 516a may be displayed in third perspective view 584a. Third and fourth media guidance objects 512a and 516a may be for example user profile representations, media asset representations, program guide listings, or any other media guidance objects discussed above and below or combination of the same. Third and fourth media guidance objects 512a and 516a may be of the same type as first and/or second media guidance objects 514a and 510a or of a different type. In some implementations, third and fourth media guidance objects 512a and 516a may be of the same type (e.g., program listings) as second media guidance object 510a and of a different type than first media guidance object 514a.

Third and fourth media guidance objects 512a and 516a may be displayed such that lines 528a converge at a second vanishing point 522a that is at a different location than first vanishing point 520a. All lines that emerge from media guidance objects displayed in third perspective view 584a may converge at second vanishing point 522a. Third and fourth media guidance objects 512a and 516a appear to be going into screen 500a.

Although media guidance objects are displayed in different perspective views, it should be understood that the media guidance objects are clearly visually distinguishable by the user. However, some media guidance objects that are displayed very far into a particular perspective may become distorted and hard to visually distinguish. For example, media guidance objects may be images or videos such that most of the images or videos displayed in any perspective view are ascertainable and clearly viewable by the user. In particular, an image or video displayed in a perspective view that appears to go into or come out of the screen is substantially as clear as when the image or video is displayed in a perspective view that appears flat on the screen.

The media guidance objects that are displayed in first perspective view 580a may be adjacent or next to media guidance objects displayed in second perspective view 582a. For example, first media guidance object 514a may be displayed adjacent second media guidance object 510*a* such that first media guidance object 514*a* and second media guidance object 510*a* connect at a first side 570*a* of second media guidance object 510*a*.

The media guidance objects that are displayed in third perspective view 584*a* may be adjacent or next to the media guidance object displayed in second perspective view 582*a*. In some implementations, media guidance objects that are displayed in third perspective view 584*a* may be adjacent to a side of the media guidance object displayed in second perspective view 582*a* that is opposite a side of the media guidance object displayed in second perspective view 582*a* that is adjacent to the media guidance objects that are displayed in first perspective view 580*a*. For example, third media guidance object 512*a* may be displayed adjacent second media guidance object 510*a* such that third media guidance object 512*a* and second media guidance object 510*a* connect at a second side 572*a* of second media guidance object 510*a* that is opposite first side 570*a*.

The point of adjacency between a media guidance object displayed in one perspective view and a media guidance object displayed in another perspective view is referred to herein a "fold" or a "folding point." It should be understood that the media guidance objects may not be immediately adjacent such that they are touching and in such circumstances the point of adjacency refers to the point at which one perspective view changes into another perspective view. For example, the media guidance objects in screen 500*a* are displayed in different perspectives to create two folding points. There may be one, two or any other suitable number of folding points in various embodiments. The folding points create the appearance of a crease in the screen that occurs between two displayed media guidance objects.

In some implementations, as a media guidance object slides through the folding point from one perspective view into another perspective view, the folding point may create the appearance of a crease in the screen that occurs within different segments of the media guidance object. More specifically, the media guidance object may appear to slide through the folding point or crease from a first perspective view to a second perspective view until the media guidance object is completely within the second perspective view. In particular, as shown FIG. 5*b*, as media guidance object 512*a* slides from third perspective view 584*a* into second perspective view 582*a*, one portion of media guidance object 512*a* may appear in third perspective view 584*a* while another portion of media guidance object 512*a* may appear in second perspective view 582*a* and the fold or crease 572*a* may appear between the two portions of media guidance object 512*a* that are displayed in the different perspective views.

Connecting the media guidance objects from each of the perspectives at the points of adjacency creates the appearance of an array (which may be continuous) of displayed media guidance objects. The array of media guidance objects may appear to have folds at the points of adjacency. In particular, the array may appear to have a crease at side 570*a* and at side 572*a*.

In some implementations, second perspective view 582*a* may be adapted to display only one media guidance object at a time. In particular, in some implementations, only one media guidance object may appear flat on the screen at a time. This may enable the system to focus the user's attention on a particular media guidance object. Alternatively, any number of suitable media guidance objects may be displayed to appear flat on the screen at a time.

In some embodiments, the folds or creases and the different perspective views in the array of media guidance objects may be generated by displaying on the screen a row of first, second and third media guidance objects that may appear flat on the screen. The screen may have a surface normal (e.g., a line that is perpendicular to the surface of the screen). The first media guidance object may be positioned between the second and third media guidance objects. Processing circuitry 306 may rotate, in a clockwise direction towards the surface normal, a first portion of the row that includes the second media guidance object while a second portion of the row that includes the first media guidance object remains stationary. For example, the first media guidance object may be media guidance object 510*a* and the second media guidance object may be media guidance object 512*a*. The first portion of the row may include the media guidance objects in screen 500*a* that are shown to the right of media guidance object 510*a* (including media guidance object 512*a*). The second portion may be the center section of the row between lines 570*a* and 572*a*. Rotating the first portion of the row in a clockwise direction towards the surface normal while keeping the second portion stationary makes the media guidance objects included in the first portion appear as going into the screen. In some implementations, the first portion is rotated to an angle having a value greater than zero degrees but less than ninety degrees relative to a line that is perpendicular to the surface normal of the screen and that intersects the first portion.

In some embodiments, media guidance objects within each of the three perspective views 580*a*, 582*a* and 584*a* may appear to unfold onto the display screen. For example, processing circuitry 306 may first generate a display in which only media guidance objects within first perspective view 580*a* appear to unfold onto the screen from one side of the screen (e.g., the left side of the screen) towards the opposite side of the screen (e.g., the right side of the screen). In particular, media guidance objects may appear to rotate clockwise from the left side of the screen towards the right side of the screen until they appear to be in the desired perspective view (e.g., coming out of the screen). In some implementations, these media guidance objects may be rotated clockwise towards the inside of the display screen to a position between 180 and 270 degrees relative to the surface of the display screen. After the media guidance objects within first perspective view 580*a* are generated in the display, processing circuitry 306 may generate a display in which media guidance objects unfold from first perspective view 580*a* into second perspective view 582*a*. For example, media guidance objects within second perspective view 582*a* may appear to come out of the media guidance objects within first perspective view 580*a* and be rotated from the first perspective view objects clockwise towards the inside of the screen until they appear to be in second perspective view 582*a* (e.g., flat on the display screen). Finally, after the media guidance objects within first and second perspective views 580*a* and 582*a* are generated in the display, processing circuitry 306 may generate a display in which media guidance objects unfold from second perspective view 582*a* into third perspective view 584*a*. For example, media guidance objects within third perspective view 584*a* may appear to come out of the media guidance objects within second perspective view 582*a* and be rotated from the second perspective view objects clockwise towards the inside of the screen until they appear to be in third perspective view 584*a* (e.g., going into the display screen).

In some embodiments, processing circuitry 306 may rotate, in a clockwise direction towards the surface normal of the screen, a third portion of the row that includes the third media guidance object while the second portion of the row that includes the first media guidance object remains stationary. For example, the third media guidance object may be media guidance object 514*a*. The third portion of the row may include the media guidance objects in screen 500*a* that are shown to the left of media guidance object 510*a* (including media guidance object 514*a*). Rotating the third portion of the row in a clockwise direction towards the surface normal while keeping the second portion stationary makes the media guidance objects included in the third portion appear as coming out of the screen. In some implementations, the third portion is rotated to an angle having a value greater than 180 degrees but less than 270 degrees relative to a line that is perpendicular to the surface normal of the screen and that intersects the third portion.

The media guidance objects displayed in each of the different perspective views may appear to lie along or within planes oriented in different directions. For example, media guidance object 514*a* in first perspective view 580*a* may appear to lie along or within a first plane having a normal that intersects a first portion of a normal of the display screen, where the first portion of the normal of the display screen extends out of the screen towards a user. The first plane may be oriented such that a line within the first plane is perpendicular to the normal of the first plane and parallel to the surface of the display screen. Media guidance object 510*a* in second perspective view 582*a* may lie along or within a second plane where the face of the second plane is parallel to the surface of the display screen. Media guidance object 514*a* in third perspective view 580*a* may appear to lie along or within a third plane having a normal that intersects a second portion of the normal of the display screen, where the second portion of the normal of the display screen goes into the display screen away from the user. The third plane may be oriented such that a line within the third plane is perpendicular to the normal of the third plane and parallel to the surface of the display screen.

The second plane may intersect the first plane and the line 570*a* formed by the intersection of the first and second planes may create the appearance of a first fold or crease in the display screen. The second plane may intersect the third plane and the line 572*a* formed by the intersection of the second and third planes may create the appearance of a second fold or crease in the display screen. In some implementations, the first and third planes may be parallel to each other and may be spaced apart from each other at a distance equal to the distance between lines 570*a* and 572*a* created by their intersections with the second plane. In some implementations, the first plane may form a first angle with the second plane and the third plane may form a different second angle with the second plane such that at some point the first and third planes intersect each other.

In some implementations, the media objects that are displayed to appear flat on the screen (e.g., in second perspective view 582*a*), may be selected by the user. Processing circuitry 306 may be programmed to only allow selections of a media guidance object that is displayed in second perspective view 582*a*. In particular, in order to select a desired media guidance object displayed in any perspective view other than second perspective view 582*a*, the user may instruct processing circuitry 306 (e.g., by pressing a suitable control button) to slide or otherwise bring the desired media guidance object into second perspective view 582*a*.

Figure 5B:
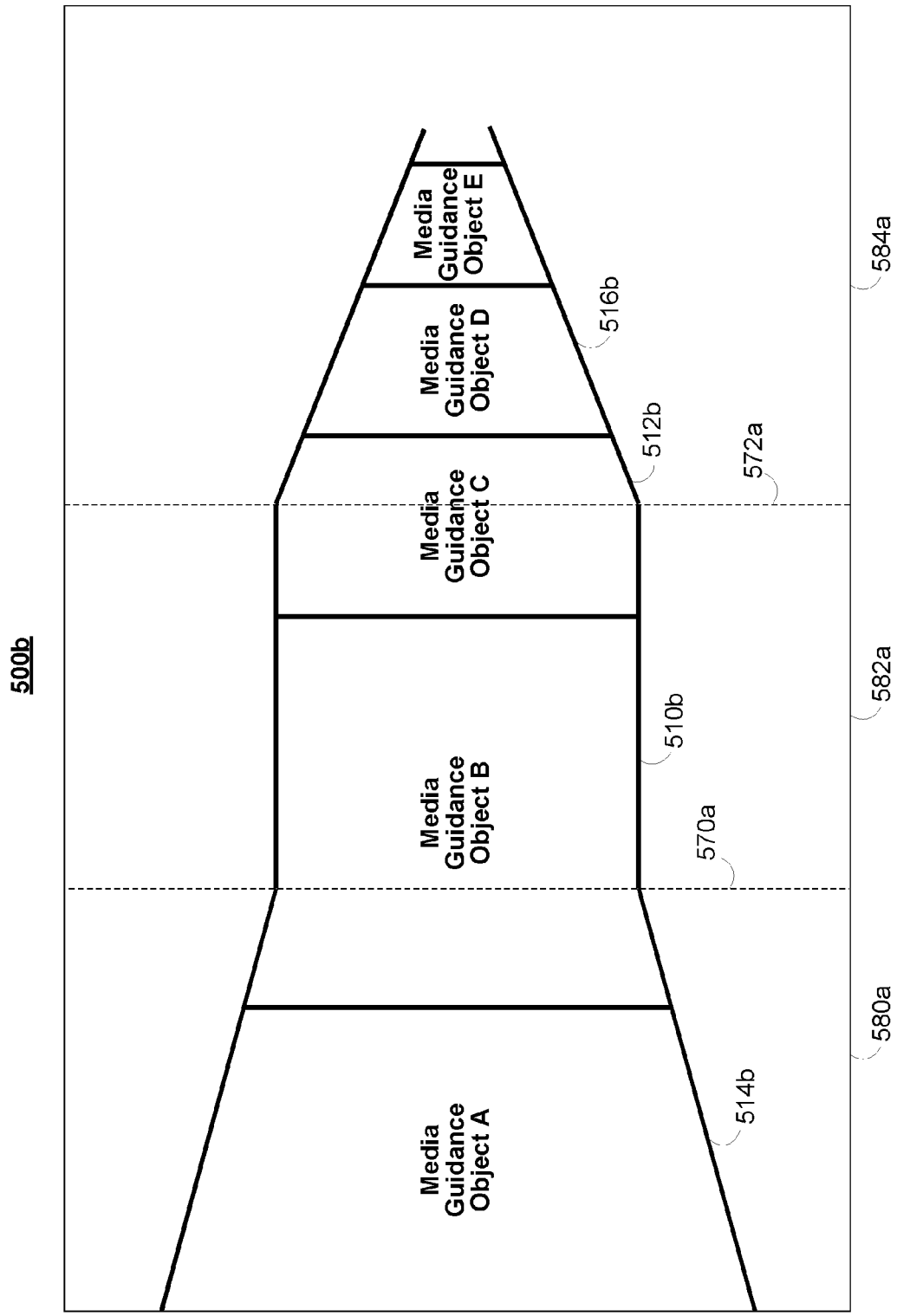

For example, when a user desires to select media guidance object 512*a*, the user may press a right direction key (e.g., a right arrow button) once to instruct processing circuitry 306 to slide media guidance object 510*a* out of second perspective view 582*a* into first perspective view 580*a* (or remove media guidance object 510*a* from the display (not shown)) and slide media guidance object 512*a* into second perspective view 582*a*. FIG. 5*b* provides a screen 500*b* illustrating a snapshot of the movement of media guidance objects when the user presses a right direction key to instruct processing circuitry 306 to slide the media guidance objects towards the left. For example, as shown in screen 500*b*, media guidance object 516*b* may appear to gradually be getting larger (compared to the same media guidance object when in the previous position, shown as media guidance object 516*a*) and thereby closer within third perspective view 584*a*. In particular, media guidance object 516*b* gradually is moved to a new position where media guidance object 512*a* was displayed within third perspective view 584*a* as media guidance object 512*a* is gradually moved into second perspective view 582*a* shown as media guidance object 512*b*. Media guidance object 512*b* appears to slide through fold 572*a* into second perspective view 582*a* while media guidance object 510*b* appears to slide through fold 570*a* into first perspective view 580*a*. At the end of the slide operation, media guidance object 510*a* may be displayed in a position within first perspective view 580*a* (shown as 510*c* (FIG. 5*c*)) where media guidance object 514*a* was displayed; media guidance object 512*a* may be displayed in a position within second perspective view 582*a* (shown as 512*c* (FIG. 5*c*)) where media guidance object 510*a* was displayed; and media guidance object 516*a* may be displayed in a position within third perspective view 584*a* (shown as 516*c* (FIG. 5*c*)) where media guidance object 512*a* was displayed. In some implementations, first perspective view 580*a* may be static such that during a slide operation, media guidance object 514*a* remains stationary while media guidance object 510*a* is removed from the display and media guidance object 512*a* slides from third perspective view 584*a* through fold 572*a* into second perspective view 582*a*.

The user may then select (e.g., by pressing an OK button) media guidance object 512*a* that is now displayed in second perspective view 582*a*. Similarly, when the user desires to select media guidance object 516*a*, the user may press the right arrow button twice to slide media guidance objects 510*a* and 512*a* into different perspectives (or remove them from the display) and slide into second perspective view 582*a* media guidance object 516*a*.

As defined herein, the term "slide" or "sliding" refers to the visual appearance of contiguous portions of a media guidance object being moved from a first perspective view into a second perspective view at a particular speed such at a given point in time one portion of the media guidance object is displayed in the first perspective view and another portion of the media guidance object is displayed in the second perspective view. The speed at which the contiguous portions of media guidance object are moved from one perspective view into another may be reflect how long in time it takes to move all the portions of the media guidance object from one perspective view into another perspective view. In particular, a media guidance object may not be moved instantaneously from one perspective view into another but may appear to slide at a constant or dynamic speed (or rate) over time.

For example, when the user instructs processing circuitry 306 to slide a media guidance object into another perspective view, the media guidance object may be moved to the another perspective view during a one second time interval (i.e., it may take one second to move all the portions of the media guidance object from one perspective view into another). The speed at which the portions of the media guidance objects are moved between perspective views may be pre-configured or adjustable (e.g., manually or automatically).

Similarly, the user may select media guidance object 514*a* by pressing a left direction key (e.g., a left arrow button) to instruct processing circuitry 306 to slide media guidance object 514a towards the right and into second perspective view 582a and at the same time slide media guidance object 510a into third perspective view 584a (or remove the media guidance object from the display). The other media guidance objects 512a and 516a in third perspective view 584a may be shifted towards the right to make visual room for media guidance object 510a in third perspective view 584a. In some situations, media guidance object 516a may disappear from the display or be difficult to read when the media guidance objects in third perspective view 584 are shifted since it would appear smaller after being shifted.

In some implementations, processing circuitry 306 may be instructed to slide a media guidance object from third perspective view 584a into second perspective view 582a and at the same time a media guidance object displayed in second perspective view 582a into a fourth perspective view (not shown) instead of into first perspective view 580a. In particular, instead of sliding the media guidance objects along the array, media guidance object 510a which is displayed in the middle perspective view of the array, may be removed from the array in a sliding manner into a fourth perspective view.

The fourth perspective view may have objects with lines that have a vanishing point at a location on the screen opposite the location of vanishing point 522a. More specifically, the media guidance objects displayed in the fourth perspective view may appear to be going into a portion of the screen opposite that of the media guidance objects displayed in third perspective view 584a. In particular, the media guidance objects displayed in the fourth perspective view may appear as though they are behind objects displayed in first perspective view 580a. In addition, the media guidance objects displayed in first perspective view 580a may be or may become partially transparent to allow the user to see both the media guidance objects displayed in first perspective view 580a and the media guidance object that slides into the fourth perspective view behind the media guidance object displayed in the first perspective view 580a.

Alternatively, selections of media guidance objects displayed in other perspective views may be performed without sliding those media guidance objects into second perspective view 582a. For example, a cursor may be moved within any of the perspective views to select any media guidance object displayed in the screen. In particular, when the cursor is moved within a perspective view that appears to go into the screen, the cursor may gradually appear to decrease in size and highlight the various media guidance objects displayed in that particular perspective view.

In some implementations, the media guidance object may instantaneously be moved by way of a jump operation from one perspective view into another instead of sliding. In particular, in such scenarios, the user may instruct processing circuitry 306 to shift or move the media guidance objects left or right such that a media guidance object from a first perspective view instantaneously appears in a second perspective view and the media guidance object that was displayed in the second perspective view instantaneously disappears. In some implementations, a combination of a slide and jump operations may be provided. For example, a media guidance object may jump from a first perspective view into a second perspective view while the media guidance object that was in the second perspective view may slide out of the second perspective view elsewhere (e.g., disappear completely or slide into another perspective view).

In some implementations, media guidance objects 510a, 512a and 516a may be part of an ordered sequence of media guidance objects. For example, media guidance objects 510a, 512a and 516a may be media asset recommendations that are ordered alphabetically or based on a level of relevance to the user. Accordingly, media guidance object 510a which is displayed in second perspective view 582a may come earlier alphabetically or may be more relevant to the user (i.e., may come earlier in the ordered sequence) than media guidance objects 512a and 516a which are displayed in third perspective view 584a. Similarly, media guidance object 514a which is displayed in first perspective view 580a may come earlier alphabetically or may be more relevant to the user (i.e., may come earlier in the ordered sequence) than media guidance object 510a which is displayed in second perspective view 582a and media guidance objects 512a and 516a which are displayed in third perspective view 584a.

In some implementations, media guidance objects 510a, 512a and 516a may be media asset representations that are placed in order based on at least one attribute (e.g., a title, broadcast date/time, release date, runtime, length, content type, subject matter type, critics rating) of the media asset representation. For example, media guidance objects 510a, 512a and 516a may be placed in order such that the media guidance objects that are positioned earlier in the sequence (e.g., to be viewed before other media guidance objects) have a shorter runtime than media guidance objects that are positioned later in the sequence or vice versa. For example, media guidance objects 510a, 512a and 516a may be placed in order such that the media guidance objects that are positioned earlier in the sequence (e.g., to be viewed before other media guidance objects) correspond to a particular subject matter category than media guidance objects that are positioned later in the sequence or vice versa. For example, media guidance objects 510a, 512a and 516a may be placed in order such that the media guidance objects that are positioned earlier in the sequence (e.g., to be viewed before other media guidance objects) have a higher critics rating than media guidance objects that are positioned later in the sequence or vice versa.

It should be understood that although the media guidance objects are shown as occupying a certain portion of the screen, each media guidance object may occupy a larger or smaller portion of the screen. It should further be understood that although the media guidance objects are represented as rectangular shapes, any other shape (e.g., circle, square, triangle or other polygon) or combination of different shapes may be used for the media guidance objects (e.g., one media guidance object may be circular in shape while another may be triangular in shape). It should also be understood that although the media guidance objects are displayed along the horizontal of the screen from left to right, the media guidance objects may be displayed along the vertical of the screen from top to bottom. For example, a media guidance object may be displayed in a first perspective on the top of the screen and other media guidance objects may be displayed in a second perspective underneath the media guidance object displayed in the first perspective. Accordingly, the line of the fold at the point of adjacency between the media guidance objects of the first and second perspective views would appear as going along the horizontal axis of the screen whereas the line of the folds shown in screen 500a appears as going along the vertical axis of the screen.

It should be understood that any of the media guidance objects shows and described above and below as being adjacent to each other, whether they are adjacent within a particular perspective view or between two different perspective views, may be immediately adjacent to each other (e.g., appear to be touching or connected to each other), or may have some spacing of suitable amount (or have other data or objects) between the adjacent objects to make it easier to distinguish between any adjacent objects. In some implementations, the media guidance objects may be adjacent to each other at the vertical or horizontal edges or sides of the media guidance objects. For example, two or more media guidance objects that are square or rectangular in shape may be connected to each other and adjacent such the right edge of one square media guidance object touches or substantially touches the left edge of another adjacent square media guidance object.

In some embodiments, the media guidance objects that are displayed in different perspectives may be user profile representations. In particular, the user may view the various profiles that are stored as an array of media guidance objects and select a desired user profile. The selected user profile representation may be used to retrieve a corresponding user profile to log the user associated with that user profile into user equipment device 300.

FIG. 5d shows an illustrative display screen 500d of user profile representations displayed in different perspectives in accordance with an embodiment of the invention. In particular, screen 500d illustrates the implementation where the media guidance objects discussed in connection with screens 500a-c are user profile representations. For example, screen 500d may include a first user profile representation 514d displayed in a first perspective view, a second user profile representation 510d displayed in a second perspective view and third and fourth user profile representations 512d and 516d displayed in a third perspective view. First user profile representation 514d may correspond to first media guidance object 514a, second user profile representation 510d may correspond to second media guidance object 510a, third user profile representation 512d may correspond to third media guidance object 512a, and fourth user profile representation 516d may correspond to fourth media guidance object 516a.

A user profile representation may be a photograph, a video, an icon, a sketch, or any other visual indicator that is unique to a particular user that allows the user to associate the particular user profile representation with the profile of the user. For example, a picture of the user (e.g., Stewie) may be displayed as the user profile representation indicating to Stewie that the user profile representation is associated with Stewie's user profile. Selection of the user profile representation (as discussed above) may instruct processing circuitry 306 to login the user Stewie into user equipment device 300. In some implementations, each user may have multiple user profiles each including preferences associated with different moods of the user. For example, when the user is sad, the user may have a profile setup with preferences targeted towards cheerful content or media assets (e.g., action or comedies) to counterbalance the sad mood of the user. In another situation, when the user is happy, the user may have a profile setup with preferences targeted towards other type of content or media assets or the same cheerful content or media assets (e.g., romance or drama media assets). In such scenarios, each user profile representation may correspond to a different one of the profiles that are associated with the different moods of the particular user.

A textual indicator 540d may be displayed next to each user profile representation. Textual indicator 540d may provide the name of the user associated with a particular user profile representation (not shown). In some implementations, textual indicator 540d is only displayed with the user profile representation displayed in the second perspective view (shown).

The functionality discussed above in connection with the media guidance objects displayed in screen 500a applies in a similar manner to the user profile representations displayed in screen 500d. For the sake of brevity the functionality of selecting and navigating about the user profile representations displayed in screen 500d is omitted but should be understood to be the same as the functionality of selecting and navigating about media guidance objects discussed in connection with screen 500a (FIG. 5a). In particular, the manner of selecting different user profile representations by, for example, sliding into the second perspective view user profile representations displayed in other perspective views or moving a cursor into the different perspective views to select a user profile representation may be performed in the same manner as discussed above in connection with FIG. 5a.

As shown in screen 500d, the user profile representations of each different perspective view may be displayed adjacent one another to form a continuous array 530d of user profile representations. As discussed above in connection with FIG. 5a, continuous array 530d may include folds at the points of adjacency between the user profile representations displayed in one perspective view and the user profile representation displayed in another perspective view. For example, continuous array 530d may include a first fold 520d at the point of adjacency between user profile representation 514d and a first side (e.g., left side) of user profile representation 510d. Continuous array 530d may include a second fold 522d at the point of adjacency between user profile representation 512d and a second side (e.g., right side) of user profile representation 510d.

Folds 520d and 522d give the visual appearance of creases between user profile representations at the ends of each perspective view where a user profile representation from one perspective view meets or is adjacent to a user profile representation from another perspective view.

Screen 500d may also include a background 550b. Background 550d may be a currently tuned to television channel, media asset being played, an advertisement, or any other picture or video that can be seen through or as part of continuous array 530d of user profile representations. Audio may also be provided as the user navigates screen 500d.

In some embodiments, the media guidance objects that are displayed in different perspectives may be media asset representations. In particular, the user may view the various media asset representations that are stored as a continuous array of media guidance objects and select a desired media asset representation. The selected media asset representation may be used to retrieve a corresponding media asset from memory and playback the retrieved media asset on user equipment device 300.

Figure 6:
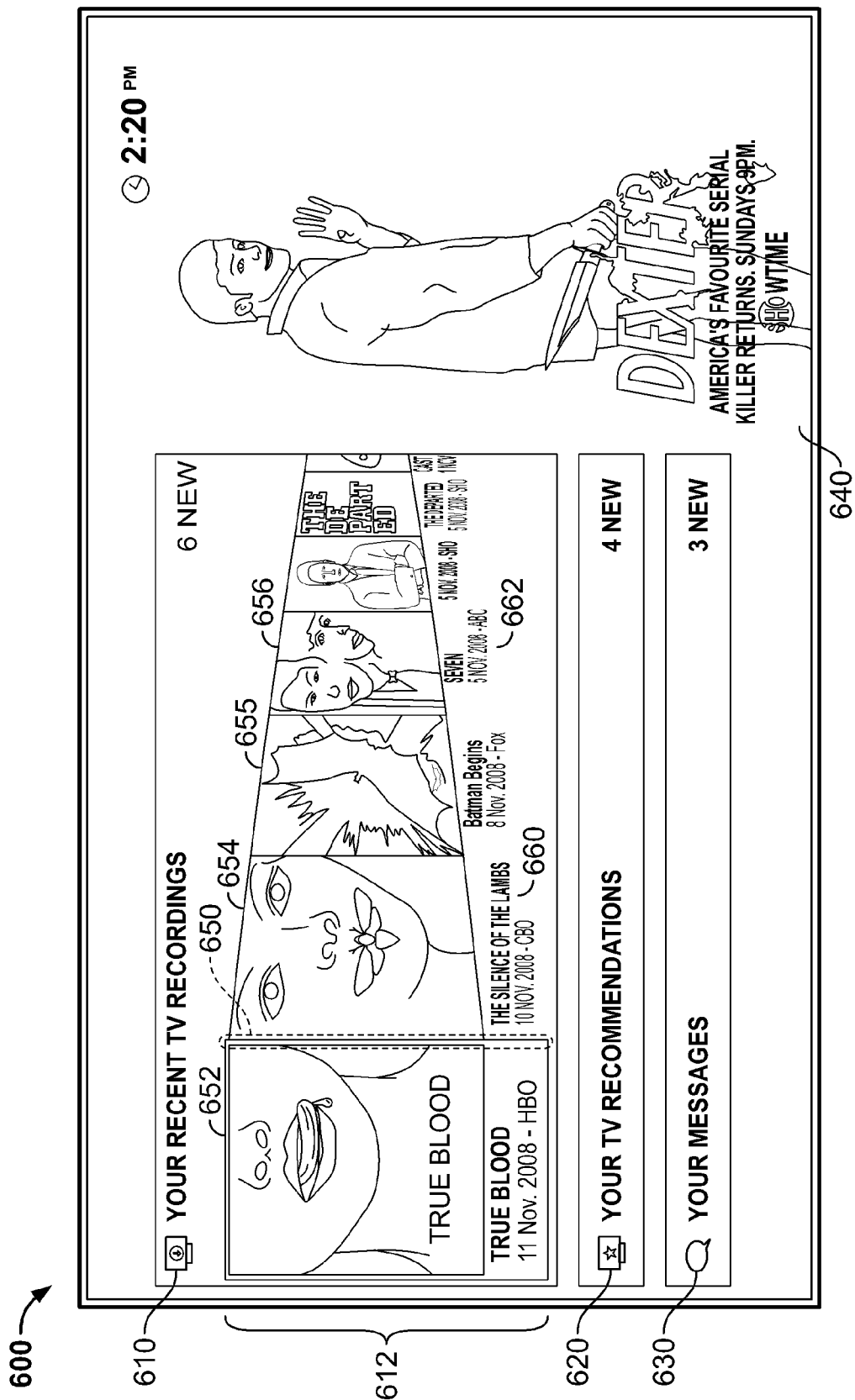
FIG. 6 shows an illustrative display screen of media asset representations displayed in different perspectives in accordance with an embodiment of the invention.

FIG. 6 shows an illustrative display screen 600 of media asset representations displayed in different perspectives in accordance with an embodiment of the invention. In particular, screen 600 illustrates the implementation where the media guidance objects discussed in connection with screens 500a-c are media asset representations. For example, screen 600 may include a recent program recordings menu region 610, a program recommendations menu region 620, a messages menu region 630 and an advertisement region 640.

Recent program recordings menu region 610 may display a first media asset representation 652 in a first perspective view and second, third and fourth media asset representations 654, 655 and 656 in a second perspective view. First media asset representation 652 may correspond to second media guidance object 510a (FIG. 5a), second media asset representation 654 may correspond to third media guidance object 512a and third media asset representation 655 may correspond to fourth media guidance object 516a. Although the media asset representations are displayed in only two perspective views, it should be understood that the media asset representations may be displayed in any number of perspective views, for example, in a similar manner as the three perspective view of media guidance objects of FIG. 5a.

It should be understood that as referred to above and below, a media asset representation is any photograph, video, icon, sketch, text, or other visual indicator or combination of the same that is unique to a particular media asset that allows the user to associate the particular media asset representation with the media asset. For example, a picture of the label of a show (e.g., TrueBlood) may be displayed as the media asset representation indicating to the user that the media asset representation is associated with the show TrueBlood. Selection of the media asset representation (as discussed above) may instruct processing circuitry 306 to playback or access the media asset associated with the media asset representation on user equipment device 300.

The media asset representations displayed in recent program recordings menu region 610 may correspond to media assets which are stored on user equipment device 300. In particular, media asset representations may correspond to a previously recorded television program, previously downloaded media asset or television program, previously transferred media asset, or any other suitable media asset that is readily available for access on user equipment device 300. Readily available for access could mean that the media asset was recorded on a remote device, such as, a server computer, and can be downloaded on-demand from that device upon request by the user. In particular, the media asset representations displayed in recent program recordings menu region 610 may correspond to locally stored or remotely stored media assets.

The user may browse the media asset representations displayed in recent program recordings menu region 610 in the same manner as discussed above in connection with FIG. 5a. For example the user may press a right arrow key to slide into the first perspective view a media asset representation from the second perspective view.

An indicator may be provided or displayed in recent program recordings menu region 610 indicating to the user the number of total available stored media assets. The indicator may also indicate the number of newly or most recently recorded media assets (e.g., in the past 7 days or any other suitable time frame).

Textual indicators 660 and 662 may be displayed next to a corresponding media asset representation. In particular, textual indicator 660 may provide the name or title of the media asset associated with media asset representation 654 and textual indicator 662 may provide the name or title of the media asset associated with media asset representation 656. In addition, textual indicators 660 and 662 may also provide other information about the media asset corresponding to the media asset representations, such as, a start time, channel, program source, short description or any other suitable information.

Textual indicators 660 and 662 may appear in accordance with the perspective view in which the corresponding media asset representation is displayed. In particular, textual indicator 660 corresponds to media asset representation 654 that appears closer than media asset representation 662 that corresponds to textual indicator 662. Accordingly, textual indicator 660 may be larger in size than textual indicator 662 to appear visually closer to the user.

The functionality discussed above in connection with the media guidance objects displayed in screen 500a applies in a similar manner to the media asset representations displayed in recent program recordings menu region 610. For the sake of brevity the functionality of selecting and navigating about the media asset representations displayed in recent program recordings menu region 610 is omitted but should be understood to be the same as the functionality of selecting and navigating about media guidance objects discussed in connection with screen 500a (FIG. 5a). In particular, the manner of selecting different media asset representations by, for example, sliding into the first perspective view media asset representations displayed in the second perspective view or moving a cursor into the second perspective view to select a media asset representation may be performed in the same manner as discussed above in connection with FIG. 5a.

Recent program recordings menu region 610 may display the media asset representations of each different perspective view adjacent one another to form a continuous array 612 of media asset representations. As discussed above in connection with FIG. 5a, continuous array 612 may include a fold at the point of adjacency between the media asset representations displayed in one perspective view and the media asset representation displayed in another perspective view. For example, continuous array 612 may include a fold 650 at the point of adjacency between media asset representation 654 and a first side (e.g., right side) of media asset representation 652.

The user may access program recommendations menu region 620 and messages menu region 630 by clicking the corresponding menu bar of those regions or pressing a down arrow key on a remote control. When the user presses the down arrow key while viewing recent program recordings in region 612, the recent program recordings menu region 612 may close (or collapse) leaving only a bar displayed that includes text identifying the type and/or number of media objects displayed in the menu. As a result of the user pressing the down arrow key, while viewing recent program recordings in region 612, program recommendations region 620 may open and display media asset representations corresponding to media asset recommendations in a continuous array similar to continuous array 612. Pressing the down arrow key again, may cause the media asset recommendations region to close, and open messages region 630 to display message representations corresponding to messages of the user in a continuous array similar to continuous array 612.

It should be understood, that any other type or number of menu bars may be displayed associated with different types of media guidance objects. It should also be understood that the menu bars may be displayed in any arrangement and order not limited to the exemplary arrangement and order shown in screen 600. For example, the menu bars may be displayed side-by-side or along a diagonal instead of on top of each other as shown. Alternatively, the menu bars may be displayed as tabs with visual indications that identify the type of media guidance objects that correspond to each menu. The media guidance objects may be displayed in the same region but the type of objects may change based on which tab is selected.

For example, as shown and described below in connection with FIG. 15, menu bars 1550 are displayed on the left portion of the screen and the media guidance objects corresponding to a selected menu bar are displayed in the same region of the screen on the right portion. As the user navigates to select different menu bars by, for example, pressing an up/down arrow key or using a movable cursor (e.g., mouse), media guidance objects associated with the selected menu bar are displayed in perspective similar to the manner in which media asset representations are displayed in program recommendations menu region 620.

Selection of program recommendations menu region 620, by pressing a down arrow key or using some other cursor or navigation tool, may cause media asset representations corresponding to media asset recommendations to be displayed in perspective similar to the manner of display provided in recent program recordings menu region 610. In particular, processing circuitry 306 may search for and find media assets that may be of interest or relevant to a user based on a user profile that is selected in, for example, screen 500b. The media assets that are found may be identified to the user as media asset representations using icons, images, videos, clips or any other suitable way in perspective similar to the manner in which media asset representations are displayed in region 610.

The user may navigate to and select a particular media asset representation that corresponds to a media asset recommendation. Processing circuitry 306 may allow the user to tune to, schedule for recording, schedule a reminder, place an order, or otherwise access the media asset associated with a selected media asset recommendation.

Selection of messages menu region 630, by pressing a down arrow key or using some other cursor or navigation tool, may cause message representations corresponding to user messages to be displayed in perspective similar to the manner of display provided in recent program recordings menu region 610. In particular, processing circuitry 306 may retrieve from memory or receive another device (e.g., BLACKBERRY, mobile phone or mobile device), the Internet, cable or satellite service provider, server or other suitable message providing service, messages for the user. The messages may be emails, SMS messages, MMS messages, service provider messages, emergency or service alerts or instant messages. The messages that are retrieved or received may be identified to the user as messages representations using icons, images, text or any other suitable way in perspective similar to the manner in which media asset representations are displayed in region 610.

The user may navigate to and select a particular message representation that corresponds to a message that is retrieved or received. Processing circuitry 306 may allow the user to view, respond, forward, delete, or otherwise access the message associated with a selected message representation.

Figure 7:
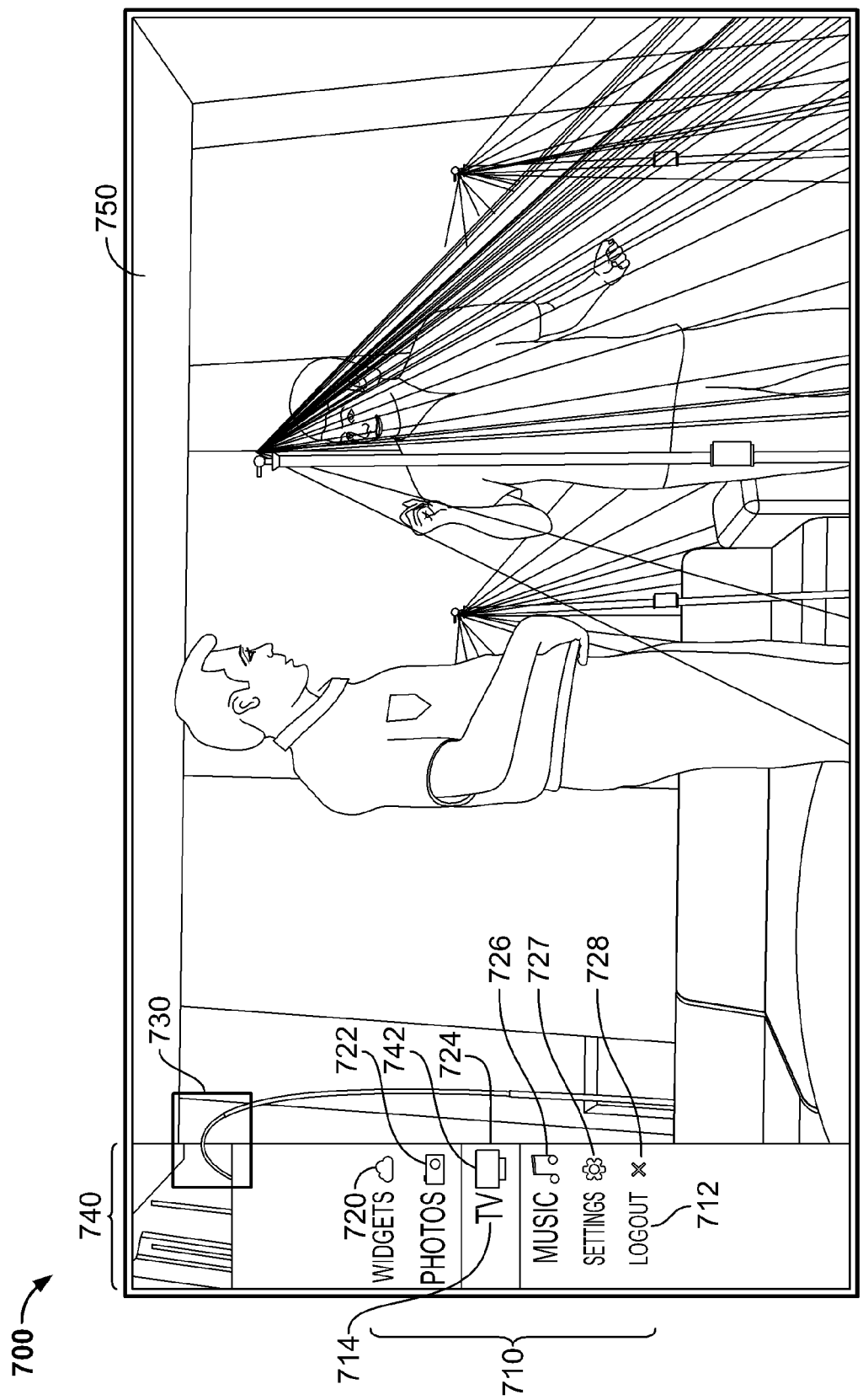
FIG. 7 shows an illustrative display screen of a main menu displayed in a menu bar of the media guidance application in accordance with an embodiment of the invention.

The user may also select a main menu key or press a left arrow key to navigate to the main menu of the media guidance application. FIG. 7 shows an illustrative display screen 700 of a main menu 710 displayed in a menu bar 740 of the media guidance application in accordance with an embodiment of the invention.

Menu bar 740 may be displayed on a side of the screen, such as, the top, left, right or bottom of the screen or in any other suitable location (e.g., the middle of the screen). Menu bar 740 may be displayed/accessed while viewing/accessing a media asset 750 by pressing a key (e.g., menu key or right arrow key) on a remote control. Although, media asset 750 is shown as a television program, it should be understood that media asset 750 may be an audio only program and in such a situation a background video or image may or may not be displayed in place of the television program. Also, although media asset 750 is shown as a television program, it should be understood that media asset 750 may be any other type of video such as a home video, live video, video conference and/or on-demand video/audio media.

It should be understood that although different keys are discussed above and below as being used to navigate through the media guidance application, the same function may be performed by using suitable voice recognition techniques. For example, the user may state a command (e.g., "move right"), and the processing circuitry 306 may respond in the same manner as a selection of a right arrow key on a remote control.

Menu bar 740 may be displayed simultaneously with a media asset 750 being played. For example, media asset 750 may be a television program (live or previously recorded) and menu bar 740 may be overlaid on top of the television program. Menu bar 740 may be partially transparent such that the media asset 750 and information (e.g., main menu 710) in menu bar 740 are viewable at the same time. In particular, both menu bar 740 and media asset 750 may appear in a same region 730 of the display.

Items of main menu 710 may be displayed in a perspective view. For example, the item in focus (e.g., the item which may be selected using a select command) may be displayed more prominently or larger than other items in main menu 710. In particular, items that are farther away from an item in focus may be smaller in size than the item in focus.

Items of main menu 710 may include a widgets item 720, photos item 722, television item 724, music item 726, settings item 727 and logout item 728. Selection of any of the items of main menu 710 may bring up a display of options, menus and/or media guidance objects associated with the selected item. For example, selection of music item 726 may bring up a display of media guidance objects that represent one or more playlists or media assets of a playlist.

In addition, selection of photos item 722 may navigate the user to a photo browser screen 1600 discussed below in connection with FIG. 16. Selection of music item 726 may navigate a user to a music browser that is similar to photo browser 1600 but in the context of music. In particular, whereas in photo browser screen 1600, album titles may be displayed on top of each other in a continuous array of pictures displayed in perspective corresponding to an album, the music browser may display each playlist or music album title on top of each other in a continuous array of music asset representations displayed in perspective corresponding to the playlist or music album.

Selection of logout item 728 may log the current user or users out of the media guidance application and navigate the user back to screen 500d (FIG. 5d) to allow another user to select a user profile representation and log in to the media guidance application. Selection of settings item 727 may allow the user to change options in the system such as the way media guidance objects are displayed, reminder times, add/remove/edit user profiles, select which types of media guidance objects to display in perspective views and which types not to display in perspective views, or setup an Internet connection (e.g., user passwords, router passwords, or any other account preferences).

Each displayed item may include a visual indicator, text 714 and/or icon 742, that identifies the content associated with the item to the user. For example, widgets item 720 may include a cloud icon that identifies to the user that widgets item 720 is associated with Internet delivered content and applications. Similarly, photos item 722 may include a camera icon and television item 724 may include a television icon. The visual indicators may be displayed in perspective as the items of main menu 710 are displayed in perspective. In particular, the visual indicators that are further away from an item in focus may be gradually smaller in size.

Selection of widget item 720 may display a submenu bar 820 (FIG. 8) with items that correspond to the selected widget item. For example, the items displayed in submenu bar 820 may include different types of widgets that are available for the user to select. Some of the widgets may include different webpages, weather applications, sports applications, chat applications, stock applications, social networking applications or any other suitable application that can be provided in the form of a widget. The widgets specifically are modular applications that may be displayed as small graphical elements that may be interactive or static.

Selection of television item 724 may display a submenu bar 820 (FIG. 8) with items that correspond to the selected item. Submenu bar 820 may be displayed adjacent to menu bar 740 or anywhere else on the screen. In some implementations, after the user selects an item from menu bar 740, processing circuitry 306 may shorten menu bar 740 so that it continues to inform the user of the items available in menu bar 740 while occupying a smaller region on the screen.

Figure 8:
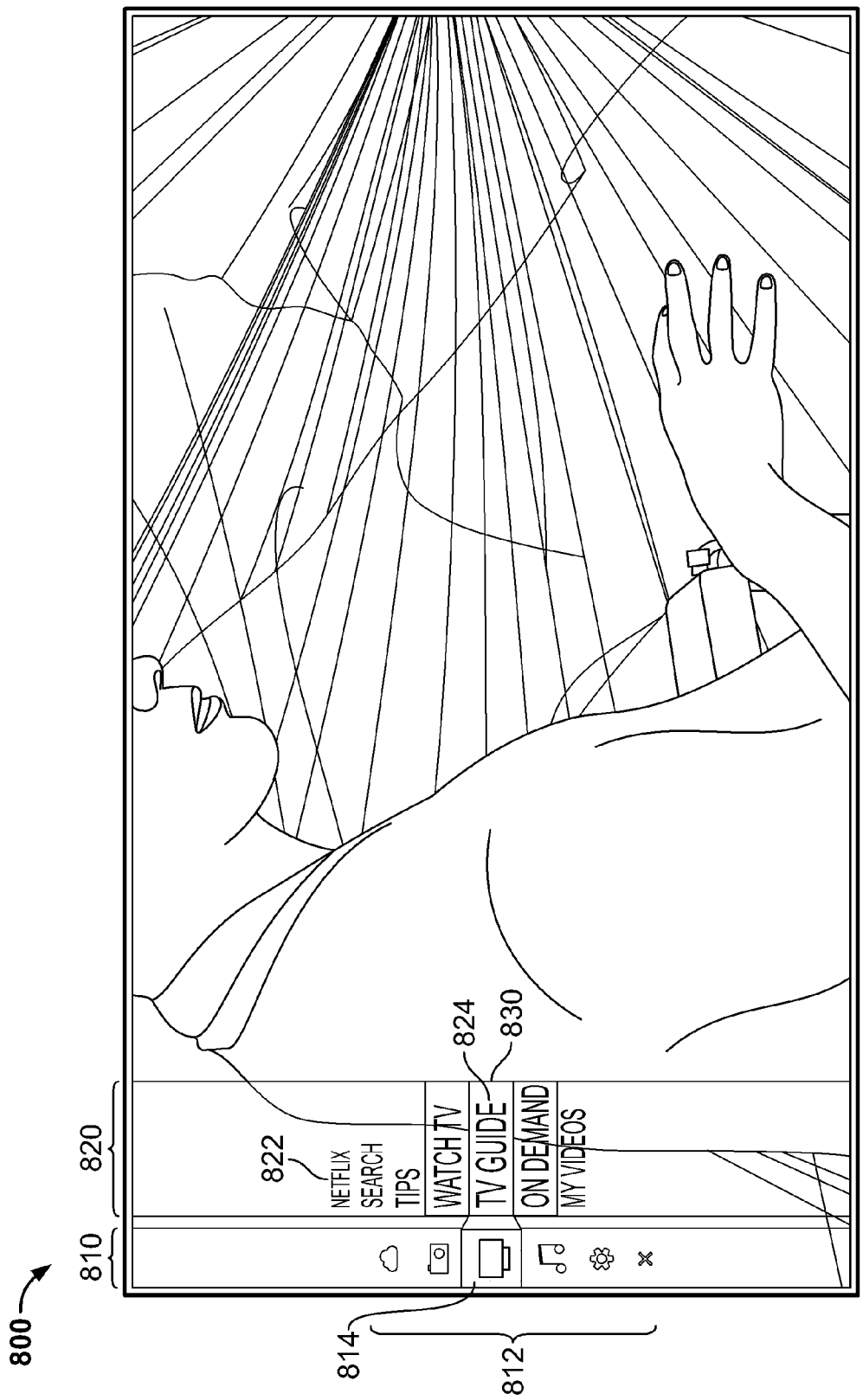
FIG. 8 shows a display screen of menu bar and submenu bar in accordance with an embodiment of the invention.

FIG. 8 shows a display screen 800 of menu bar 810 and submenu bar 820 in accordance with an embodiment of the invention. In particular, menu bar 810 may only display one type of visual indicator (e.g., an icon) that identifies each item of menu bar 740. Menu bar 810 may include a visual indicator (e.g., a highlight region) that identifies to the user which item was selected from menu bar 810 for which submenu bar 820 displays the corresponding items.

For example, the user may select television item 814 and a highlight region may be displayed over the television icon indicating that selection. Submenu bar 820 may display items corresponding to the television item 814 adjacent to the menu bar 810. In particular, submenu bar 820 may include a program guide item 830, an online movie vendor item 822, program search item, a watch television item, and any other suitable item related to or corresponding to television viewing. The items in submenu bar 820 may displayed in perspective similar to the manner of display of items in menu bar 740.

The user may navigate to different items in submenu bar 820 by, for example, pressing an up/down arrow key. The user may navigate back to menu bar 810 by, for example, pressing a left arrow key. In some implementations, menu bar 810 and submenu bar 820 may be displayed along the top or bottom of the screen. In such circumstances, the user may navigate to items within one of the menu bars by pressing a right/left arrow key and may navigate to and from the menu bars by pressing an up/down arrow key.

In some implementations, media guidance objects may each correspond to one or more entries in a program guide (e.g., a television program guide). In particular, different portions of the media guidance object may correspond to different available programs that are broadcast, provided on-demand, provided over pay-per-view sources or otherwise available during a particular time interval. Selection of program guide item 830 may cause processing circuitry 306 to display a program schedule information having perspective views. In particular, selection of program guide item 830 may cause processing circuitry 306 to display, in different perspectives, media guidance objects that correspond to program scheduling information.

Figure 9:
FIG. 9 shows an illustrative display screen of program scheduling information displayed in different perspectives in accordance with an embodiment of the invention.

FIG. 9 shows an illustrative display screen 900 of program scheduling information displayed in different perspectives in accordance with an embodiment of the invention. In particular, screen 900 illustrates the implementation where the media guidance objects discussed in connection with screens 500a-c represent program scheduling information. For example, screen 900 may include program source information region 950 displayed in a first perspective view, program schedule information region associated with a first time interval 910 displayed in a second perspective view and program schedule information region associated with second and third time intervals 920 and 930 displayed in a third perspective view. Program source information region 950 may correspond to first media guidance object 514a, program schedule information region (e.g., program listings display region) associated with the first time interval 910 may correspond to second media guidance object 510a, program schedule information region (e.g., program listings) associated with the second time interval 920 may correspond to third media guidance object 512a, and program schedule information region (e.g., program listings) associated with the third time interval 930 may correspond to fourth media guidance object 516a (FIG. 5a).

Program source information region 950 may include text (e.g., source name), icons (e.g., source logo), or any other visual indicator that is unique to a particular program source that allows the user to associate the program source information with the program source of the programs. Program sources may include any television channels, Internet websites (e.g., HULU.com), user devices, servers, or any other delivery source or device of media assets. In some embodiments, the program sources may be television channels that are provided by cable or satellite or some other transmission source. In particular, some of the program sources that are television channels may be provided by a first transmission source having a first transmission scheme (e.g., satellite) and some of the program sources that are television channels may be provided by a second transmission source having a second transmission scheme that is different from the first transmission scheme (e.g., cable). An identifier may be included in the program source information region 950 with each program source to indicate the transmission source of the program source.

Although the program source and scheduling information is shown as a full screen display, program source and scheduling information may be displayed in any differently sized smaller portions of the screen.

When the user first enters screen 900, processing circuitry 306 may highlight or bring into focus the program listings corresponding to the currently tuned program or program being currently accessed. The currently tuned or accessed program may also be displayed behind the program schedule information. In particular, program schedule information displayed in screen 900 may be partially transparent such that both the program schedule information and the currently tuned to or accessed program can be seen simultaneously. Information about the currently tuned to or accessed program may also be displayed at, for example, the bottom of the screen. The information may include the title or name of the program or media asset being accessed, the program source of the program or media asset and a short description of the program or media asset.

The user may navigate within portions of the media guidance objects to select a desired program listing corresponding to a media asset. For example, the user may navigate up/down within program source information region 950 to select a desired program source. The program source information (e.g., channel indicators) displayed within program source information region 950 may appear similar to the manner in which items within menu bar 740 are displayed (FIG. 7). In particular, program sources that are not in focus and that are further away from the program source in focus may be displayed as text or information that is gradually smaller in size than the text or information that is displayed for the program source in focus. Alternative, program sources that are not in focus and that are further away from the program source in focus may be displayed as text or information that is gradually decreasing in brightness (or less bright) (e.g., with a fading effect) than the brightness of the text or information that is displayed for the program source in focus.

Program listings associated with the selected program source or the program source that is in focus (e.g., program listings of media assets provided by the selected program source) may be displayed adjacent to the selected program source in a different perspective from the program source. In particular, program listings associated with the selected source may be displayed more prominently than the program listings associated with a different program source. For example, when program source (e.g., NBC) is selected, program listings provided by the program source may be displayed in an expanded view to provide more information than the displayed program listings associated with another program source.

In some implementations, the program listings associated with a selected program source may include the display of a video, picture, icons, textual descriptions, runtime, broadcast time, episode information or other data in addition to the title of a particular media asset corresponding to the program listing. In particular, while program listings associated with program sources that are not in focus may only display titles of media assets associated with the program listings, program listings associated with the selected program source may include the display of a video, icons, textual descriptions, runtime, broadcast time, episode information or other data in addition to the title of a particular media asset corresponding to the program listing. In some embodiments, the displayed video may be a promotional clip, advertisement or other information associated with the media asset corresponding to the program listing.

In some implementations, only one program listing corresponding to the selected program source is displayed in the second perspective view while the other program listings corresponding to the selected program source (i.e., the program source in focus) are displayed in the third perspective view. It should be understood, however, that more than one program listing corresponding to the selected program source may be displayed in the second perspective view and the user may navigate to and select the desired program listing.

In some embodiments, all the program listings displayed in the second perspective view correspond to media assets that are broadcast during a particular time interval. For example, all the program listings displayed in the second perspective may be associated with media assets that are broadcast between 4-5 PM. The program listings displayed in the second perspective view may correspond to any range of time intervals (e.g., one hour, half-hour or any other range). In particular, although the time interval range shown in FIG. 9 is one hour long, any other length may be provided. In some implementations, the program schedule may display a title, video and/or other program identification information of each program broadcast on the television channels or program sources for each time interval that is displayed in the program schedule during which the corresponding program is broadcast.

In some implementations, some of the program listings displayed in the second or third perspective views may correspond to video-on-demand media assets or previously recorded media assets. In such scenarios, the program listings corresponding to on-demand media may appear through the entire row corresponding to a particular on-demand source. In particular, the display of on-demand media program listings may not be dependent upon time intervals. In some implementations, program sources may represent different genre categories (e.g., comedy or drama). In such circumstances, program listings displayed adjacent to a particular program source that represents a genre category may correspond to media assets that are related to that particular genre category. These program listings may or may not organized according to time intervals depending on whether the program listings correspond to on-demand media or not.

More than one program listing may be displayed in any particular time interval for a particular program source, when the length of the media assets corresponding to the given time interval is shorter than the length of the time interval. For example, when the time interval length is one hour and program listings correspond to a show that has a half-hour run time (e.g., Judge Judy), more than one program listing may be displayed in the second perspective view for that time interval. More specifically, program schedule information region associated with a first time interval 910 (e.g., time interval of 4-5 PM) displayed in a second perspective view may include two program listings for the program source FOX. This may be because each of the two program listings is associated with a media asset, Judge Judy, that has a half-hour run time (e.g., a run-time that is half of the length of time interval 910).

Each program schedule information region may display information (e.g., titles) of media assets that are scheduled for a particular time interval. For example, program schedule information region associated with first time interval 910 may display the titles of programs that are broadcast between 4-5 PM, program schedule information region associated with second time interval 920 may display the titles of programs that are broadcast between 5-6 PM and program schedule information region associated with third time interval 930 may display the titles of programs that are broadcast between 6-7 PM. Each of the program schedule information regions may be displayed adjacent to each other in an ordered manner based on the time interval to which they correspond.

The program listing information (e.g., titles, video, icon, image, caption) displayed within each program listing in the program schedule information regions may appear similar to the manner in which items within menu bar 740 are displayed (FIG. 7). In particular, the information displayed in program listings that are not in focus and that are further away from the program listing in focus may be displayed as text or information that is gradually smaller in size than the text or information that is displayed for the program listing in focus. Alternatively, information displayed in program listings that are not in focus and that are further away from the program listing in focus may be displayed as text or information that is gradually decreasing in brightness (or less bright) (e.g., with a fading effect) than the brightness of the text or information that is displayed for the program listing in focus.

The user may press a right/left arrow key to browse through program listings in the time domain. For example, the user may press the right arrow key to bring into focus program listings that correspond to media assets that are broadcast later in time that are provided on the same program source. Similarly, the user may press the left arrow key to bring into focus program listings that correspond to media assets that are broadcast earlier in time that are provided on the same program source in focus. The user may select program listings that are displayed in program schedule information regions in the third perspective by sliding the program listings from the third perspective into the second perspective. For example, as discussed above in connection with FIGS. 5*a-c*, the user may press a right arrow key while viewing program listing 912 (that is displayed in the second perspective view) to cause program listing 922 that is displayed in the third perspective view to slide through a fold or crease (e.g., between the time interval in focus and later time intervals) into the second perspective view. Program listing 912 may be removed from the second perspective view to make room for program listing 922 in the second perspective view. It should be understood that program sources displayed in the first perspective view may be static such that as the program listings from later or earlier time intervals are brought into focus (by sliding or jumping), the program source information remains stationary in the display. The user may also select an option to hide the program source information and as a result, processing circuitry may generate the display of program listings corresponding to one time interval (e.g., the present time) displayed in a first perspective view and program listings corresponding to later time intervals displayed in a second perspective view without having the program source information region occupy space on the display screen.

The user may press up/down arrow keys to navigate to different program listings that are displayed within a program schedule information region that correspond to different program sources. In particular, as the user presses up/down arrow keys, program listings associated with different program sources may be brought into focus (e.g., presented in an expanded view). As the user navigates to the different program listings in the same program schedule information region, the program listings may be shifted down such that the program listings in focus that are displayed in the expanded view (where videos, icons and other program information is provided) are always in the same position (e.g., the center) of the screen. Alternatively, a cursor may be displayed that appears to move up/down through the program listings to allow the user to view and navigate to the program listings in another portion of the program schedule information region. In particular, the expanded view of the program information may appear to move up/down in the screen instead of remaining in the same location. To put it another way, the program listings that are in focus may move relative to the cursor (e.g., a highlight region indicating a selection of a program listing) or the cursor may move relative to the program listings.

As shown in screen 900, program information may appear as a continuous array 952 that includes the program source information displayed in a first perspective and the program schedule information displayed in second and third perspective views. The continuous array may appear to have a first fold between the program source information and the program schedule information region associated with first time interval 910. The continuous array may appear to have a second fold between program schedule information region associated with first time interval 910 and program schedule information region associated with second time interval 920.

The user may bring a desired program listing into focus by sliding the immediately adjacent program listings to the program listing in focus through the second fold into the second perspective view from the third perspective. The user may continuously cause the immediately adjacent program listings from the third perspective view to slide into focus until the desired program listing is in focus in the second perspective view. In some implementations, the user may bring into focus the desired program listing by instantaneously causing the immediately adjacent program listing from the third perspective view into the second perspective view. Alternatively, the user may navigate to a desired program listing by moving a cursor through and within the perspective views. For example, the user may move a cursor positioned over a program listing displayed in the second perspective view towards any of the program listings displayed in the third perspective view. Once a desired program listing is highlighted or selected, the user may perform a function for the media asset corresponding to the selected program listing by, for example, pressing a "confirm" key or other suitable key or indicate a confirm action verbally. The function performed may be tuning, scheduling for recording, setting a reminder, ordering, viewing detailed information, adding to playlist or any other suitable function.

Any of the navigation techniques using directional arrow and action keys (e.g., up/down/left/right and confirm/enter), discussed above and below, may be substituted or supplemented by suitable verbal commands that are interpreted to perform the same actions or cause the same respective set of instructions to be executed. Similarly, the navigation techniques may be substituted or supplemented by, for example, a laser pointing or motion sensitive device that is interpreted to perform the same actions or cause the same respective set of instructions to be executed.

Figure 10:
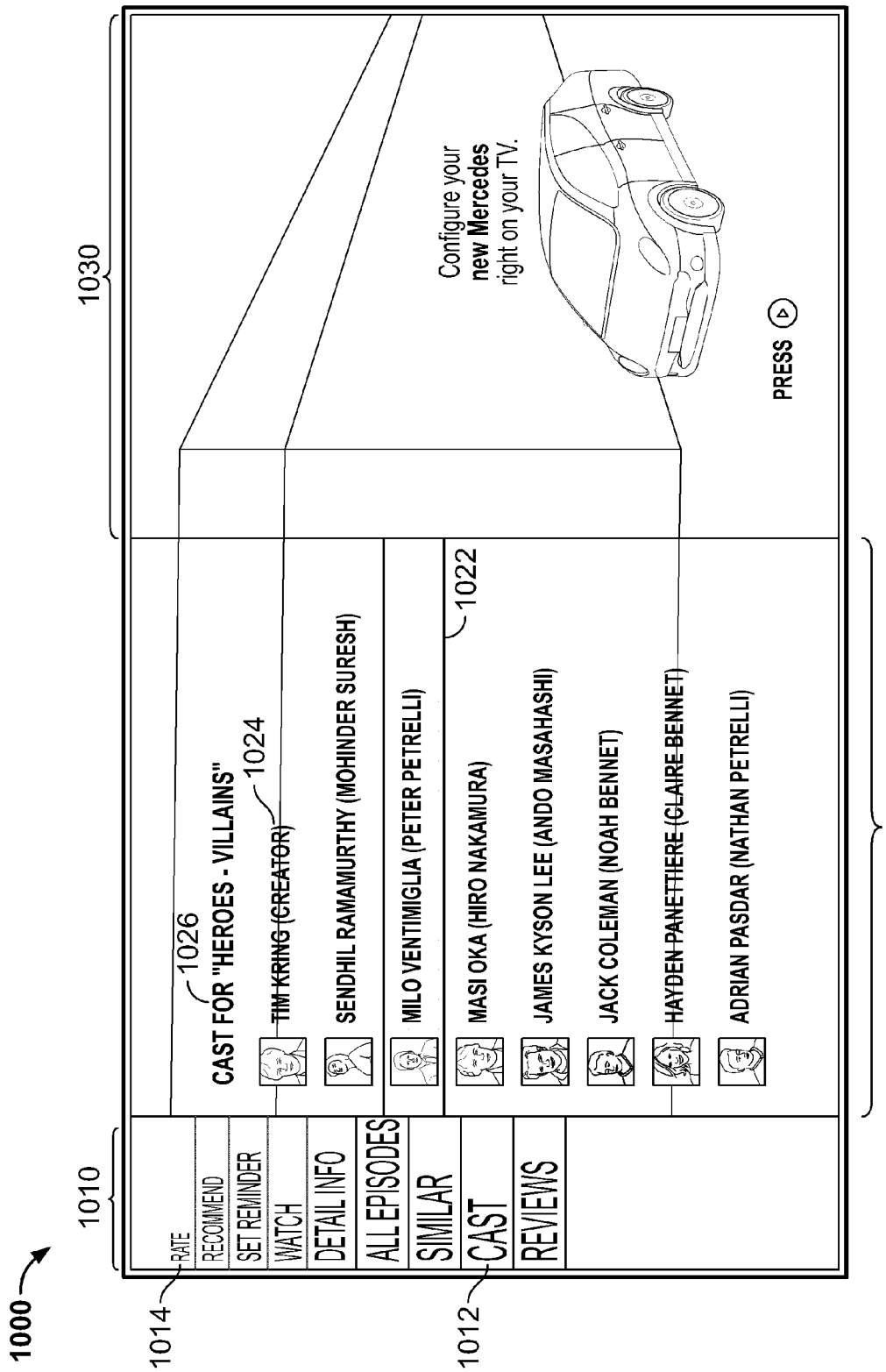
FIG. 10 shows an illustrative display screen of functions corresponding to a selected program listing displayed accordance with an embodiment of the invention.

FIG. 10 shows an illustrative display screen 1000 of functions corresponding to a selected program listing displayed accordance with an embodiment of the invention. Screen 1000 may include a functions menu bar 1010, function options region 1020 and a media region 1030.

Functions menu bar 1010 may display of list of indicators of functions associated with the media asset corresponding to the program listing selected from screen 900 (FIG. 9) or a media asset selected in accordance with other embodiments of the invention. Some of the functions that may be associated with a particular media asset may include requests for reviews, a list of the cast members, list of similar media assets, broadcast or schedule information of the media asset (which may include other air times of the media asset), a list of all episodes of the media asset, detailed description of the media asset, watch or access the media asset, set or schedule reminders for the media asset, schedule a recording for the media asset, provide a rating for the media asset.

Functions menu bar 1010 may display the list of functions in perspective relative to each other as shown and described above in connection with menu bars 810 and 820 (FIG. 8). For example, indicators that identify each of the functions in functions menu bar 1010 may be displayed in a way that indicators that are further away from the indicator in focus appear smaller or are more faded than the indicator in focus. In particular, the function indicator in focus may be "cast" 1012 and may have a first size. The indicator of a function that is not in focus may be "rate" 1014 which may have a second size that is different than the first size of the indicator of function "cast" 1012.

The indicators of functions displayed in functions menu bar 1010 may be brought into focus or selected by pressing an up/down key. It should be understood, that functions menu bar 1010 may be displayed horizontally on the screen (instead of vertically as shown). In such a scenario, functions may be brought into focus or selected by pressing right/left arrow keys.

Media region 1030 may provide a display of an advertisement, a video, a clip, the currently tuned television program, icon, image, text or any other suitable media. For example, media region 1030 may provide a video clip or textual description of the media asset corresponding to the program listing selected from screen 900 (FIG. 9) or a media asset selected in accordance with other embodiments of the invention. Media region 1030 may also be selectable (e.g., using a movable cursor or highlight region). In particular, when an advertisement is displayed in media region 1030, the user may position or otherwise select the advertisement. As a result of receiving a user selection of the advertisement, the user may be provided with options to place an order for an advertised product (e.g., pay-per-view media asset or some other tangible item), view or access content related to the advertisement.

Function options region 1020 may display a list of options or items relating to the indicator of the function in focus in functions menu bar 1010. As the user brings different indicators into focus, the list of options or items displayed in function options region 1020 may change to correspond to the indicator of the function in focus. In particular, the list of options or items displayed in function options region 1020 may change or be updated as each indicator of the function is brought into focus.

For example, when the "cast" function indicator is in focus and the user desires to bring the "detailed description" function indicator into focus which may be, for example, three indicators away from the "cast" function indicator, the list of options or items displayed in function options region 1020 may change three times. In particular, to bring the "detailed description" function into focus, the user may press an up arrow key three times. As each of the function indicators between the "cast" function and "detailed description function" is brought into focus, the list of options or items displayed in function options region 1020 may change. In particular, the first time the up arrow key is pressed, the list of options or items displayed in function options region 1020 may change to display options corresponding to "similar assets" function indicator, the second time, the list of options or items displayed in function options region 1020 may change to display options corresponding to "all episodes" function indicator and the third time, the list of options or items displayed in function options region 1020 may change to display options or items corresponding to "detailed description" function indicator.

For the sake of brevity, the discussion of the options or items provided in function options region 1020 is based on having the request for cast members function selected or placed in focus. However, any other function in functions menu bar 1010 may be selected in a similar manner (e.g., by placing the function focus or selecting the function with a moveable cursor or highlight region) and as a result the list displayed in function options region 1020 may be tailored to the particular function in focus.

Options or items provided in function options region 1020 when the "cast" function indicator is in focus may include a selectable list of all or most of the cast members that are present in the media asset corresponding to the selected program listing. For example, when the media asset corresponding to the program listing is "Heroes," a list of the cast members in Heroes may be displayed. The options or items that are provided in function options region 1020 may either be retrieved from local storage or from a remote server or website (e.g., via the Internet). For example, the list of cast members in the Heroes media asset may be retrieved from a local database that includes information about some or all of the media assets provided by a certain program source.

Alternatively, the list of cast members in the Heroes media asset may be retrieved from a remote server by accessing a link associated with the "cast" function indicator. For example, one or more of the function indicators may be associated with a link to the information for the options to provide in region 1020. As the user browses the different function indicators in bar 1010, the links associated with the functions may be accessed to retrieve the necessary information. In some embodiments, the links may be accessed before the user brings a particular function indicator into focus (e.g., the information may be pre-cached) to reduce any possible latency in the display of information in region 1020. This may allow the user to seamlessly browse for information associated with a selected media asset.

The items or options displayed in the list in region 1020 may be selected. For example, the user may select one of the cast member indicators (e.g., names or pictures) that is displayed in the list by, for example, pressing up/down arrow keys to position a highlight region 1022 over the desired cast member. The user may press an "enter" or "confirm" key to receive a display of information about the selected cast member. For example, the user may highlight or select the actor "Milo Ventimiglia" and as a result a display of information about that actor may be provided as shown in screen 1100 (FIG. 11).

In some embodiments, the information about the selected option or item may be provided in media region 1030. In some embodiments, media region 1030 may provide help information about the selected function indicator or informing the user about how to navigate between the different function indicators. The help information may also inform the user about the various options provided in region 1020.

In some embodiments, the options or items displayed in region 1020 when set reminder function is selected may allow the user to select when and/or where the reminder is provided. For example, the user may select an option or item to have the reminder provided five minutes before the media asset becomes available. Additionally, the user may select an option to provide the reminder for the media asset on another remote device (e.g., a mobile device) and to allow the user to access or record the media asset on the mobile device. Similarly, the options or items displayed in region 1020 when schedule recording function is selected (not shown) may allow the user to select when and/or where the media asset is to be recorded.

Figure 11:
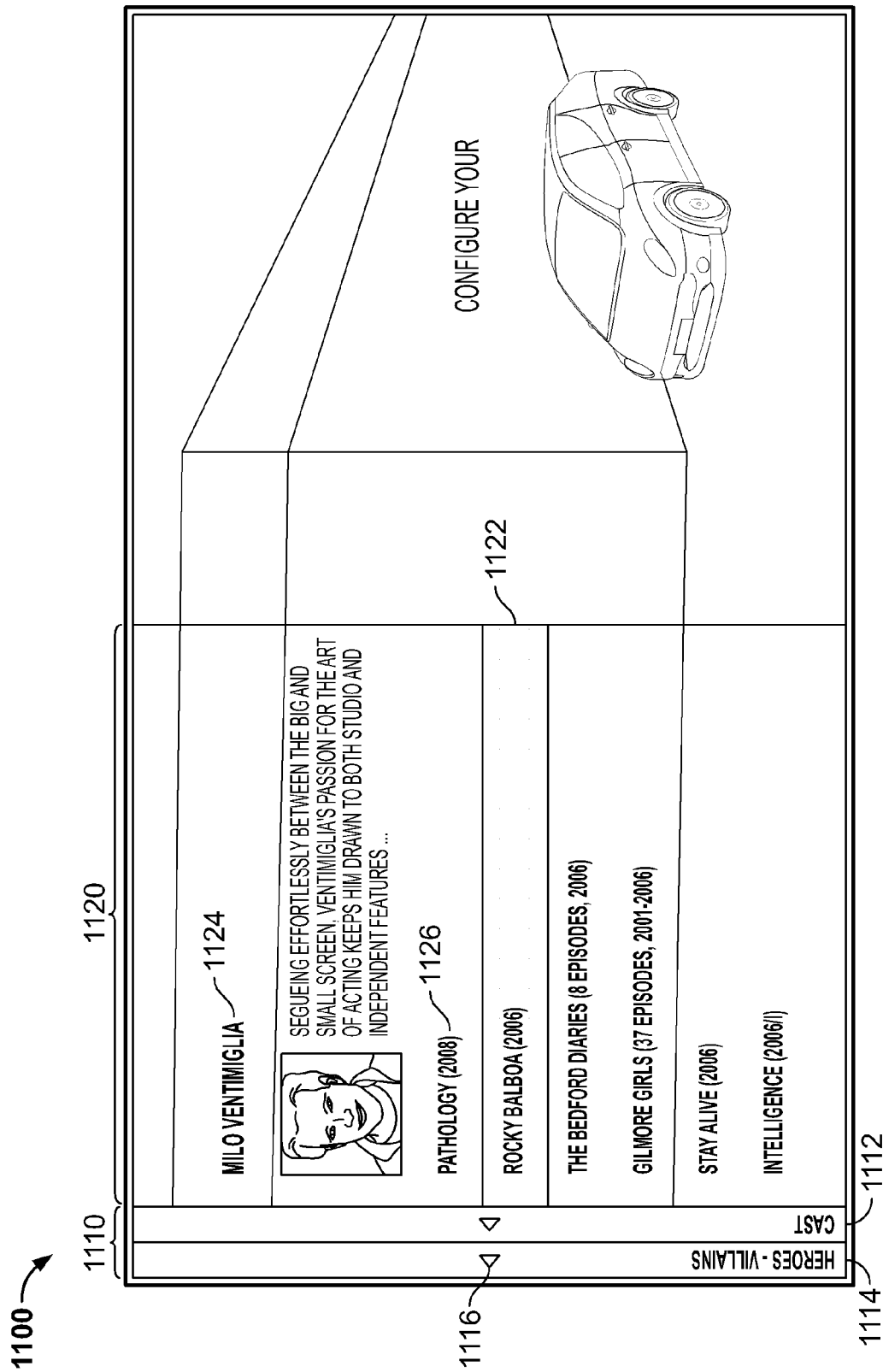
FIG. 11 shows an illustrative display screen of information corresponding to an option or item selected from a region on a screen in accordance with an embodiment of the invention.

FIG. 11 shows an illustrative display screen 1100 of information corresponding to an option or item selected from region 1020 in accordance with an embodiment of the invention. Screen 1100 may include a hierarchy of identifiers 1110, an information region 1120 and media region 1030.

The identifiers displayed in hierarchy of identifiers 1110 may correspond to previously selected items that are associated with a media asset. For example, as the user selects (or confirms selections) of items from previous menus, an identifier may be added to hierarchy of identifiers 1110 to remind the user of the previous selections. In particular, the user may first have selected a program listing corresponding to the media asset "Heroes." Accordingly, the first identifier 1114 in hierarchy of identifiers 1110 may identify the selection of the media asset "Heroes" by providing a picture, video, text or other information that identifies that media asset to the user. After the user selected the media asset, the user may have selected an item corresponding to a function from functions menu bar 1010 (FIG. 10) that provided a list of cast members. Accordingly, the second identifier 1112 in hierarchy of identifiers 1110 may identify the function "cast" from which the item selection was made by providing a picture, video, text or other information that identifies that function selection to the user. Second identifier 1112 may be displayed adjacent to and/or under first identifier 1114 of the first selection of the media asset.

The user may browse through prior selections in the hierarchy by, for example, pressing a left arrow key. For example, when "cast" is identified at the bottom of the hierarchy (indicating that items associated with the cast function where last displayed in region 1120), the user may press a left arrow key and as a result, the items associated with the cast function may be displayed in region 1120 in the same manner as shown in region 1020 (FIG. 10). Second identifier 1112 for the cast function may be removed from the hierarchy. A subsequent selection of the left arrow key may bring up a display in region 1120 of information corresponding to the selected media asset since as first identifier 1114 in the hierarchy may indicate a media asset selection. In some implementations, when only one identifier remains in the hierarchy, the identifier may be omitted from the display and information associated with that identifier may be indicated in region 1020. For example, the only identifier that remains in the hierarchy when the user presses the left arrow key may be the identifier that identifies a media asset. Additionally, the information displayed in region 1020 may include items of information corresponding to the cast as well as information indicating the media asset in which the cast is featured.

Information about the selected item from the items displayed in region 1020 may be displayed in region 1120. For example, when the actor (e.g., Milo Ventimiglia) is the item that is selected from the items corresponding to the "cast" function indicator, information about the actor may be displayed in region 1120. The information may include a picture of the actor, a short description about the actor and other media assets which feature the selected actor. The information may be retrieved from local storage or from a website or remote source via the Internet.

Figure 12:
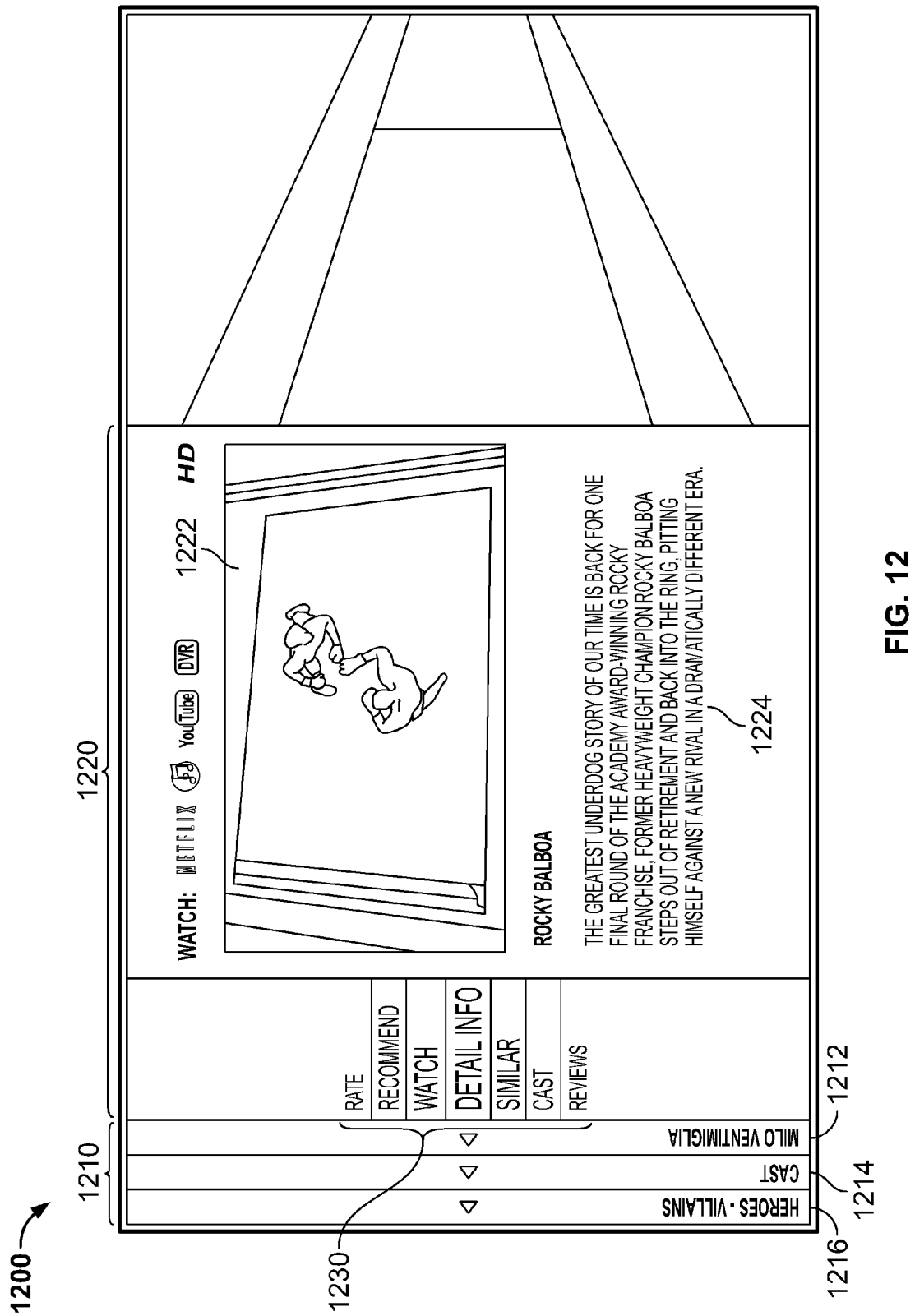
FIG. 12 shows an illustrative display screen of detailed information about a media asset in accordance with an embodiment of the invention.

The user may navigate between the items of information displayed in region 1120 by, for example, pressing an up/down arrow key. Once an item of information is identified with a highlight region or with a movable cursor, the user may confirm the selection to receive information about the selected item of information. For example, when the selected item of information displayed in region 1120 is other media assets in which the actor was featured, information about the media asset may be provided as shown in screen 1200 (FIG. 12).

For example, as shown in screen 1200, hierarchy of identifiers 1110 has been updated to include an identifier of the item (e.g., Milo Ventimiglia) corresponding to the menu from which the last selection was made at the bottom of the hierarchy. In particular, screen 1200 includes a hierarchy of identifiers 1210 with a first identifier 1216 at the top of the hierarchy that may identify a similar selection as identifier 1114 (FIG. 11), a second identifier 1214 in the middle of the hierarchy that may identify a similar selection as identifier 1112 and a third identifier 1212 at the bottom of the hierarchy that identifies the item corresponding to the selection made from the information menu associated with the actor "Milo Ventimiglia."

Information region 1220 may provide a display of information corresponding to the item selected from region 1120 (FIG. 11). For example, when the item selected from region 1120 is a media asset which featured the selected actor, a clip 1222 associated with that media asset may be displayed. Detailed information 1224 about the media asset may also be provided in information region 1220.

An functions menu bar may be provided to allow the user to select amongst various functions corresponding to the media asset that is identified in region 1120. The functions menu bar may provide the same functionality and function indicators as functions menu bar 1010 (FIG. 10). For example, the user may select a "Watch" function to access the media asset. Additionally, when the user selects a particular function, an identifier is added to the bottom of hierarchy 1210 identifying the media asset associated with the selected function. Items or options associated with the selected function may be displayed adjacent to hierarchy 1210 as shown in FIGS. 10 and 11.

Referring back to FIG. 8, the user may select an option to search program listings from submenu bar 820. A display screen may be provided for the user to search locally or remote (e.g., the Internet) using perspective views for program listings or particular media assets of interest to the user.

Figure 13:
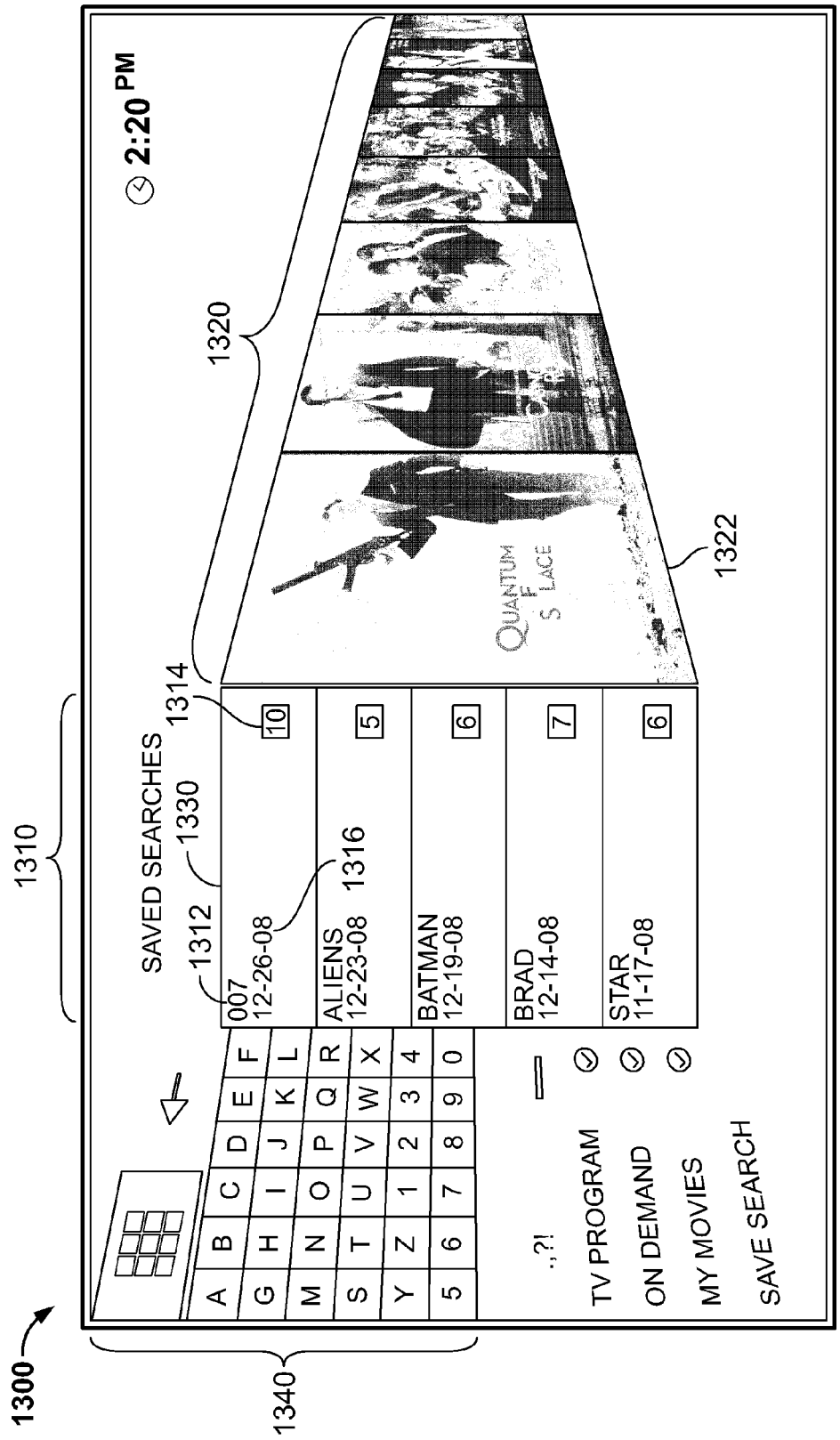
FIG. 13 shows an illustrative display screen of a search function that allows the user to search for media assets in different perspective views in accordance with an embodiment of the invention.

FIG. 13 shows an illustrative display screen 1300 of a search function that allows the user to search for media assets in different perspective views in accordance with an embodiment of the invention. In particular, screen 1300 illustrates the implementation where the media guidance objects discussed in connection with screens 500*a-c* are search function objects and media asset representations. For example, screen 1300 may include a visual keypad 1340, a saved searches region 1310 and a media asset results region 1320.

Visual keypad 1340 may be displayed in a first perspective view, saved searches region 1310 may be displayed in a second perspective view and media asset results region 1320 may be displayed in a third perspective view. Visual keypad 1340 may correspond to first media guidance object 514*a* (FIG. 5*a*), saved searches region 1310 may correspond to second media guidance object 510*a*, a first media asset representation 1322 provided in media asset results region 1320 may correspond to third media guidance object 512*a* and a second media asset representation provided in media asset results region 1320 may correspond to fourth media guidance object 516*a*. It should be understood that visual keypad 1340, saved searches region 1310 and media asset representations in media asset results region 1320 may correspond respectively to any of first media guidance object 514*a*, second media guidance object 510*a* and third media guidance object 512*a* such that each is displayed in a perspective view different from what is shown in screen 1300.

In some implementations, visual keypad 1340 may be statically displayed in the first perspective view. In particular, the user may navigate through the media asset representations provided in media asset results region 1320 by sliding different media asset representations into focus. Visual keypad 1340 may remain statically displayed relative to the media asset representations that slide into focus. In some implementations, visual keypad 1340 may be moved by the user to another section of the display or a different perspective view that may be more convenient to use. In some implementations, visual keypad 1340 may be removed from the display to make more room for displaying the search results and search listings. In particular, visual keypad 1340 may be manually removed (e.g., by pressing a suitable key) or automatically removed when a search has been executed. When visual keypad 1340 is removed from the display, saved searches region 1310 may be displayed in the perspective view where visual keypad 1340 was displayed and saved searches region 1310 may be displayed in the perspective view where media asset results region 1320 was displayed. Visual keypad 1340 may be re-displayed to execute a new search when the user instructs processing circuitry 306 by pressing a suitable key. When visual keypad 1340 is re-displayed, the display may be rearranged to appear as the one shown in screen 1300 with visual keypad 1340 in the first perspective view, saved searches region 1310 displayed in the second perspective view and media asset results region 1320 displayed in the third perspective view.

As discussed above, each media asset representation displayed in media asset results region 1320 may be a photograph, a video, an icon, a sketch, or any other visual indicator that is unique to a particular media asset that allows the user to associate the particular media asset representation with the media asset. For example, a picture of the label of a movie (e.g., Casino Royale) may be displayed as the media asset representation indicating to the user that the media asset representation is associated with the movie Casino Royale. Each media asset representation may also include text identifying the media asset associated with the media asset representation. The text may be a title of the media asset, a short description, a custom description provided by the user or any other suitable information that is unique to the media asset. Selection of the media asset representation (as discussed above) may instruct processing circuitry 306 to playback, order or access the media asset associated with the media asset representation on user equipment device 300.

Visual keypad 1340, saved searches region 1310 and media asset results region 1320 from each of the different perspective views may be adjacent to each other at the edges. For example, a right edge of visual keypad 1340 may be adjacent to a left edge of saved searches region 1310 and a right edge of saved searches region 1310 may be adjacent to left edge of a first media asset representation displayed in media asset results region 1320. Connecting the visual keypad 1340, saved searches region 1310 and media asset results region 1320 from each of the different perspective views at the points of adjacency creates the appearance of a continuous array of search application objects. The continuous array of search application objects may appear to have folds at the points of adjacency.

Saved searches region 1310 may display search listings 1330 that identify to a user searches that were previously executed by the user. For example, search listings 1330 may include the display of one or more criteria elements 1312 (e.g., titles, air times, channels, etc.) that were used to execute a particular search. In particular, the user may have previously executed a search for media assets based on textual criteria. For example, the user may have entered the text "007" and as a result the processing circuitry 306 may have searched local program listings and/or an external source (e.g., the Internet) for media assets that are associated with the text "007". The media assets that may have been associated with the text 007 may be any James Bond media asset (e.g., shows, movies, games, etc.). Similarly, alternatively or in addition to the text entered, the user may have input as the criteria a particular title of a media asset. For example, the user may have entered the title "Batman" and processing circuitry 306 may have searched for media assets having the title "Batman".

Search listings 1330 may include a time and/or date stamp 1316 to remind or indicate to the user when the search was executed. This way the user may know whether the search is outdated (e.g., because the user may know of media assets that have been released after the time and/or date stamp) or is up-to-date. Search listings 1330 may include a results representation 1314 that indicates how may media assets matched the given search criteria element 1312. Results representation may be, for example, a number.

The order of the search listings 1330 displayed in saved searches region 1310 may be based on an alphabetical arrangement of the criteria elements 1312, a date/time stamp 1316 or any other suitable order. For example, search listing 1330 that is associated with a most recently executed search may be displayed closer to the top portion of saved searches region 1310 while search listing 1330 that is associated with a least recently (e.g., oldest) executed search may be displayed closer to the bottom portion of saved searches region 1310. Search listings 1330 that are associated with searches performed between the most recently and least recently executed searches may be displayed in a similar manner between the search listings associated with the most and least recently executed searches. Search listings 1330 may be similarly arranged based on the alphabetical arrangement of the search criteria 1312 where the search listing with search criteria that comes earlier in the alphabet is displayed on top of search listings with search criteria that come later in the alphabet.

The user may navigate among the search listings 1330 to select one of the search listings. The user may navigate among the search listings 1330 by, for example, pressing up/down arrow keys to position a highlight region or cursor over search listing 1330 of interest. In some implementations, as the user navigates from one search listing to another (e.g., as different search listings 1330 are brought into focus), the search results (e.g., media asset representations) displayed in media asset results region 1320 associated with that previously executed search listing 1330 which is brought into focus, may be displayed. For example, when the user navigates between two search listings 1330 that are separated in saved searches region 1310 by two other search listings 1330, the media asset representations displayed in media search results region 1320 may be updated or changed three times. In particular, media asset representations displayed in media asset results region 1320, may be updated each time the user navigates to a different search listing 1330 bringing the search listing into focus to reach a desired search listing 1330. The media asset representations displayed in media asset results region 1320 may be displayed in a different perspective view than the perspective view of the search listings 1330.

The search results or media asset representations associated with each search listing 1330 may be stored in a database as links to the media assets corresponding to the media asset representations. In particular, after a search is executed, the user may select an option to save the search and may in some implementations provide a title for the search. Processing circuitry 306 may add an entry to a database with the named search and all the results that are associated with that search. The results may be added to the entry as links or some other identifier that allows processing circuitry 306 to identify the media asset associated with the saved search without re-executing (or executed again) the search.

The user may be provided with the option to delete or remove any of search listings 1330 that are stored in the database. For example, as the user navigates a cursor to a search listing of interest, the user may press a delete key or remove key. As a result, processing circuitry 306 may remove the entry associated with the search listing from the database. The user may thereafter no longer view media assets associated with that search listing and that search listing may be removed from the saved searches region 1310. A confirmation screen (not shown) may be provided to allow the user to confirm whether he/she wants to delete or remove the particular search listing before the search listing is permanently removed. For example, after the user presses a remove or delete key for a particular search listing, processing circuitry 306 may generate a display of a confirmation screen. The confirmation screen may have a "confirm" option and a "cancel" option. The user may select the confirm option to permanently delete the search listing and the cancel option to cancel the delete operation. The order of the remaining search listings 1330 may be updated as a result of the user removing or deleting a particular search listing 1330.

From saved searches region 1310, the user may navigate between different media asset representations displayed in media asset results region 1320 by, for example, pressing a right arrow key to highlight or position a cursor over a media asset representation of interest to bring the media asset representation into focus. Media asset representations displayed in media asset results region 1320 that appear further away from the media asset representation in focus may be shifted closer in the same perspective view as the user, for example, presses the right arrow key or some other key that instructs processing circuitry 306 to bring into focus media asset representations that appear further in the perspective view. As media asset representations that are further away in the perspective view are brought into focus (e.g., made to appear larger and larger in the perspective view), the media asset representation that is closest in the perspective view (e.g., the media asset representation in focus) may be removed from the display.

For example, media asset representation 1322 (e.g., Quantum of Solace) may be the closest media asset representation (e.g., the media asset representation in focus), and accordingly when the user presses, for example, the right arrow key or some other key to bring into focus media asset representations that are further away (e.g., Casino Royale), media asset representation 1322 may be removed to make room in the display. This is different from earlier embodiments where media guidance objects that are in the third perspective slide into the second perspective to be brought into focus for selection, as discussed in connection with FIGS. 5b, 6 and 9. Alternatively, the user my position a moveable cursor (e.g., a mouse) over the media asset representation of interest thereby preventing the closest media asset representation from being removed in order to select a media asset representation that is further in the perspective view.

When the user selects a particular media asset representation (e.g., by pressing a confirm or enter key while a cursor is positioned over the desired media asset representation), processing circuitry 306 may allow the user to view details, access or order the media asset associated with the media asset representation. For example, processing circuitry 306 may navigate the user to screen 1000 (FIG. 10) with information corresponding to the media asset associated with the selected media asset representation. As discussed above, from screen 1000, the user may select various functions from menu 1010 to access, set reminders, schedule a recording, order, get detailed information, view cast members, etc. for the selected media asset.

From saved searches region 1310, the user may navigate from saved searches region 1310 to visual keypad 1340 to execute a new search by, for example, pressing a left arrow key. The user may select between various numerical and alphanumerical symbols to identify criteria which processing circuitry 306 may use to execute a search for media assets. Visual keypads are discussed in greater detail in Brian Peterson U.S. patent application Ser. No. 12/466,585, filed May 15, 2009, which is incorporated by reference herein in its entirety.

Figure 14:
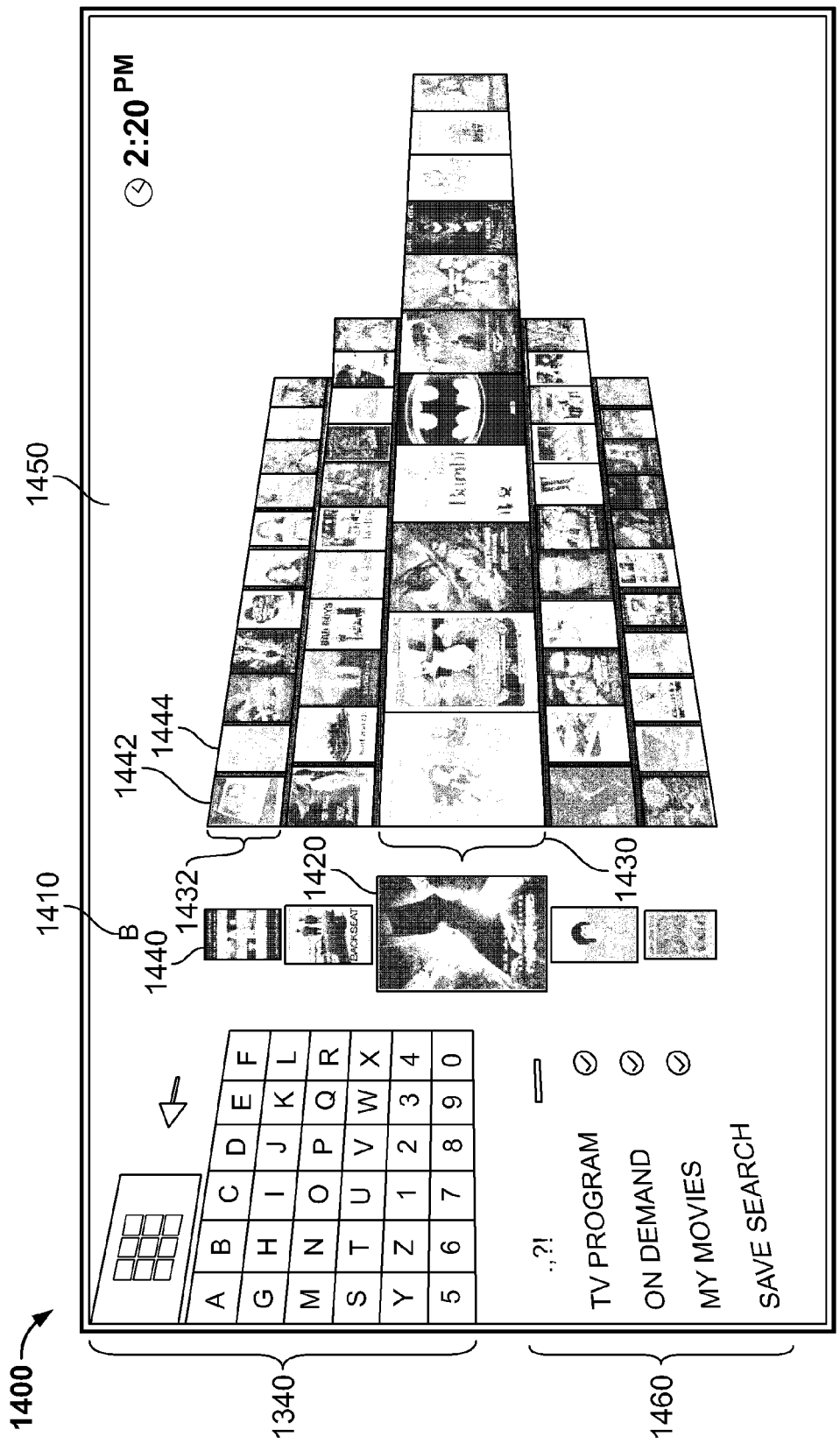
FIG. 14 shows an illustrative display screen of a search operation that allows the user to search for media assets in different perspective views in accordance with an embodiment of the invention.

FIG. 14 shows an illustrative display screen 1400 of a search operation that allows the user to search for media assets in different perspective views in accordance with an embodiment of the invention. Screen 1400 may include visual keypad 1340, media asset search results region 1410 and related media assets region 1450. As shown above in screen 1500, visual keypad 1340 may be displayed in a first perspective view as one media guidance object, media asset search results region 1410 may be displayed in a second perspective view as a second media guidance object and related media assets region 1450 may be displayed in a third perspective view as a fourth media guidance object or objects. The objects from each of the different perspective views may be adjacent to each other where the points of adjacency are at the edges of the media guidance objects.

The user may position a cursor or focus region within visual keypad 1340 to select (e.g., by pressing a "confirm" or "enter" key) a character provided in visual keypad 1340. The character that is selected may be used to perform the search for media assets. In some implementations, the results corresponding to the search string may be presented in media asset search results region 1410 as the user selects different characters of the search string. For example, the user may wish to search for media assets having a title attribute that begins with the search string "BAT". Accordingly, the user may first select the 'B' character and media asset representations 1440 and 1420 that correspond to media assets that have titles that begin with the letter 'B' may be displayed in media asset search results region 1410. When the user selects the second letter of the search string (e.g., 'A'), media asset representation 1420 that are displayed in media asset search results region 1410 may change to correspond to media assets that have titles that begin with the letters "BA". In some implementations, the user may instruct processing circuitry 306 to only perform the search once the entire desired search string is provided through 1340.

As discussed above, the media asset representations displayed in media asset results region 1410 identify to the user the media assets that match a given search string provided through visual keypad 1340. The media asset representations displayed in media asset results region 1410 may be displayed in perspective relative to each other. In particular, the media asset representations may be displayed in a similar manner as items in menu region 1010 (FIG. 10). Media asset representation 1440 that is shown to be further away from the media asset representation 1420 that is in focus may appear smaller than media asset representation 1420. More specifically, the media asset representations that are further away (e.g., require more presses of a direction arrow key to be placed in focus) may appear gradually smaller in size.

The user may select which attribute processing circuitry 306 should search through when searching for media assets by selecting one or more of the attributes 1460. Attributes 1460 may be displayed in the same or different perspective as visual keypad 1340. Also, attributes 1460 may be displayed adjacent visual keypad 1340 and media assets results region 1410 or at any other suitable location on the display screen. Attributes 1460 may also be omitted entirely from the display and processing circuitry 306 may use a default attribute (e.g., title) to perform the search for media assets.

Attributes 1460 may include a television program attribute, an on-demand program attribute, my movies attribute, title, rating, detailed description, commentary, subject matter or any other suitable attribute that can be used to narrow or widen (based on whether the attribute is selected) the scope of media assets through which to search. For example, selection of the television program attribute, may instruct processing circuitry 306 to include television programs in the search for media assets. On the other hand, when the television program attribute is not selected, processing circuitry 306 may exclude from the search media assets that are television programs. Attributes 1460 may also instruct processing circuitry 306 where to search for media assets that match the search string. For example, attributes 1460 may include a local search attribute which, when selected, may cause processing circuitry 306 to search locally stored data and/or a remote search attribute which, when selected, may cause processing circuitry 306 to search remotely stored data (e.g., via the Internet).

In some implementations, processing circuitry 306 may search locally stored data. Alternatively or in addition, processing circuitry 306 may search a remote database via, for example, a network or the Internet. For example, processing circuitry 306 may receive the search string and transmit the search string through a search engine website (e.g., GOOGLE.COM or TVGUIDE.COM) to receive matching media assets.

When attributes 1460 are displayed under visual keypad 1340 in the same perspective view, the user may select between various attributes by, for example, pressing a down arrow key to move the focus region away from visual keypad 1340 and towards attributes 1460.

Related media assets region 1450 may display a row 1430 of media asset representations that share attributes with each media asset that is represented in media asset search results region 1410. Each row 1430 may include multiple media asset representations 1442 and 1444 where each media asset representation shares an attribute with the media asset representation in media asset results region 1410 that is next to the row. In particular, row 1430 may include multiple media asset representations and may be displayed next to media asset representation 1420. Similarly, row 1432 may include multiple media asset representations and may be displayed next to media asset representation 1440.

Each row may be sized to conform to the size of the media asset representation that corresponds to the row. For example, row 1432 may include media asset representations that have a size that is substantially identical or similar to the size of media asset representation 1440. This aids the user in identifying which row corresponds to which media asset representation displayed in media asset results region 1410. More specifically, the media asset representations that are displayed in media asset results region 1410 may be displayed in perspective to one another (as discussed above) and similarly, the media asset representations in each of rows 1432 and 1430 may be displayed in perspective to each other. In particular, the media assets displayed in row 1432 may be further away from row 1430 corresponding to the media asset representation 1420 in focus and thereby may be smaller in size than the media asset representations in row 1430.

In some implementations, related media assets region 1450 may only display a single row of media asset representations 1430 that share attributes with only the media asset that is represented by the media asset representation in focus. In such scenarios, the single row of related media asset representations may appear as media asset results region 1320 (FIG. 13). In particular, when multiple rows are displayed, each of the media asset representations may be smaller in size to allow for the larger number of media asset representations to be displayed. Whereas, when only one row is displayed, a larger portion of the screen may be apportioned for displaying the row of media asset representations.

As discussed above, as the user changes the search criteria (e.g., by adding more characters to the search string), the media asset representations displayed in media asset results region 1410 also change. Accordingly, the media asset representations displayed in the rows corresponding to the media asset representations displayed in media asset results region 1410 may also change with each change in search criteria.

The rows of media asset representations may be related to the media assets represented by the media asset representations in media asset results region 1410 by an attribute the user selected to search media assets (e.g., title) and by at least one other attribute. For example, all the media asset representations in row 1430 may be part of a series (e.g., episodes or volumes) of media assets associated with the media asset representation 1420. In particular, media asset representation 1420 may correspond to the movie "Batman" or a latest one of the series of movies of "Batman" and each media asset representation in row 1430 may correspond to each of the earlier series of the movie "Batman". In addition, each of the media asset representations in row 1430 may have the same characters of the search string in their title as media asset 1420 and may belong to the same category (e.g., Family movies) as media asset 1420. One row in related media assets region 1450 may include a different number of media asset representations than another one of the rows. This is because there may be a different number of media assets that are related to each different media asset representation displayed in media asset results region 1410.

Any of the media asset representations in the rows displayed in related media assets region 1450 or media asset results region 1410 may be selected by bringing the media asset representation into focus. Once the desired media asset representation is brought into focus, the user may press a "confirm" or "enter" key or other suitable key to select the media asset corresponding to the media asset representation. As a result of selecting a particular media asset representation, as discussed above, the user may schedule a recording, schedule a reminder, place an order, retrieve information or any other function may be performed for the media asset. In some implementations, selecting the media asset corresponding to the media asset representation may navigate the user to screen 1000 (FIG. 10).

Referring back to FIG. 8, the user may select an option to access an online video vendor (e.g., Blockbuster or Netflix) from submenu bar 820 directly or through a website. A display screen may be provided for the user to search, order, or otherwise interact with the online video vender using perspective views or menus and media assets.

Figure 15:
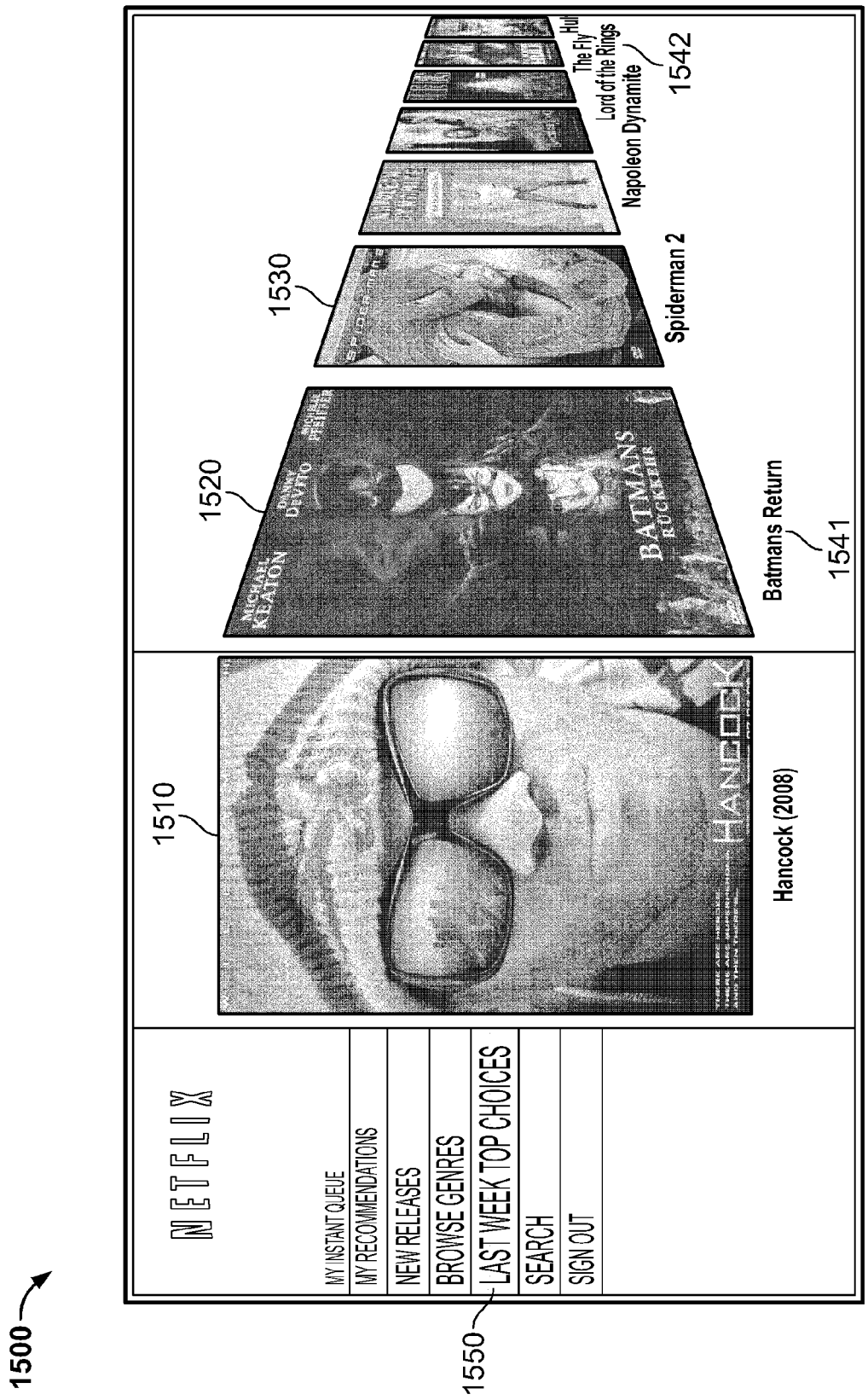
FIG. 15 shows an illustrative display screen of accessing an online video vendor with perspective views in accordance with an embodiment of the invention.

FIG. 15 shows an illustrative display screen 1500 of accessing an online video vendor with perspective views in accordance with an embodiment of the invention. In particular, screen 1500 illustrates the implementation where the media guidance objects discussed in connection with screens 500*a*-*c* (FIGS. 5*a*-*c*) are media asset representations corresponding to media assets the user may order from the online video vendor. In particular, media asset representation 1510 displayed in a first perspective view may correspond to media guidance object 510*a* and media asset representations 1520 and 1530 displayed in a second perspective view may correspond to media guidance objects 512*a* and 516*a*. For example, screen 1500 may include a online video vendor menu and a media assets region that displays media assets corresponding to the menu option that is in focus.

The items in the online video vendor menu may be displayed in perspective relative to one another similar to the way in which options may be displayed in menu 740 (FIG. 7). For example, the item that is in focus may be displayed with larger text size than items not in focus. More specifically, the further away in the menu that items are from the item in focus, the smaller they may appear to be (e.g., smaller text size). As shown, item 1550 is in focus corresponding to the menu selection of "last week top choices." Items that are in the menu that are further away, such as "my recommendations" appear smaller than item 1550.

The items provided in the online video vendor menu may correspond to various options provided by the online video vendor. For example, the items may correspond to online video vendor options including "my instant queue," "my recommendations," "new releases," "browse genres," "last week top choices," "search," and "sign out."

As the user navigates between different items in the online video vendor menu by, for example, bringing each item into focus by pressing the up/down arrow keys, media asset representations or other media guidance objects corresponding to the selected item may be displayed adjacent to the online video vendor menu. The user may interact (e.g., select, bring into focus, or provide input) with the media asset representations or other media guidance objects that are displayed by, for example, pressing the right/left arrow keys.

The user may bring the item corresponding to "my instant queue" into focus by, for example pressing up/down arrow keys. Alternatively, the user may position a cursor over the particular item and press a select key. Processing circuitry 306 may generate a display of media asset representations corresponding to media assets that are in the queue of the online video vendor adjacent to the menu. The queue may include media assets in which the user has an interest and requested to be checked out, mailed, delivered, emailed or downloaded at the next available opportunity. In particular, the user may add or remove media assets from the queue.

The media asset representations corresponding to the "my instant queue" menu item selection may be arranged in accordance with their order of availability or future mailing date. For example, media asset representation 1510, which may be displayed in a first perspective view, may correspond to a media asset that is to be provided to the user (by mail, email or download) next (e.g., when the user returns a media asset that is checked out). Additionally, media asset representations 1520 and 1530, which may be displayed in a second perspective view different from the first perspective view, may correspond to media assets that are to be provided after media asset representation 1510. In some implementations, media asset representation 1510 which is displayed in the first perspective view may correspond to a media asset that is currently checked out to the user while media asset representations 1520 and 1530 may correspond to media assets that will be provided to the user at the next available opportunity (e.g., when the user returns or checks-in the media asset corresponding to media asset representation 1510).

The user may rearrange the order of the media assets in the queue by bringing into focus one of the media asset representations corresponding to the "my instant queue" item of the online video vendor menu. For example, once the media asset representation of interest is in focus, the user may press a "confirm" key and cause that media asset representation to be moved to the front of the queue. Alternatively, in some implementations, pressing the "confirm" key may cause the media asset in focus to be moved to the end of the queue. In some other embodiments, the user may press a suitable key when a media asset representation is in focus and indicate a number within the queue in which to place the corresponding media asset.

As discussed above in connection with FIG. 6, each media asset representation may include a title or other textual identifier. In particular, media asset representation 1520 may correspond to the media asset "Batman Returns" and accordingly such an identifier 1541 of the title may be displayed in close proximity (e.g., underneath or above) media asset representation 1520. In some implementations, the identifiers corresponding to the media asset representations that are displayed in close proximity to the media asset representations may also be displayed in perspective to one another. For example, the titles in the second perspective view may gradually appear smaller and smaller for media asset representations that appear further and further away.

To bring media asset representations into focus, the user may press a right/left arrow key. As a result, processing circuitry 306 may slide media asset representation 1520 from the second perspective view into the first perspective view. Additionally, the media asset representations that are displayed further away from media asset representation 1520 may be brought into closer view.

The user may bring the item corresponding to "my recommendations" or "new releases" or "last week top choices" into focus by, for example pressing up/down arrow keys. Alternatively, the user may position a cursor over the particular item and press a select key. Processing circuitry 306 may generate a display of media asset representations corresponding to menu item in focus and the user may press left/right arrow keys to bring into focus one of the media asset representations. In particular, when the item corresponding to "my recommendations" is in focus, processing circuitry 306 may generate a display of media asset representations corresponding media assets that the online video vendor recommends for the user based on, for example, a user profile or previous media assets that the user added to the queue or in which the user indicated an interest. When the item corresponding to "new releases" is in focus, processing circuitry 306 may generate a display of media asset representations corresponding media assets that have recently (e.g., within the past week or two) been made available on Bluray, DVD or download. When the item corresponding to "last week top choices" is in focus, processing circuitry 306 may generate a display of media asset representations corresponding media assets that were most rented, checked out or downloaded or were highest rated in the previous week.

The media asset representation that is in focus may be added to the queue associated with the user by pressing a confirm key or some other suitable key. Additionally, the user may press an info key to bring up a display of detailed information about the media asset corresponding to the media asset representation in focus similar to screen 1200 (FIG. 12). The user may also obtain instant access to the media asset corresponding to the media asset representation in focus (e.g., by way of streaming video or download) when available by the online video vendor.

At any point in the media guidance application (i.e., when in any of the screens discussed above and below), the user may press a menu key or other suitable key to bring up the display of main menu screen 700 (FIG. 7). Alternatively, instead of navigating back to screen 700 when the user presses the menu key, main menu bar 740 may be displayed on a side of the screen being viewed. In some implementations, when main menu bar 740 is displayed on a side of the screen being viewed, the main menu bar 740 may be displayed in a different perspective than the media guidance objects that are displayed in the screen being viewed.

When the item corresponding to "search" is in focus, processing circuitry 306 may generate for display adjacent to the online video vendor menu a search screen similar to the one discussed in connection with FIGS. 13 and 14. For example, visual keypad 1340 may be displayed in a first perspective view different from the perspective view of the video vendor menu and search listings region 1310 or 1410 may be displayed as the media guidance objects adjacent the visual keypad in a second perspective view. Alternatively, when the item corresponding to "search" is in focus and the confirm key is pressed, processing circuitry 306 may navigate the user to search screen 1300 (FIG. 13). The user may bring into focus any media asset representations resulting from the search to add corresponding media assets to the video vendor queue or to access the corresponding media assets immediately via direct download, live streaming or email.

Referring back to FIG. 7, the user may select an option to access a personal photo library from main menu bar 740. A display screen may be provided for the user which presents the user's personal photo library using perspective views.

Figure 16:
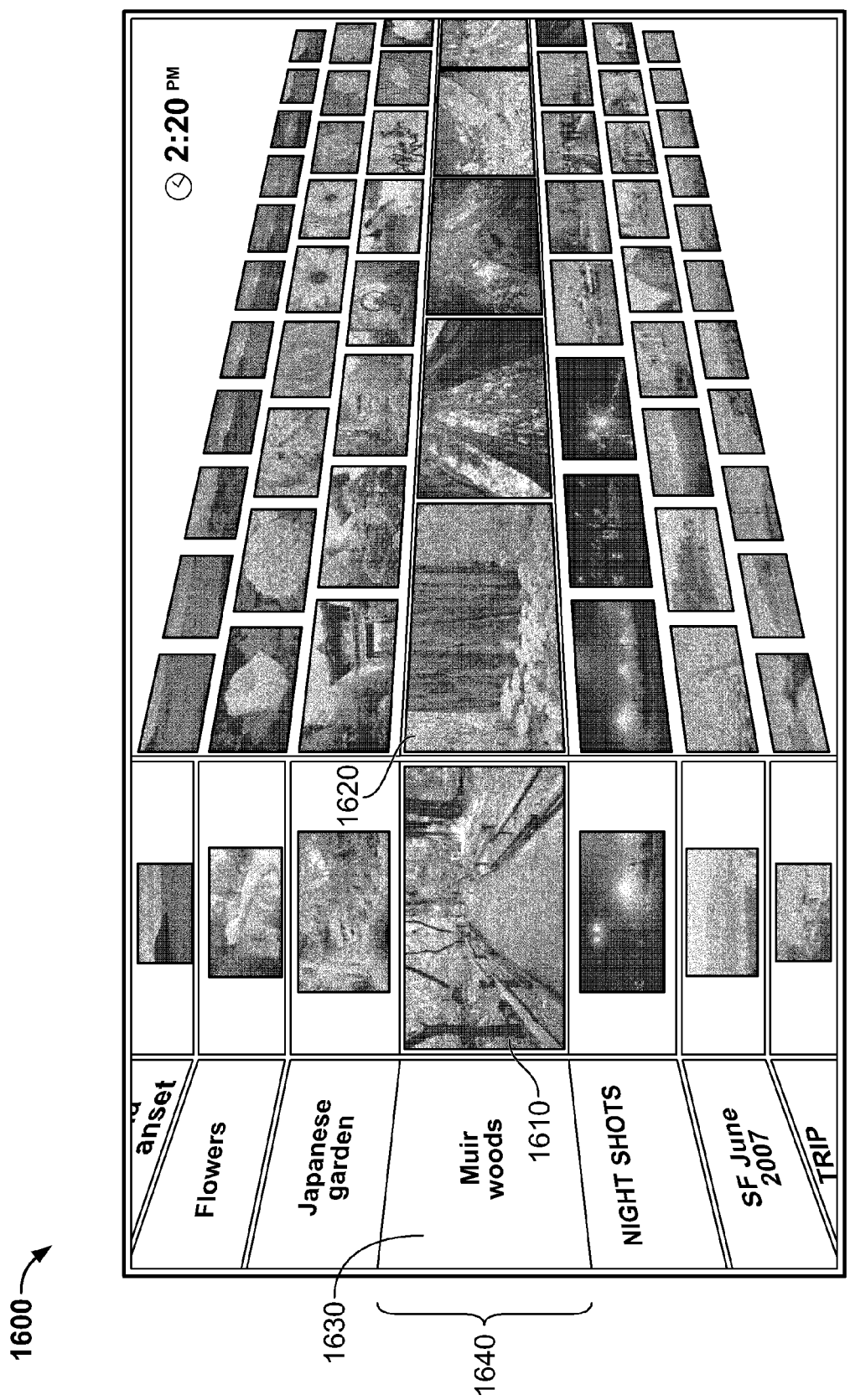
FIG. 16 shows an illustrative display screen of accessing a personal photo library using perspective views in accordance with an embodiment of the invention.

FIG. 16 shows an illustrative display screen 1600 of accessing a personal photo library using perspective views in accordance with an embodiment of the invention. In particular, screen 1600 illustrates the implementation where the media guidance objects discussed in connection with screens 500a-c (FIGS. 5a-c) are photo album representation and corresponding photographs. In particular, photo album representation 1630 displayed in a first perspective view may correspond to media guidance object 514a, photograph 1610 displayed in a second perspective view may correspond to media guidance objects 510a and photograph 1620 displayed in a third perspective view may correspond to media guidance objects 512a.

The photo album that is in focus may be displayed in the center of the screen. As shown in screen 1600, multiple photo albums with their corresponding photographs may be viewed simultaneously in perspective. The photo albums and the corresponding photographs may be retrieved from local storage, from a remote device, a remote server or the Internet.

Screen 1600 may include one or more photo album arrays 1640 that are each displayed in perspective relative to one another. A photo album array 1640 may include photo album representation 1630 displayed in a first perspective view with photograph 1610 that belongs to the photo album corresponding to photo album representation 1630 being displayed in a different second perspective view adjacent to photo album representation 1630. The remaining photographs that belong to the photo album corresponding to photo album representation 1630 may be displayed adjacent to photograph 1610 in a third perspective view. Although photo album arrays 1640 are shown as extending across the screen from left to right, they may be displayed down the screen from top to bottom or bottom to top. In such an implementation, the photo album representation may be displayed at the top or bottom of the screen while the photographs belonging to the photo album corresponding to the photo album representation may be displayed adjacent each other and adjacent to the photo album representation.

The photo album arrays 1640 may be displayed adjacent to each other and in perspective relative to the photo album array that is in focus. For example, as shown in screen 1600, photo album array 1640 is in focus and the adjacent photo album arrays gradually decrease in size. In particular, the photo album representations and photographs belonging to the photo albums corresponding to the respective photo album representations gradually appear smaller as they increase in distance from the photo album array in focus. This creates the appearance of a pyramid of photographs from all of the albums where the photo album array in focus is displayed at the top of the pyramid and the rest of the photo album arrays are displayed on respective steps of the pyramid with one photo album array being displayed per step of the pyramid.

The user may bring photo album arrays into focus by, for example pressing an up/down arrow key. In particular, when the user presses an up arrow key, processing circuitry 306 may slide onto the top of the pyramid the photo album array corresponding to the photo album representation "Japanese garden" and slide down into the next step of the pyramid the photo album array corresponding to the photo album representation "Muir woods." Alternatively, the user may simply position a moveable cursor over a desired photo album array and press an action or confirm key to bring the desired photo album array into focus.

The user may bring into focus different photographs by pressing left/right arrow keys. In particular, the user may press a right arrow key and as a result processing circuitry 306 may slide through a fold from the third perspective view into the second perspective view photograph 1620 and slide out of the second perspective view photograph 1610. In particular, a fold may appear between the photograph in focus in the second perspective view and the rest of the photographs that belong to the album in the third perspective view. When the user presses a right arrow key, the next photograph in the third perspective view immediately adjacent the photograph in focus in the second perspective view may slide through the fold from the third perspective view into the second perspective view. In some other embodiments, instead of sliding from the third perspective view into the second perspective view, the immediately adjacent photograph may instantaneously be moved from the third perspective view into the second perspective view with a jump operation.

In some implementations, the photo album representations displayed in the first perspective view may be static such that as the user slides different photographs from the third perspective view into the second perspective view through the fold, the photo album representations remain stationary or unchanged. In some implementations, the user may shift the photo album representations displayed in the first perspective view out of the screen. In such scenarios, more room may be provided for displaying the photographs. When the photo album representations are shifted out of the screen, only two perspective views may be provided where the photograph in focus in the second perspective view may be displayed in the first perspective view and the immediately adjacent photographs that belong to the same album may be displayed in the second perspective view. The remaining rows are arranged in a similar manner in the two perspective view scenario when the photo album representations are shifted out of the display.

In some implementations, the photo album representations may be caused to slide into the second perspective view from the first perspective view through a fold that appears between the photo album representations and the photographs that are displayed in the second perspective view. This may allow more photo album representations to be displayed at once and may enable the user to see and select more photo album representations. For example, when the photo album representations are caused to slide into the second perspective view from the first perspective view, the photographs displayed in the second perspective view may be caused to slide into the third perspective view and additional photo album representations may be brought into view in the first perspective view. When the user selects a particular photo album representation, the screen may return to display the photo album representations in the first perspective view and the corresponding photographs in the second and third perspective views as shown.

The user may edit, rotate, print, access, playback or otherwise execute a desirable action on any photograph that is in focus. For example, the user may press a confirm key and cause the photograph that is in focus to be displayed on a full screen. Alternatively, the user may press a confirm key or some other suitable key to have the photographs of the photo album array that is in focus be displayed in a full screen slideshow.

Although screen 1600 has been shown and described in the context of a photo album and corresponding photographs, it should be understood that the teaching applies to any other type of personal media. For example, in some embodiments, screen 1600 may display user playlists in a similar multiple playlist arrays arrangement as the photo album arrays arrangement. In particular, each playlist array may include a playlist representation (e.g., name of the playlist) in place of the photo album representation 1630 and the media assets belonging to the playlist in place of photographs 1610 and 1620. The media assets of the playlists may be digital audio assets or video assets or a combination thereof.

In some other embodiments, screen 1600 may display favorite websites of the user in a similar multiple favorite website arrays arrangement as the photo album arrays arrangement. In particular, each favorite websites array may include a favorite websites category representation (e.g., news websites or email websites) in place of the photo album representation 1630 and images of home pages of the websites belonging to the favorite websites category in place of photographs 1610 and 1620. The website home pages may be locally cached or accessed as they are needed (e.g., as a favorite websites array is brought into view when the user changes which favorite websites array is in focus). As discussed with reference to screen 1600 displaying photo album arrays, the user may press a confirm key or other suitable key when a favorite websites array is in focus and processing circuitry 306 may create a full screen slideshow of each of the websites belonging to the favorite websites array. The user may configure the length of time each website belonging to the favorites website array is displayed on the screen before the next website is displayed. Additionally, each website may be configured to be displayed for a different length of time even though it belongs to the same favorites website array.

Referring back to FIG. 7, the user may select an option to add a widget to the screen from main menu bar 740. A display screen may be provided that includes a media asset (e.g., a television program) and overlaid on the media asset may be one or more widgets that the user has added.

Figure 17:
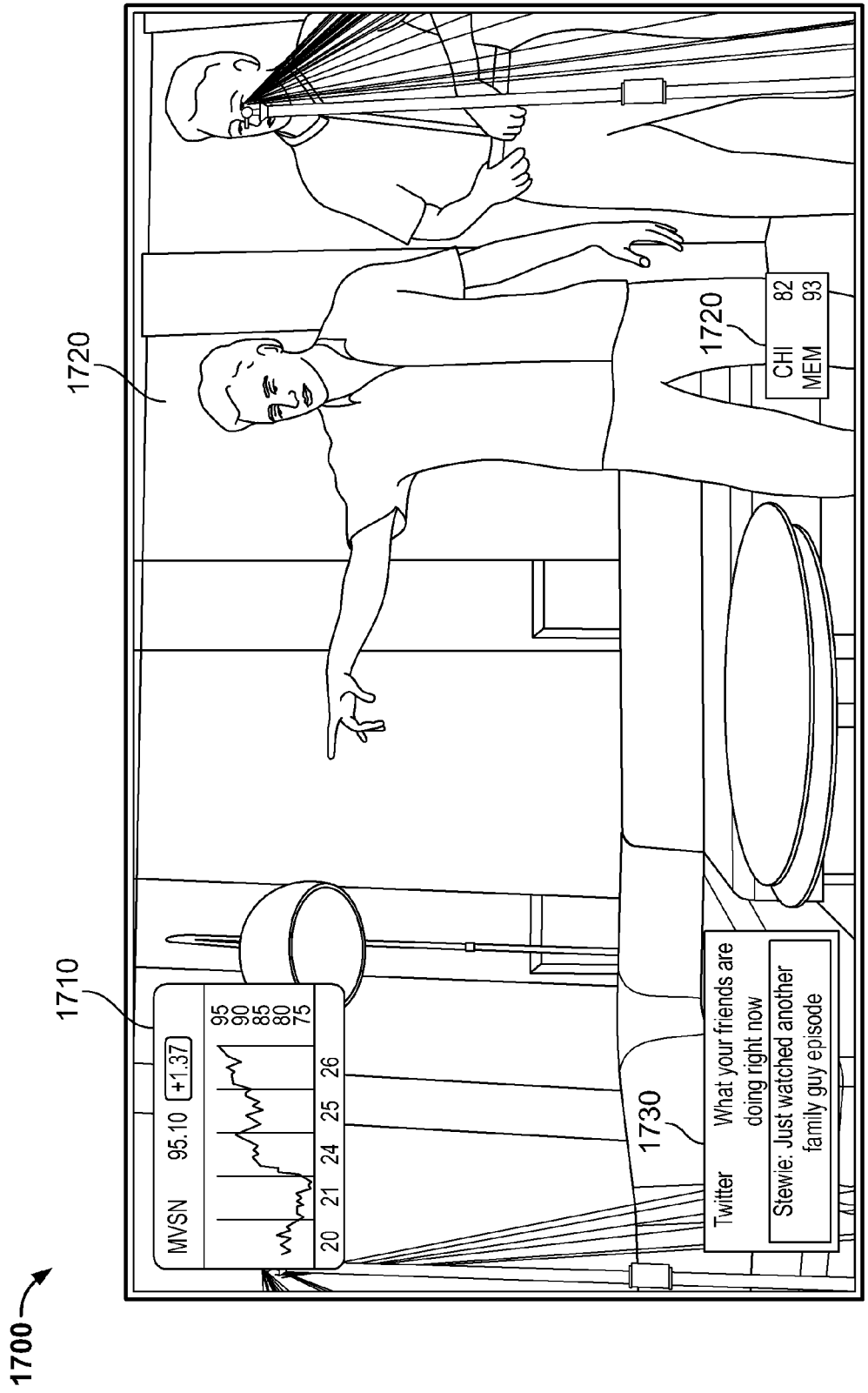
FIG. 17 shows an illustrative display screen of a media asset overlaid with widgets in accordance with an embodiment of the invention.

FIG. 17 shows an illustrative display screen 1700 of a media asset overlaid with widgets in accordance with an embodiment of the invention. In particular, screen 1700 may include the display of a video asset 1720 and one or more widgets 1710, 1730 and 1720. The widgets may be various modular type applications that the user can interact with while accessing or viewing a media asset.

One or more of widgets 1710, 1730 and 1720 may be partially transparent to allow the user to view both the widget content and the media asset content in the same portion of the display. Some of the widgets may be interactive while other widgets that are displayed may present static information (e.g., sports scores). In order to change which widget is in focus (i.e., the widget with which the user may interact with), the user may toggle the widgets in focus by pressing a left/right arrow key.

For example, widget 1710 may present stock quotes. The stock quotes presented by widget 1710 may be in real-time (i.e., may update as the public is buying/selling a particular stock) or may provide last sale information and ticker symbol information (e.g., graphs and detailed description). When widget 1710 is in focus, the user may change which stock quote is being provided by entering in a new ticker symbol or pressing a suitable key to toggle between ticker symbols stored in a stock portfolio associated with the user.

After the user has selected the desired stock quote, the user may access widget 1730 by, for example, pressing a left/right arrow key. In particular, the user may press a right arrow key to bring widget 1730 into focus and may press a left arrow key to return to the previous widget 1710 that was in focus. Widget 1730 may be a social networking application that allows a user to view a status of other people and update the user's own status (e.g., Facebook or Twitter). When widget 1730 is in focus, the user may input a text string indicating what he/she is doing right now. The user may also navigate within widget 1730 to find out what his/her friends are doing right now by viewing their status.

Other applications that may be provided similar to widget 1730 are chat applications that allow the user to interact with other people around the world (e.g., by using video chat, text chat or voice chat using for example, Skype). In some embodiments, the processing circuitry 306 may monitor what the user is communicating (e.g., typing, saying, looking at) and provide recommendations based on that information. For example, processing circuitry 306 may monitor a chat session the user is having with a friend using one or more of the widgets or may monitor a status update associated with the user from one or more of the widgets. Based on the content being discussed during the chat session or status update, processing circuitry 306 may provide future media asset recommendations. In particular, the user may be chatting with a friend about a future episode of the show "Family Guy." Processing circuitry 306 may remind the user at a later time (e.g., five minutes before the show is broadcast) about the chat session and inform the user that the show that was discussed in the chat session is about to begin. Alternatively, processing circuitry 306 may automatically record the corresponding media assets.

The user may also select the position in which the widgets are displayed on the screen. This feature may be desirable to avoid obstructing a particular region of the screen. For example, the user may have an interest in obstructing or not obstructing different regions of the screen for different programming. Accordingly, the user may pressing an up/down arrow key when a particular widget is in focus to move that widget around the screen to a desirable location. It should be noted that other keys besides the up/down arrow keys may be used to move a widget around the screen. Also, the widget may be positioned anywhere on the screen not limited to the corners as shown in screen 1700. In some implementations, the user may use a movable cursor to select a widget to bring into focus and/or to move a selected widget to a particular location on the screen.

In some embodiments, processing circuitry 306 may store the location that the user selected for a particular widget. Processing circuitry 306 may also store the media asset that was being accessed when the widget was moved to a particular location. When the user views or accesses the same media asset or some episode of the media asset at a later time or date, processing circuitry 306 may retrieve the stored location and automatically display the widget in the previously selected location. This may reduce a burden on the user to move the widget again to the previously selected location when accessing the same or similar media asset.

The user may remove widgets from the display by bringing a widget into focus and pressing a suitable key such as a delete key. The user may add more widgets onto the display by, for example, pressing a menu key. Pressing the menu key may bring up the display of main menu 740 (FIG. 7) with the widgets item 720 in focus. The user may select a new widget from main menu 740 and as a result the selected widget may appear on the display screen. The default location of the newly displayed widget may be in a corner of the screen but the location may be changed either manually by the user (as discussed above) or automatically by processing circuitry 306 based on a previously stored location for the selected widget.

Widget 1720 may present the user with scores for sports games in which the user indicates an interest. For example, the user may select various teams or games in which they have an interest and when those teams/games are playing, widget 1720 may provide up-to-date score reports in real-time. In some implementations, widget 1720 may provide a video feed of the live game or clips of highlights of a particular score made by a team. The video feed provided by widget 1720 may be received over the Internet from a website or by tuning to a channel on a tuner (when multiple tuners are available) in the media equipment device.

In some embodiments, the user may store favorite teams or sports to a profile. When one of the teams or sports are being played, processing circuitry 306 may automatically display widget 1720 with the score report of the favorite team or sport. Accordingly, when the user forgets about a particular game or team in which the user has an interest or when a time change is made to the favorite game unknown to the user, the user may nevertheless be reminded and informed about the score of the favorite team or game with the automatic display of widget 1720.

While the user is viewing or accessing media asset 1720, the user may press a confirm key or info key to view a detailed information overlay corresponding to media asset 1720. The information overlay may include a summary about media asset 1720, time and channel information, runtime, time left in the program, related media assets, a list of friends associated with the user that have an interest in the media asset or any other suitable information. The overlay may present similar information about any other media asset not limited to media asset 1720 being accessed. In particular, the overlay may be changed to see what is on a different program source or channel now or at a later or earlier time/date.

Figure 18:
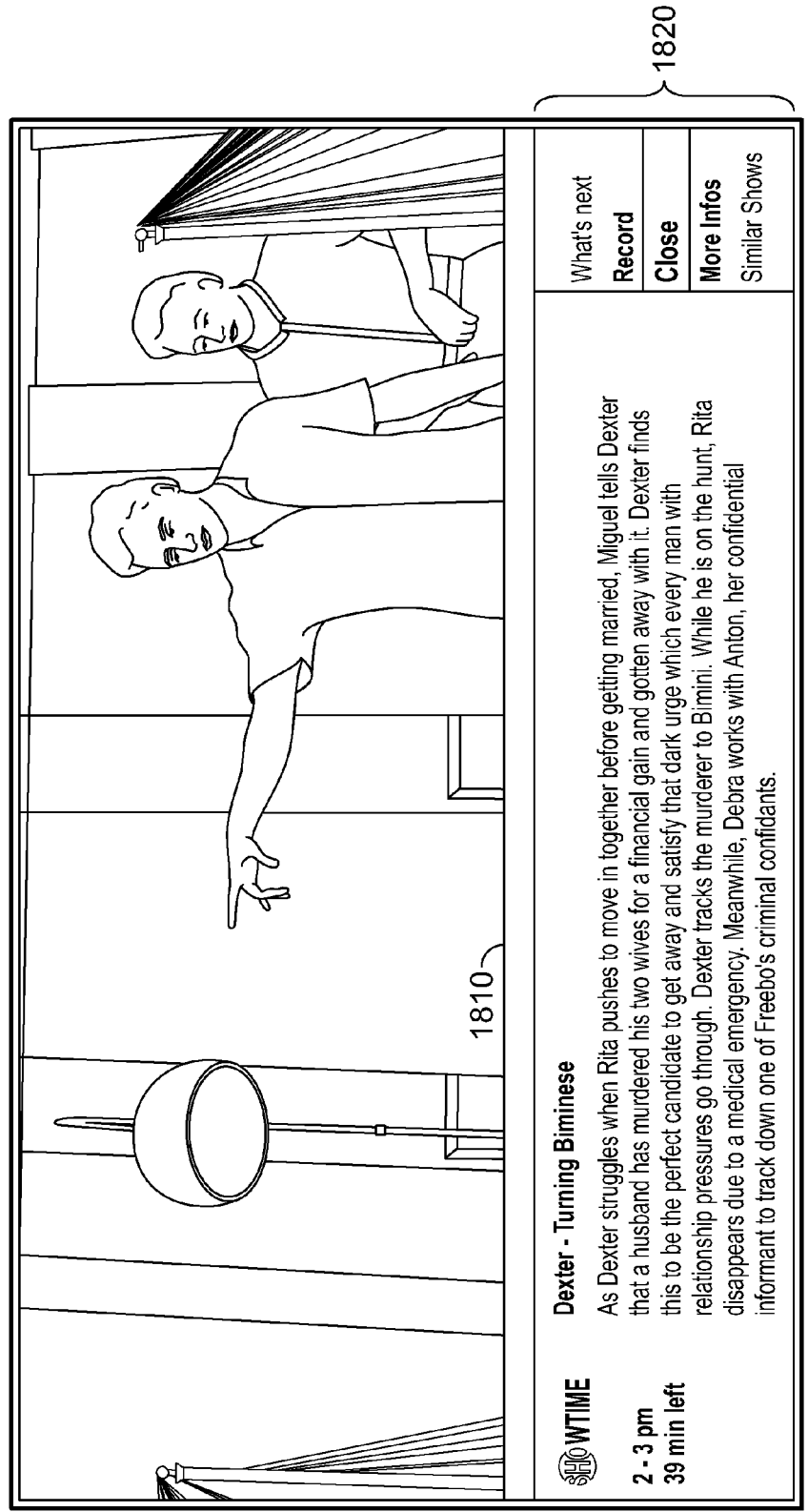
FIG. 18 shows an illustrative display screen of an information overlay displayed with a media asset in accordance with an embodiment of the invention.

FIG. 18 shows an illustrative display screen 1800 of an information overlay 1810 displayed with a media asset in accordance with an embodiment of the invention. Overlay 1810 may include an information region and a menu region 1820. Menu region 1820 may include items that are displayed in perspective relative to each other. The items of the menu may correspond to actions the user may select to perform for the media asset corresponding to the information being displayed in overlay 1810.

Items of menu region 1820 may include "what's next," "record," "close," "more info," "similar shows" and/or any other suitable option (e.g., set reminder, other airtimes, etc.). Another item that is not shown that may be included in menu region 1820 may be an "add to playlist" item which adds the media asset corresponding to the information in menu region 1820 to a playlist of media assets.

The user may navigate or bring into focus different items of menu region 1820 by, for example, pressing an up/down arrow key. The items of menu 1820 may be displayed in a similar manner as the items of main menu 740 (FIG. 7). For example, the item in focus may be more prominently displayed (e.g., larger in size) than other items of menu region 1820. In particular, items of menu region 1820 that are further away from the item in focus may be displayed in gradually decreasing sizes with the item furthest away being smallest in size.

The user may select the item in focus by, for example, pressing a confirm key. In particular, when the "close" item is in focus, selection of the confirm key may close overlay 1810 and make the overlay disappear. Selection of the "record" item may schedule for recording the media asset corresponding to the information being displayed. Selection of "more info" item may bring up a display similar to screen 1000 (FIG. 10). The user may then interact with the display in a similar manner as discussed above in connection with screen 1000 to perform actions and view detailed information about the media asset corresponding to the information being displayed in overlay 1810.

Figure 19:
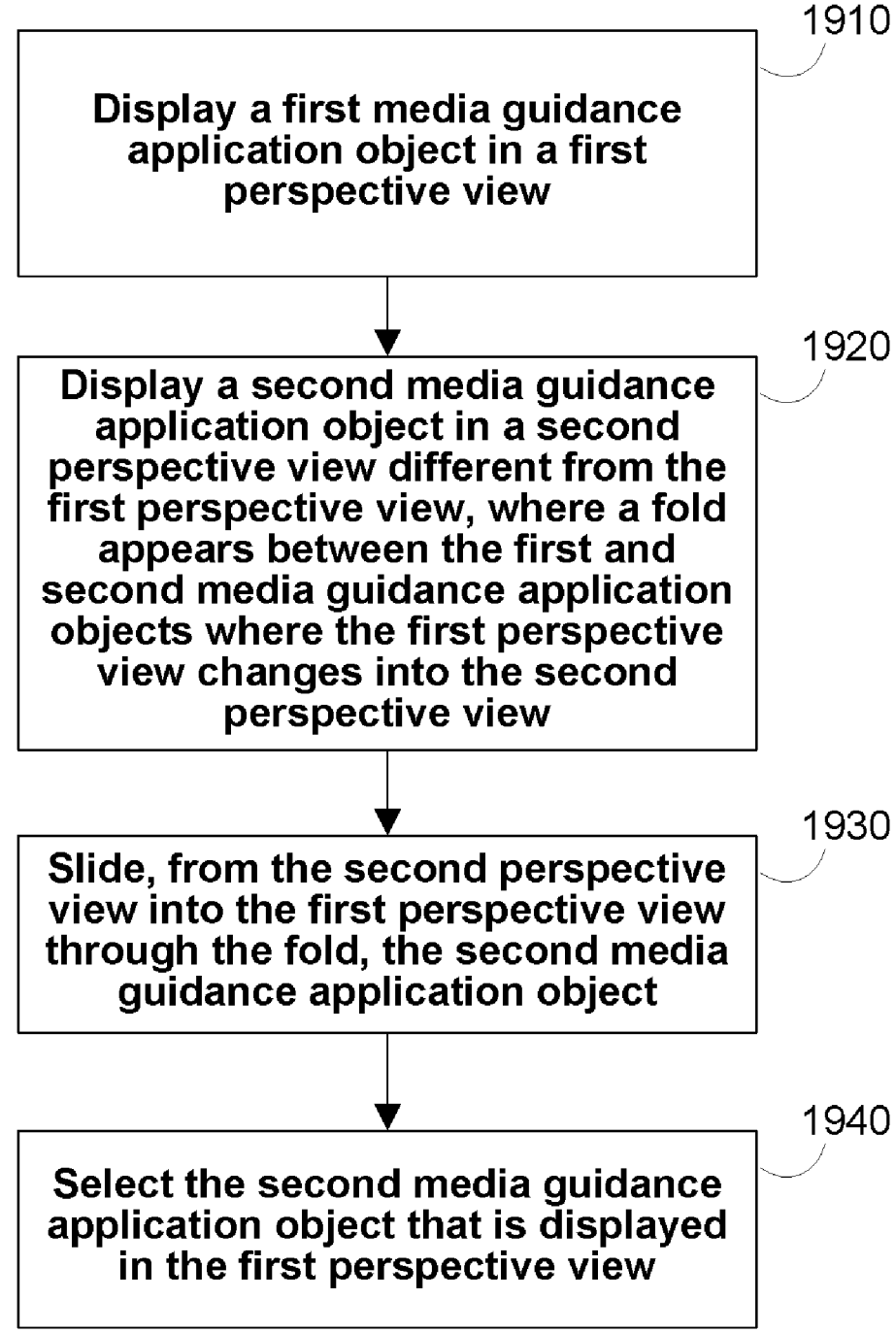
FIGS. 19-27 are illustrative flow diagrams for using a media guidance application with perspective views in accordance with embodiments of the present invention.

FIG. 19 is an illustrative flow diagram 1900 for using a media guidance application with perspective views in accordance with embodiments of the present invention. At step 1910, a first media guidance application object is displayed in a first perspective view. For example, first media asset representation 652 may be displayed in a first perspective view (FIG. 6). Additionally, the media asset representations may be arranged in alphabetical order or some other suitable order such as in order of relevance to the user. In another embodiment, first program listing 912 may be displayed in a first perspective view (FIG. 9). Additionally, the program listings may be placed in an order corresponding to the broadcast time or time interval of the corresponding programs. In some implementations, the first media guidance application object that is displayed in the first perspective view may include all of the displayed program listings that correspond to a particular time interval.

At step 1920, a second media guidance application object is displayed in a second perspective view different from the first perspective view. A fold appears between the first and second media guidance application objects where the first perspective view changes into the second perspective view. For example, second and third media asset representations 654 and 655 may be displayed in a second perspective view (FIG. 6). In another embodiment, second and third program listings 922 and 932 may be displayed in a second perspective view (FIG. 9). In some implementations, the second and third media guidance application objects that are displayed in the second perspective view may include all of the displayed program listings that correspond to a particular time interval that is later in time than the time interval of the program listings that are in focus (i.e., the program listings displayed in the first perspective view).

At step 1930, the second media guidance application object is made to slide from the second perspective view into the first perspective view through the fold. For example, when the user presses a right arrow key, processing circuitry 306 slides media asset representation 654 from the second perspective view into the first perspective view. Media asset representation 652 is removed from the first perspective view and media asset representation 654 becomes in focus. Similarly, in another embodiment, when the user presses a right arrow key, processing circuitry 306 slides program listing 922 from the second perspective view into the first perspective view and updates the time interval displayed in the first perspective view to correspond to the time interval associated with program listing 922. Program listing 912 is removed from the first perspective view and program listing 922 becomes in focus. In some implementations, when the user presses a right arrow key, all of the program listings associated with the next time interval 920 slide into the first perspective view from the second perspective view and all of the program listings associated with the currently viewed time interval 90 are removed from the first perspective view.

At step 1940, the second media guidance application object that is displayed in the first perspective view is selected. For example, second media asset representation 654 or program listing 922 that is now in focus in the first perspective view may be selected. When the media asset representation or program listing is selected the media asset corresponding to the selected media asset representation or program listing may be accessed or played back or the user may be navigated to a detailed description screen 1000 (FIG. 10) corresponding to the media asset.

Figure 20:
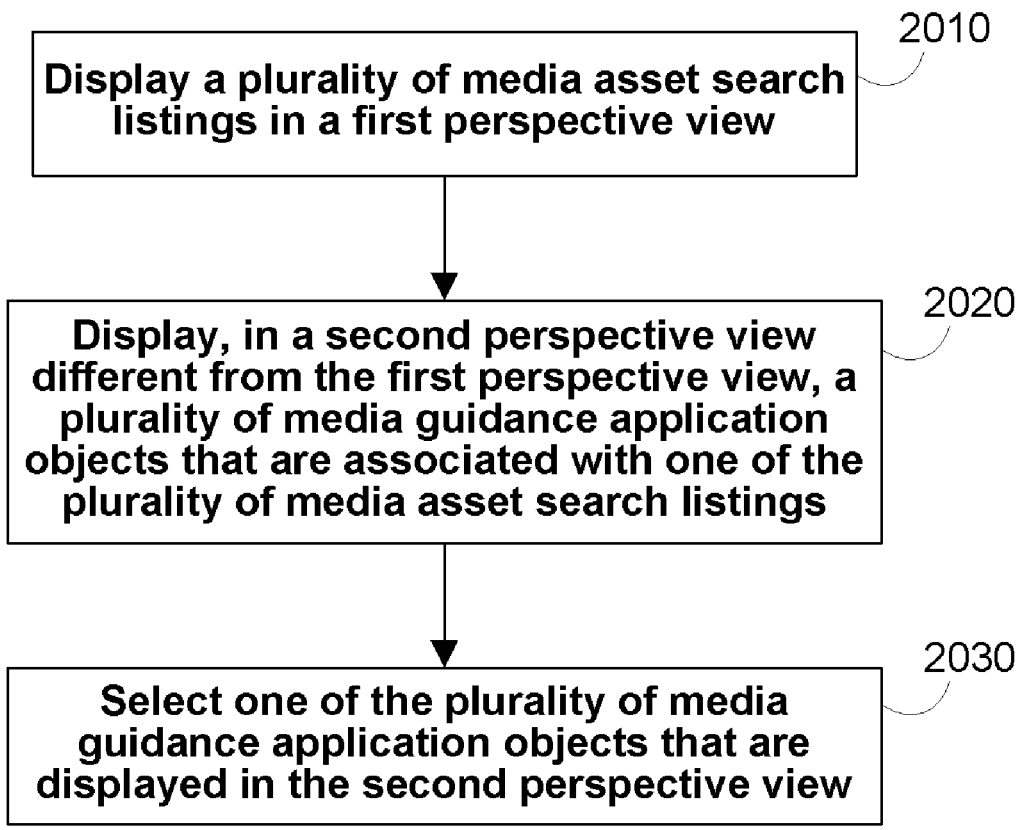

FIG. 20 is an illustrative flow diagram 2000 for using a media guidance application with perspective views in accordance with embodiments of the present invention. At step 2010, a plurality of media asset search listings are displayed in a first perspective view. For example, saved searches region 1310 (FIG. 13) may display a plurality of media asset search listings 1330 that each represent a previously executed search for media assets. Similarly, media asset search results region 1410 (FIG. 14) may display a plurality of media asset search listings 1440 and 1420 that each represent a media asset associated with a search string provided with visual keypad 1340.

At step 2020, a plurality of media guidance application objects that are associated with one of the media asset search listings are displayed in a second perspective view that is different from the first perspective view. For example, media asset results region 1320 may display media asset representations 1322 that each represent media assets that correspond to a search listing that is in focus (FIG. 13). Similarly, related media assets region 1450 may display a row 1430 of media asset representations for each media asset search listing 1440 and 1420 that is displayed in media asset search results region 1410 where each row 1430 include media asset representations of media assets related to the corresponding search listing 1440 and 1420 (FIG. 14).

At step 2030, one of the plurality of media guidance application objects that are displayed in the second perspective view is selected. For example, the user may press a right/left arrow key to bring into focus one of the media asset representations. The media asset representation that is in focus may be selected. When the media asset representation is selected the media asset corresponding to the selected media asset representation may be accessed or played back or the user may be navigated to a detailed description screen 1000 (FIG. 10) corresponding to the media asset.

Figure 21:
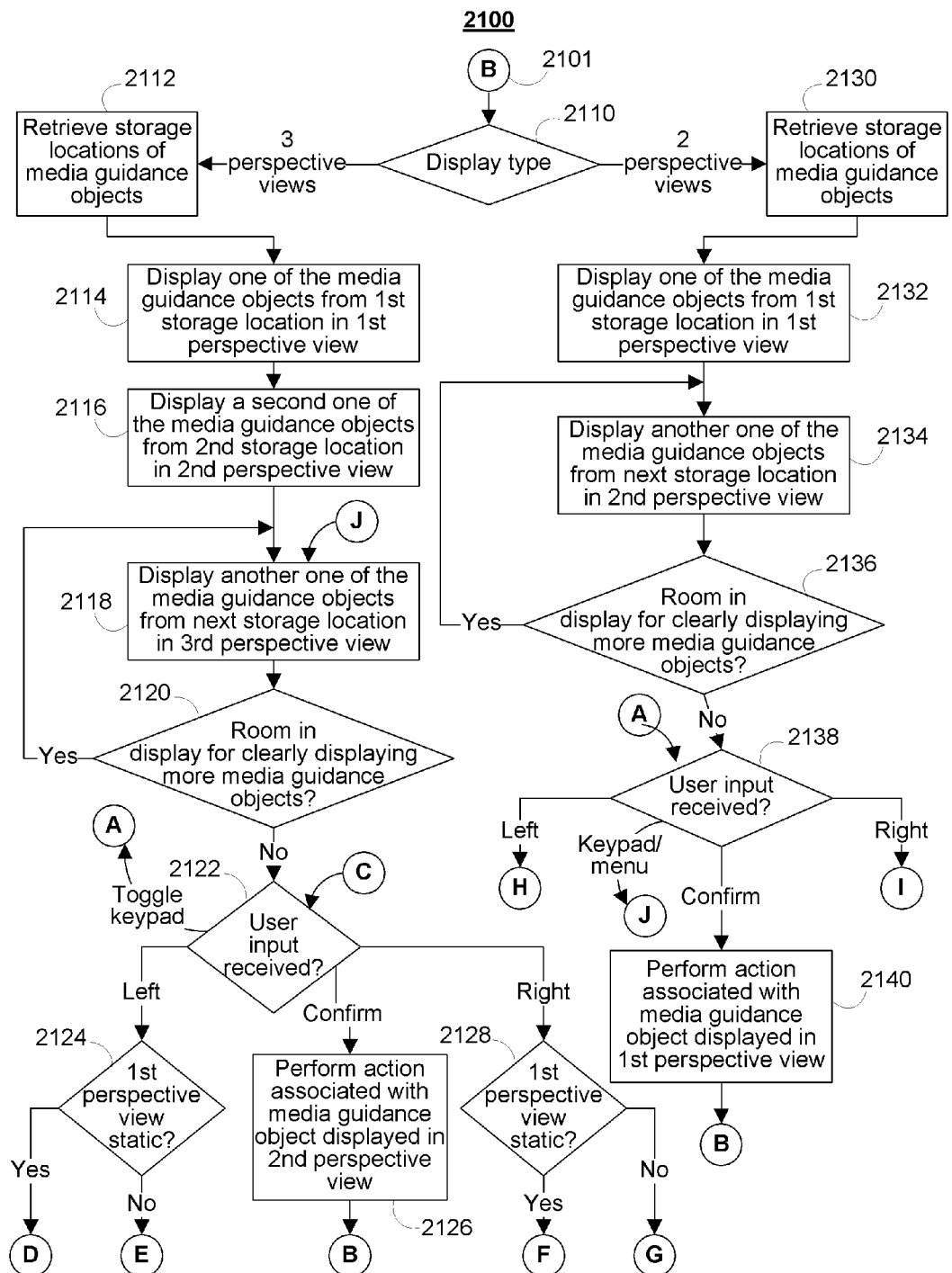

FIG. 21 is an illustrative flow diagram 2100 for generating a display of media guidance objects in perspective views in accordance with embodiments of the present invention. At step 2110, a determination is made as to the number of perspective views that are to be generated for display. When it is determined that two perspective views are needed, the process proceeds to step 2130. When it is determined that three perspective views are needed, the process proceeds to step 2112. For example, processing circuitry 306 may determine that a three perspective view display is necessary when a user needs to login to the system (e.g., FIG. 5b), when a display of program schedule is necessary (e.g., FIG. 9) or when a search function is to be performed (e.g., FIGS. 13 and 14). Processing circuitry 306 may determine that a two perspective view display is necessary when presenting media assets for selection (e.g., previously recoded media assets, email messages, or assets in an online video vendor queue) (FIGS. 6 and 15).

At step 2130, storage locations of media guidance objects are retrieved from memory. For example, media guidance objects such as media asset representations, user profile representations, scheduling information, search functions, photo album and photograph representations may be stored in a memory as a single or double linked list, data structures, databases, or any other type of organizational storage object. Processing circuitry 306 may determine where media guidance objects are stored and generate a pointer to the first of the media guidance objects in the memory. Processing circuitry 306 may retrieve the first two media guidance objects from the memory.

At step 2132, one of the media guidance objects from a first storage location is displayed in a first perspective view. For example, processing circuitry 306 may generate a display that includes media guidance object 510a from the first storage location in a first perspective view (e.g., perspective view 582a (FIG. 5a)). Media guidance objects in the first perspective view may appear flat on the display screen.

At step 2134, another one of the media guidance objects from a next or subsequent storage location is displayed in a second perspective view. For example, processing circuitry 306 may advance by one storage location the pointer past the last storage location from which media objects were retrieved and retrieve from that storage location media guidance object 512a and generate a display that includes media guidance object 512a from the next storage location in a second perspective view (e.g., perspective view 584a (FIG. 5a)). Media guidance objects in the first perspective view may as though they are going into the display screen and gradually decreasing in size.

At step 2136, a determine is made as to whether there is enough room in the display screen for clearly presenting or displaying more media guidance objects. When it is determined that there is available room on the display screen, the process returns to step 2134 to display another media guidance object. When it is determined that there is no available room on the display screen, the process proceeds to step 2138. For example, processing circuitry 306 may determine whether displaying another media guidance object in a particular perspective view may cause the media guidance object to be too distorted (e.g., because the media guidance object would appear too small or too large) such that it cannot be clearly identified. When such a determination is made processing circuitry 306 may determine that there is not enough room to clearly display another media guidance object.

Figure 26:
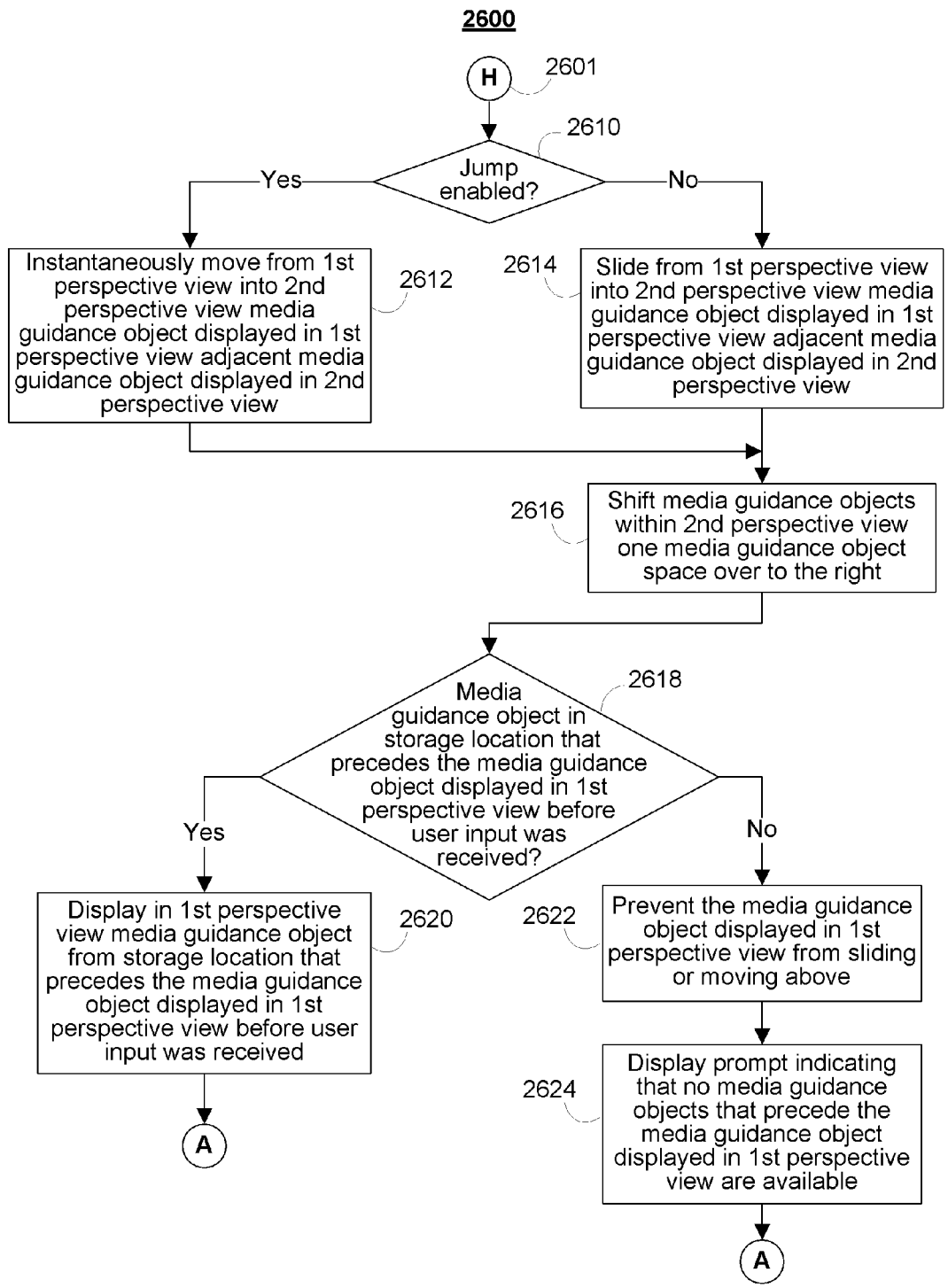
Figure 27:
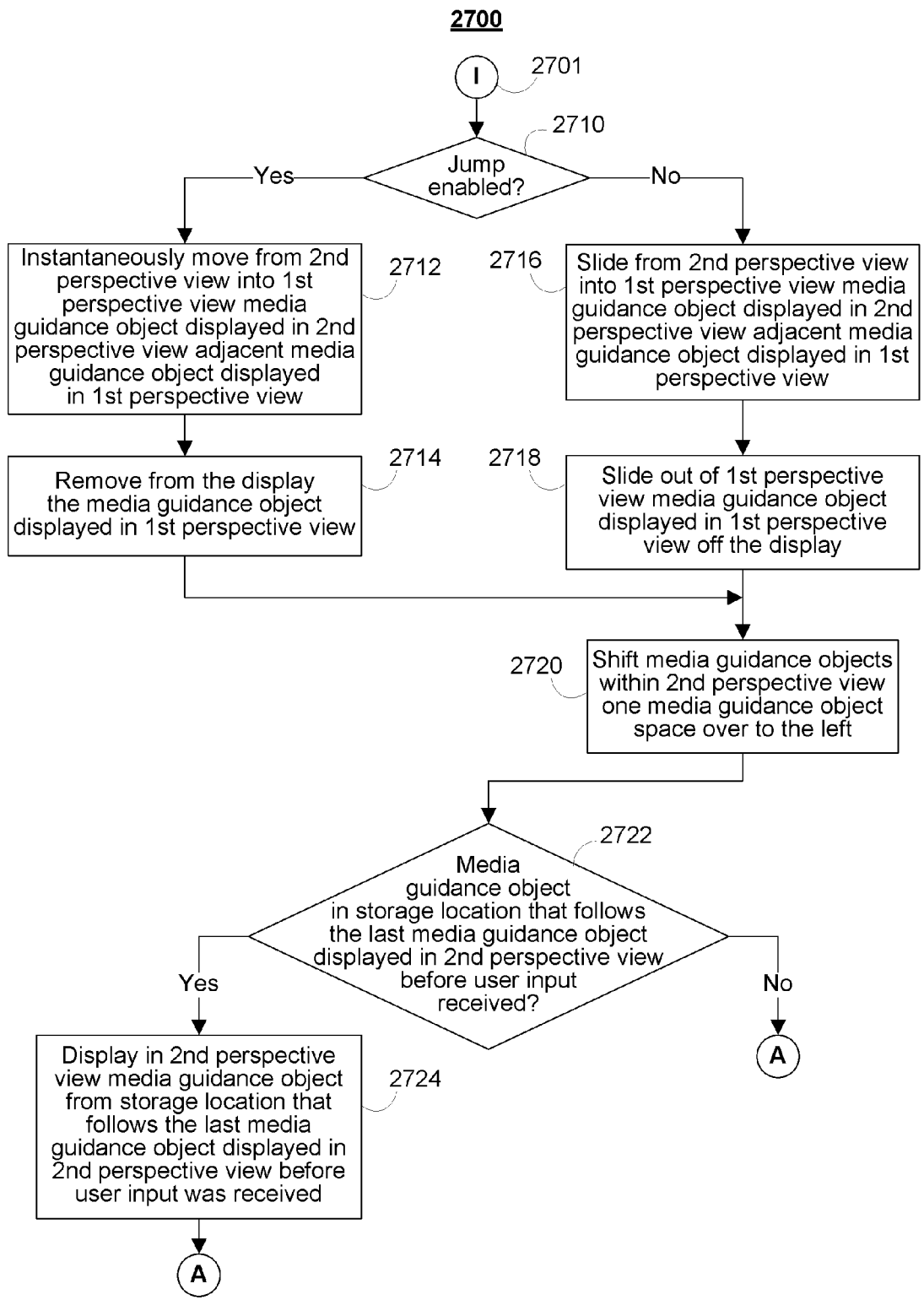

At step 2138, a determination is made as to whether a user input was received. When the received user input is a left command (e.g., a left direction arrow key is pressed), the process proceeds to step 2610 in flow diagram 2600 (FIG. 26). When the received user input is a right command (e.g., a right direction arrow key is pressed), the process proceeds to step 2710 in flow diagram 2700 (FIG. 27). When the received user input is a keypad request or menu command, the process proceeds to step 2118. When the received user input is a confirm command (e.g., an enter key or confirm key is pressed), the process proceeds to step 2140. As discussed, above, the commands may be received through any input means such as a remote controller, voice activation, voice recognition, wireless or wired device, vision analysis (e.g., where the eyes are positioned and looking at), optical scan, infrared devices, one or more laser pointers, or other suitable means.

At step 2140, an action associated with the media guidance object displayed in the first perspective view is performed. For example, when a user profile representation is the media guidance object displayed in the first perspective view, processing circuitry 306 may login a user associated with the particular profile representation as the action that is performed. When a media asset representation is the media guidance object displayed in the first perspective view, processing circuitry 306 may access, order or playback the media asset associated with the media asset representation as the action that is performed. The process then returns to step 2110.

At step 2610, a determination is made as to whether a jump setting is enabled or whether the command issued is a jump command. When it is determined that the jump setting is enabled or jump command is issued, the process proceeds to step 2612, otherwise the process proceeds to step 2614.

At step 2612, the media guidance object displayed in the first perspective view adjacent the media guidance object displayed in the second perspective view is instantaneously moved from the first perspective view into the second perspective view.

At step 2614, the media guidance object displayed in the first perspective view adjacent the media guidance object displayed in the second perspective view is caused to slide from the first perspective view into the second perspective view.

At step 2616, media guidance objects within the second perspective view are shifted over one media guidance object space to the right.

At step 2618, a determination is made as to whether there is a media guidance object in a storage location that precedes the media guidance object displayed in the first perspective view before the user input was received. When it is determined that there is such a media guidance object, the process proceeds to step 2620, otherwise the process proceeds to step 2622.

At step 2620, a media guidance object from the storage location that precedes the media guidance object displayed in the first perspective view before the user input was received is displayed in the first perspective view. The process then returns to step 2138 (FIG. 21).

At step 2622, the media guidance object displayed in the first perspective view is prevented from begin caused to slide or moved in steps 2614 and 2616. In particular, steps 2614 and 2616 may be omitted or the operations associated with them may be undone when no media guidance object is available in a storage location that precedes the media guidance object displayed in the first perspective view before the user input was received.

At step 2624, a prompt indicating that no media guidance objects that precede the media guidance object displayed in the first perspective view are available may be displayed. The process then returns to step 2138 (FIG. 21).

When the received user input at step 2138 is a right command (e.g., a right direction arrow key is pressed), the process proceeds to step 2710 in flow diagram 2700 (FIG. 27). At step 2710, a determination is made as to whether a jump setting is enabled or whether the command issued is a jump command. When it is determined that the jump setting is enabled or jump command is issued, the process proceeds to step 2712, otherwise the process proceeds to step 2716.

At step 2712, the media guidance object displayed in the second perspective view adjacent the media guidance object displayed in the first perspective view is instantaneously moved from the second perspective view into the first perspective view.

At step 2714, the media guidance object in the first perspective view is removed from the display.

At step 2716, the media guidance object displayed in the second perspective view adjacent the media guidance object displayed in the first perspective view is caused to slide from the second perspective view into the first perspective view.

At step 2718, the media guidance object displayed in the first perspective view is caused to slide out of the first perspective view off the display.

At step 2720, media guidance objects displayed within the second perspective view are shifted over one media guidance object space to the left.

At step 2722, a determination is made as to whether there exists a media guidance object in a storage location that follows the storage location of the last media guidance object displayed in the second perspective view before the user input was received.

When it is determined that such a media guidance object exists, the process proceeds to step 2724, otherwise the process returns to step 2138 (FIG. 21).

At step 2724, the media guidance object from the storage location that follows the storage location of the last media guidance object displayed in the second perspective view before the user input was received is displayed in the second perspective view. The process then proceeds to step 2138 (FIG. 21).

Referring back to step 2110 (FIG. 21), when it is determined that three perspective views are needed, the process proceeds to step 2112. At step 2112, storage locations of media guidance objects are retrieved from memory. For example, media guidance objects such as media asset representations, user profile representations, scheduling information, search functions, photo album and photograph representations may be stored in a memory as a single or double linked list, data structures, databases, or any other type of organizational storage object. Processing circuitry 306 may determine where media guidance objects are stored and generate a pointer to the first of the media guidance objects in the memory. Processing circuitry 306 may retrieve the first three media guidance objects from the memory.

At step 2114, one of the media guidance objects from a first storage location is displayed in a first perspective view. For example, processing circuitry 306 may generate a display that includes media guidance object 514*a* from the first storage location in a first perspective view 580*a* (FIG. 5*a*).

At step 2116, a second one of the media guidance objects from a second storage location is displayed in a second perspective view. For example, processing circuitry 306 may generate a display that includes media guidance object 510*a* from the first storage location in a second perspective view 582*a* (FIG. 5*a*).

At step 2118, another one of the media guidance objects from a next or subsequent storage location is displayed in a third perspective view. For example, processing circuitry 306 may advance by one storage location the pointer past the last storage location from which media objects were retrieved and retrieve from that storage location media guidance object 512*a* and generate a display that includes media guidance object 512*a* from the next storage location in a third perspective view 584*a* (FIG. 5*a*).

At step 2120, a determine is made as to whether there is enough room in the display screen for clearly presenting or displaying more media guidance objects. When it is determined that there is available room on the display screen, the process returns to step 2118 to display another media guidance object. When it is determined that there is no available room on the display screen, the process proceeds to step 2122. For example, processing circuitry 306 may determine whether displaying another media guidance object in a particular perspective view may cause the media guidance object to be too distorted (e.g., because the media guidance object would appear too small or too large) such that it cannot be clearly identified. When such a determination is made processing circuitry 306 may determine that there is not enough room to clearly display another media guidance object.

At step 2122, a determination is made as to whether a user input was received. When the received user input is a left command (e.g., a left direction arrow key is pressed), the process proceeds to step 2124. When the received user input is a right command (e.g., a right direction arrow key is pressed), the process proceeds to step 2128. When the received user input is a toggle keypad view command, the process modifies the display to a two perspective display type by removing media guidance objects from the first perspective view and proceeds to step 2138. When the received user input is a confirm command (e.g., an enter key or confirm key is pressed), the process proceeds to step 2126. As discussed, above, the commands may be received through any input means such as a remote controller, voice activation, voice recognition, wireless or wired device, vision analysis (e.g., where the eyes are positioned and looking at), optical scan, infrared devices, one or more laser pointers, or other suitable means.

At step 2126, an action associated with the media guidance object displayed in the second perspective view is performed. For example, when a user profile representation is the media guidance object displayed in the second perspective view, processing circuitry 306 may login a user associated with the particular profile representation as the action that is performed. When a media asset representation is the media guidance object displayed in the second perspective view, processing circuitry 306 may access, order or playback the media asset associated with the media asset representation as the action that is performed. When a search listing is the media guidance object displayed in the second perspective view, processing circuitry 306 may retrieve search results associated with the search listing as the action that is performed. The process then returns to step 2101.

Figure 22:
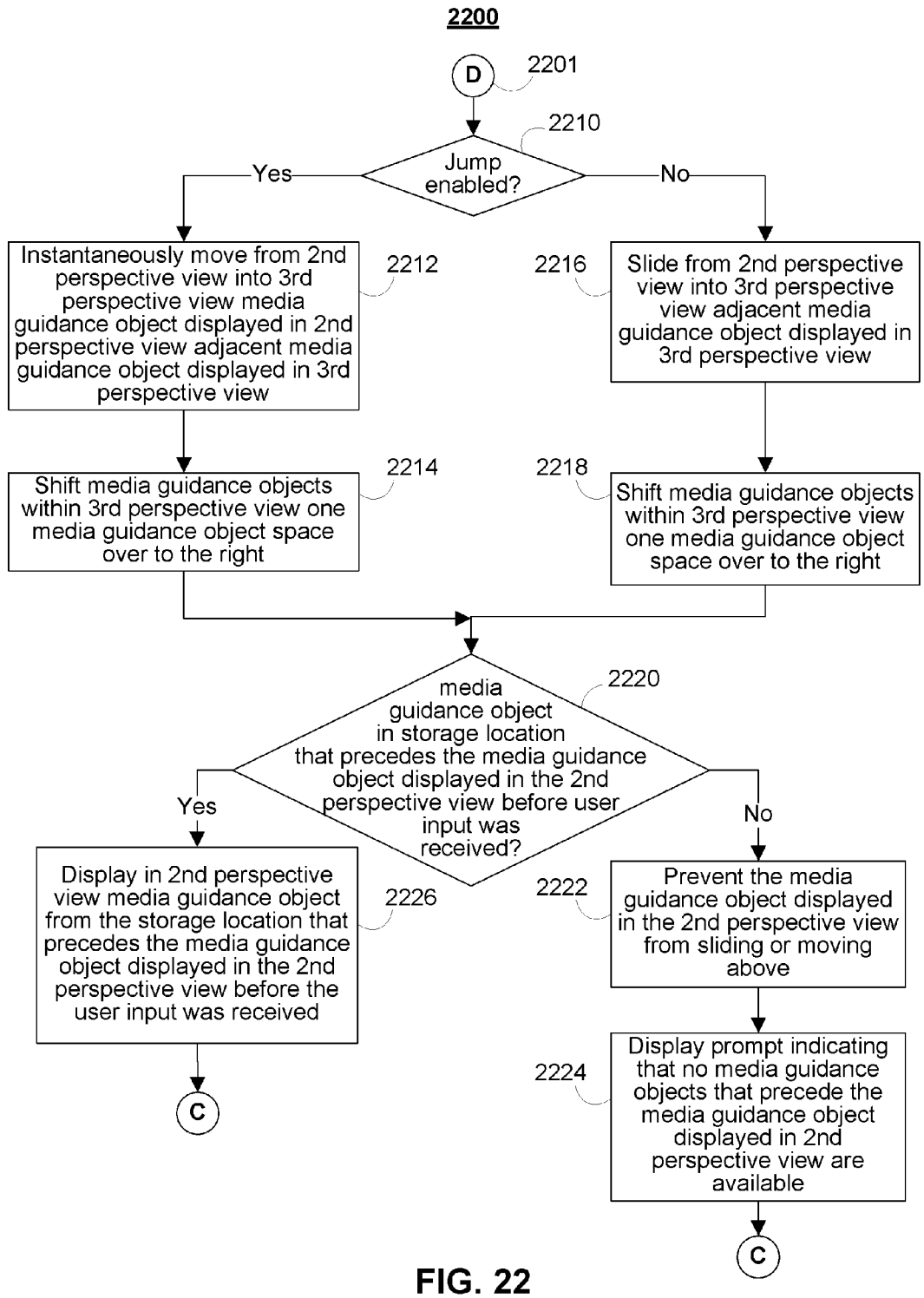
Figure 23:
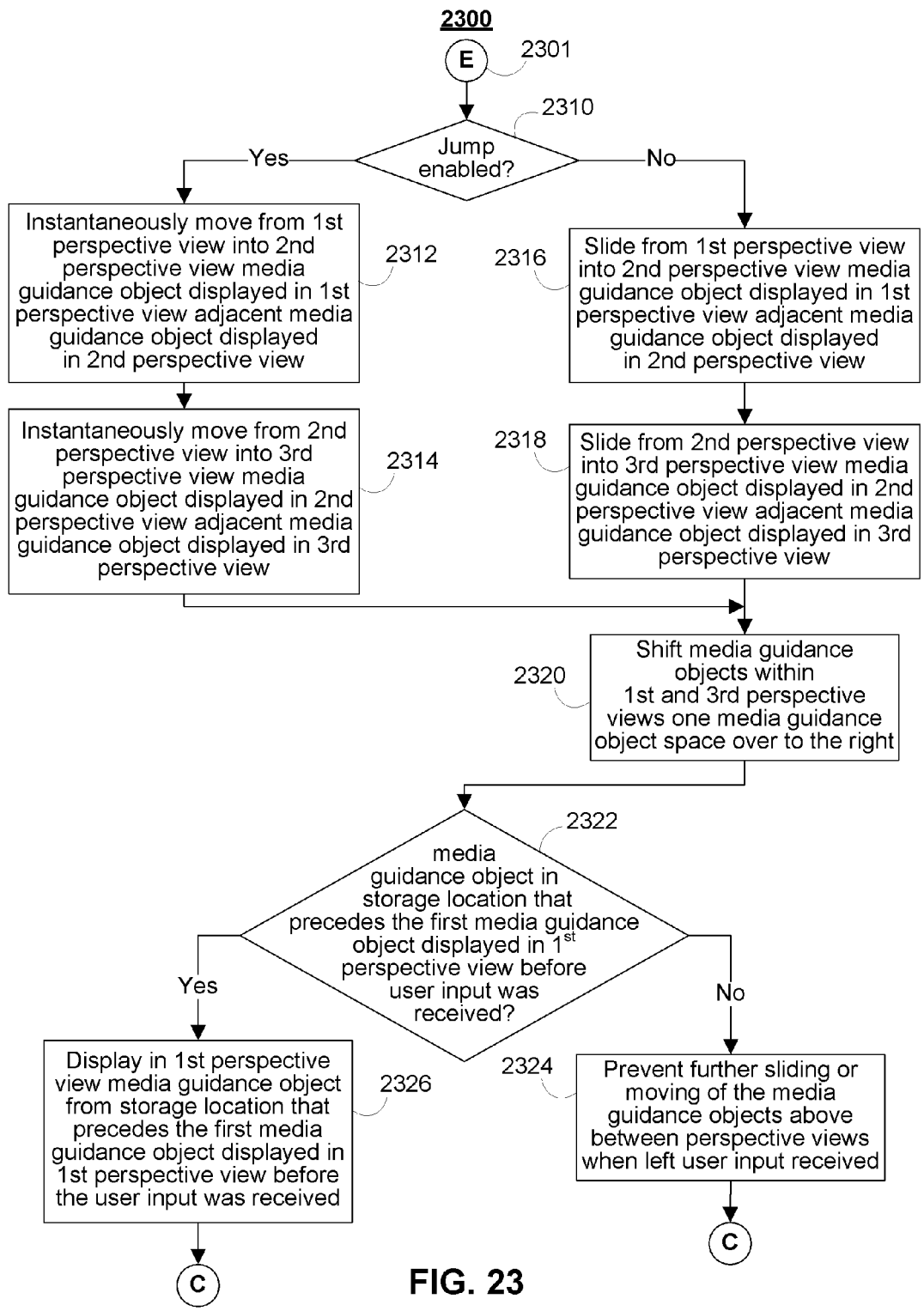

At step 2124, a determination is made as to whether the first perspective view is static. When it is determined that the first perspective view is static, the process proceeds to step 2210 of flow diagram 2200 (FIG. 22), otherwise the process proceeds to step 2310 of flow diagram 2300 (FIG. 23). Processing circuitry 306 may determine that the first perspective view is static when, for example, a visual keypad (FIG. 13), album identifiers or playlist identifiers (FIG. 16), or source identifiers (FIG. 9) are the media guidance objects displayed in the first perspective view. In particular, processing circuitry 306 may determine that the first perspective view is static when, for example, media guidance objects displayed in the first perspective view relate to, correspond to, or otherwise identify media guidance objects displayed in other perspective views and as such media guidance objects displayed in the first perspective view may preferably not be moved or changed when the user navigates between the media guidance objects displayed in the other perspective views.

At step 2210, a determination is made as to whether a jump setting is enabled or whether the command issued is a jump command. For example, the system may be configured to with jump or slide settings. As a default, the system may be configured to have jump disabled but the user may change this setting. In some implementations, even though the jump setting may be enabled, the user may issue a slide command (e.g., using a suitable key on the remote control or verbal command) and processing circuitry may execute process 2200 as if the jump were disabled. When it is determined that the jump setting is enabled or jump command is issued, the process proceeds to step 2212, otherwise the process proceeds to step 2216.

At step 2212, the media guidance object displayed in the second perspective view adjacent the media guidance object displayed in the third perspective view is instantaneously moved from the second perspective view into the third perspective view. For example, media guidance object 510*a* displayed in second perspective view 582*a* may instantaneously be moved into and in place of media guidance object 512*a* displayed in third perspective view 584*a*. Alternatively, at step 2216, media guidance object 510*a* displayed in second perspective view 582*a* may be caused to slide over time into and in place of media guidance object 512*a* displayed in third perspective view 584*a* as shown in the opposite direction of FIGS. 5*b* and 5*c*.

At step 2214, the media guidance objects within the third perspective view are shifted one media guidance object space over to the right. For example, shifting the media guidance objects over by one media guidance object space may make enough room to display clearly the media guidance object that is moved into the third perspective view. Some media guidance objects that are moved to make room may become unclearly displayed and distorted because of their size and orientation and accordingly may be omitted from the display. The media guidance object space is the amount of space (e.g., length or width) a media guidance object takes up in the display. Shifting the media guidance objects over by one space means that each media guidance object is displayed in a position of the immediately adjacent media guidance object to the right or media guidance object that is next to or to the right of a given media guidance object.

At step 2216, the media guidance object displayed in the second perspective view adjacent the media guidance object displayed in the third perspective view is caused to slide from the second perspective view into the third perspective view.

At step 2218, the media guidance objects within the third perspective view are shifted one media guidance object space over to the right.

At step 2220, a determination is made as to whether there exists a media guidance object in a storage location that precedes the storage location of the media guidance object displayed in the second perspective view before the user input was received. When it is determined that such a media guidance object exists, the process proceeds to step 2226, otherwise the process returns to step 2222.

At step 2226, the media guidance object from the storage location that precedes the storage location of the media guidance object displayed in the second perspective view before the user input was received is displayed in the second perspective view. The process then returns to step 2122 (FIG. 21).

At step 2222, the media guidance object displayed in the second perspective view is prevented from being caused to slide or moved in steps 2212 and 2216. In particular, steps 2212 and 2216 may be omitted or the operations associated with them may be undone when no media guidance object is available in a storage location that precedes the media guidance object displayed in the second perspective view before the user input was received.

At step 2224, a prompt indicating that no media guidance objects that precede the media guidance object displayed in the second perspective view are available may be displayed. The process then returns to step 2122 (FIG. 21).

Referring back to step 2124, when it is determined that the first perspective view is not static, the process proceeds to step 2310 (FIG. 23). At step 2310, a determination is made as to whether a jump setting is enabled or whether the command issued is a jump command. When it is determined that the jump setting is enabled or jump command is issued, the process proceeds to step 2312, otherwise the process proceeds to step 2316.

At step 2312, the media guidance object displayed in the first perspective view adjacent the media guidance object displayed in the second perspective view is instantaneously moved from the first perspective view into the second perspective view. For example, media guidance object 514*a* displayed in first perspective view 580*a* adjacent media guidance object 510*a* may instantaneously be moved into and in place of media guidance object 510*a* displayed in second perspective view 582*a*. Alternatively, at step 2316, media guidance object 514*a* displayed in first perspective view 580*a* adjacent media guidance object 510*a* may be caused to slide over time into and in place of media guidance object 510*a* displayed in second perspective view 582*a* as shown in the opposite direction of FIGS. 5*b* and 5*c*.

At step 2314, the media guidance object displayed in the second perspective view adjacent the media guidance object displayed in the third perspective view is instantaneously moved from the second perspective view into the third perspective view. For example, media guidance object 510*a* displayed in second perspective view 582*a* adjacent media guidance object 512*a* may instantaneously be moved into and in place of media guidance object 512*a* displayed in third perspective view 584*a*. Alternatively, at step 2318, media guidance object 510*a* displayed in second perspective view 580*a* adjacent media guidance object 512*a* may be caused to slide over time into and in place of media guidance object 512*a* displayed in third perspective view 584*a* as shown in the opposite direction of FIGS. 5*b* and 5*c*.

At step 2316, the media guidance object displayed in the first perspective view adjacent the media guidance object displayed in the second perspective view is caused to slide from the first perspective view into the second perspective view.

At step 2318, the media guidance object displayed in the second perspective view adjacent the media guidance object displayed in the third perspective view is caused to slide from the second perspective view into the third perspective view.

At step 2320, the media guidance objects within the first and third perspective views are shifted over by one media guidance space to the right. For example, shifting the media guidance objects over by one media guidance object space may make enough room to display clearly the media guidance object that is moved into the first or third perspective view. Some media guidance objects that are moved to make room may become unclearly displayed and distorted because of their size and orientation and accordingly may be omitted from the display. The media guidance object space is the amount of space (e.g., length or width) a media guidance object takes up in the display. Shifting the media guidance objects over by one space means that each media guidance object is displayed in a position of the immediately adjacent media guidance object to the right or media guidance object that is next to or to the right of a given media guidance object. Shifting media guidance objects over is done within a particular perspective such that the media guidance objects within the perspective are moved to new positions in the perspective view without being displayed or moved to a different perspective view.

At step 2322, a determination is made as to whether there exists a media guidance object in a storage location that precedes the storage location of the first media guidance object displayed in the first perspective view before the user input was received. When it is determined that such a media guidance object exists, the process proceeds to step 2326, otherwise the process returns to step 2324.

At step 2326, the media guidance object from the storage location that precedes the storage location of the first media guidance object displayed in the first perspective view before the user input was received is displayed in the first perspective view. The process then returns to step 2122 (FIG. 21).

At step 2324, the media guidance objects displayed in the first, second and third perspective views are prevented from being caused to slide or moved in steps 2312, 2314, 2316, 2318 and 2320. In particular, steps 2312, 2314, 2316, 2318 and 2320 may be omitted or the operations associated with them may be undone when no media guidance object is available in a storage location that precedes the first media guidance object displayed in the first perspective view before the user input was received. The process then returns to step 2122 (FIG. 21).

Figure 24:
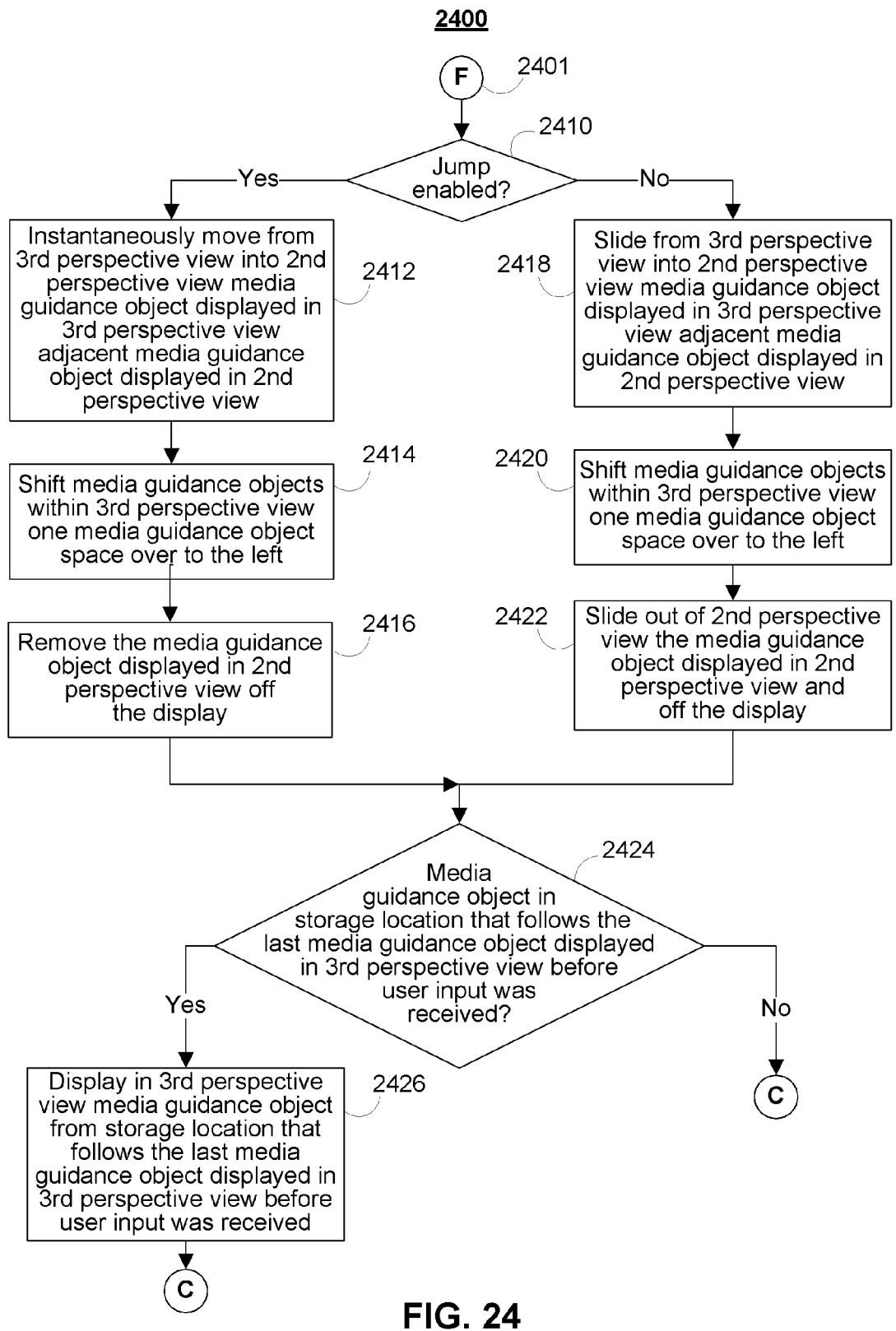
Figure 25:
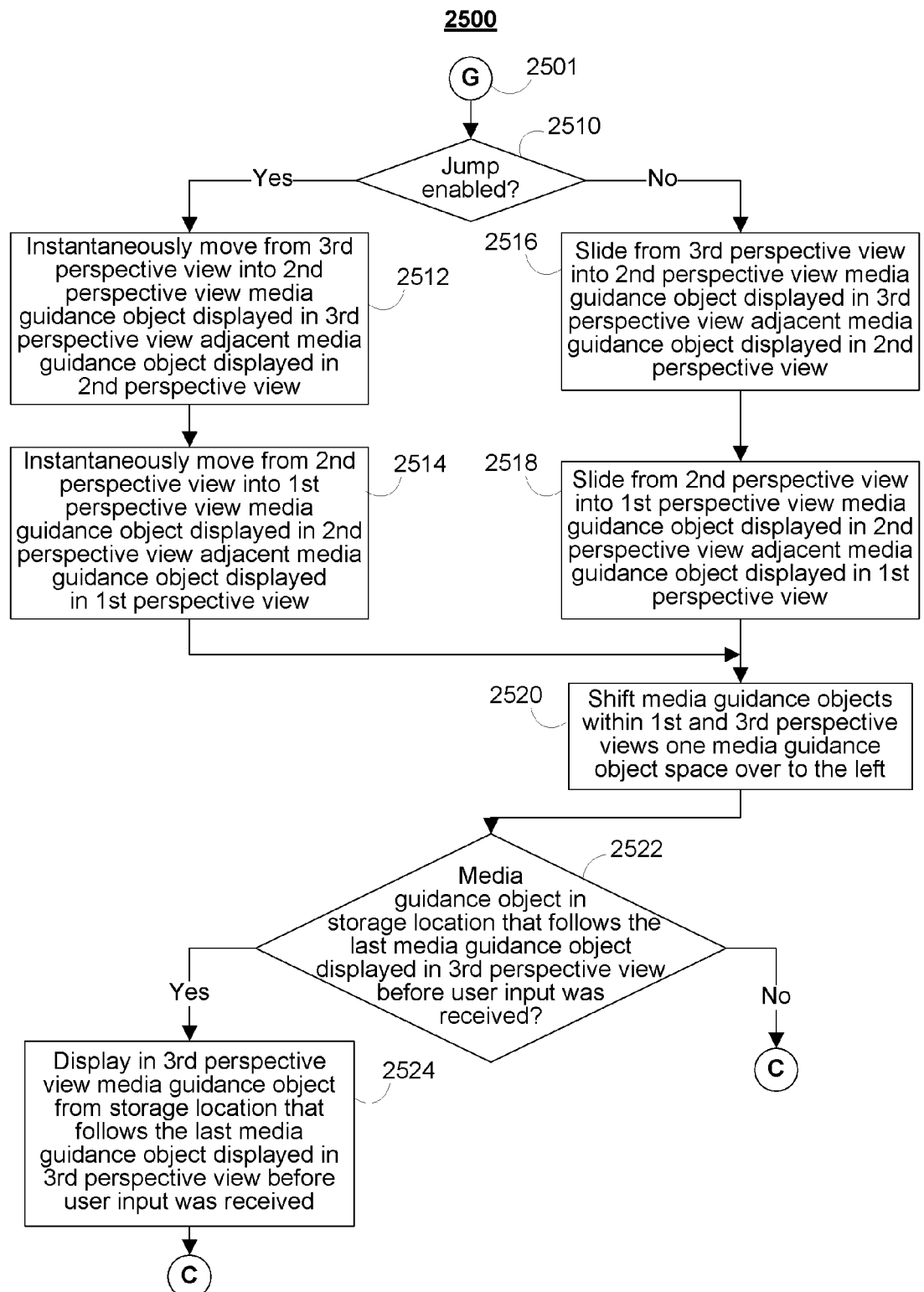

Referring back to step 2122 (FIG. 21), when it is determined that the user input is a right command, at step 2128, a determination is made as to whether the first perspective view is static. When it is determined that the first perspective view is static, the process proceeds to step 2410 of flow diagram 2400 (FIG. 24), otherwise the process proceeds to step 2510 of flow diagram 2500 (FIG. 25). Processing circuitry 306 may determine that the first perspective view is static when, for example, a visual keypad (FIG. 13), album identifiers or playlist identifiers (FIG. 16), or source identifiers (FIG. 9) are the media guidance objects displayed in the first perspective view. In particular, processing circuitry 306 may determine that the first perspective view is static when, for example, media guidance objects displayed in the first perspective view relate to, correspond to, or otherwise identify media guidance objects displayed in other perspective views and as such media guidance objects displayed in the first perspective view may preferably not be moved or changed when the user navigates between the media guidance objects displayed in the other perspective views.

At step 2410, a determination is made as to whether a jump setting is enabled or whether the command issued is a jump command. When it is determined that the jump setting is enabled or jump command is issued, the process proceeds to step 2412, otherwise the process proceeds to step 2418.

At step 2412, the media guidance object displayed in the third perspective view adjacent the media guidance object displayed in the second perspective view is instantaneously moved from the third perspective view into the second perspective view.

At step 2414, media guidance objects within the third perspective view are shifted one media guidance object space over to the left. For example, shifting the media guidance objects over by one media guidance object space may make enough room to display clearly the media guidance object that is moved into the third perspective view. Some media guidance objects that are moved to make room may become unclearly displayed and distorted because of their size and orientation and accordingly may be omitted from the display. The media guidance object space is the amount of space (e.g., length or width) a media guidance object takes up in the display. Shifting the media guidance objects over by one space means that each media guidance object is displayed in a position of the immediately adjacent media guidance object to the left or media guidance object that is next to or to the left of a given media guidance object. As discussed above and below, shifting media guidance objects over is done within a particular perspective such that the media guidance objects within the perspective are moved to new positions in the perspective view without being displayed or moved to a different perspective view.

At step 2416, the media guidance object displayed in the second perspective view is removed from the display.

At step 2418, the media guidance object displayed in the third perspective view adjacent the media guidance object displayed in the second perspective view is caused to slide from the third perspective view into the second perspective view.

At step 2420, media guidance objects within the third perspective view are shifted one media guidance object space over to the left.

At step 2422, the media guidance object displayed in the second perspective view is caused to slide out of the second perspective view and off of the display.

At step 2424, a determination is made as to whether there exists a media guidance object in a storage location that follows the storage location of the last media guidance object displayed in the third perspective view before the user input was received. When it is determined that such a media guidance object exists, the process proceeds to step 2426, otherwise the process returns to step 2122 (FIG. 21).

At step 2426, the media guidance object from the storage location that follows the storage location of the last media guidance object displayed in the third perspective view before the user input was received is displayed in the third perspective view. The process then proceeds to step 2122 (FIG. 21).

Referring back to step 2428, when it is determined that the first perspective view is not static, the process proceeds to step 2510 (FIG. 25). At step 2510, a determination is made as to whether a jump setting is enabled or whether the command issued is a jump command. When it is determined that the jump setting is enabled or jump command is issued, the process proceeds to step 2512, otherwise the process proceeds to step 2516.

At step 2512, the media guidance object displayed in the third perspective view adjacent the media guidance object displayed in the second perspective view is instantaneously moved from the third perspective view into the second perspective view.

At step 2514, the media guidance object displayed in the second perspective view adjacent the media guidance object displayed in the first perspective view is instantaneously moved from the second perspective view into the first perspective view.

At step 2516, the media guidance object displayed in the third perspective view adjacent the media guidance object displayed in the second perspective view is caused to slide from the third perspective view into the second perspective view.

At step 2518, the media guidance object displayed in the second perspective view adjacent the media guidance object displayed in the first perspective view is caused to slide from the second perspective view into the first perspective view.

At step 2520, the media guidance objects within the first and third perspective views are shifted one media guidance object space over to the left. For example, shifting the media guidance objects over by one media guidance object space may make enough room to display clearly the media guidance object that is moved into the first or third perspective view. Some media guidance objects that are moved to make room may become unclearly displayed and distorted because of their size and orientation and accordingly may be omitted from the display. The media guidance object space is the amount of space (e.g., length or width) a media guidance object takes up in the display. Shifting the media guidance objects over by one space means that each media guidance object is displayed in a position of the immediately adjacent media guidance object to the left or media guidance object that is next to or to the left of a given media guidance object.

At step 2522, a determination is made as to whether there exists a media guidance object in a storage location that follows the storage location of the last media guidance object displayed in the third perspective view before the user input was received. When it is determined that such a media guidance object exists, the process proceeds to step 2524, otherwise the process returns to step 2122 (FIG. 21).

At step 2524, the media guidance object from the storage location that follows the storage location of the last media guidance object displayed in the third perspective view before the user input was received is displayed in the third perspective view. The process then proceeds to step 2122 (FIG. 21).

It should be understood, that the above steps of the flow diagrams of FIGS. 19-27 may be executed or performed in any order or sequence no limited to the order and sequence shown and described in the figures. Also, some of the above steps of the flow diagrams of FIGS. 19-27 may be executed or performed substantially simultaneously where appropriate or in parallel to reduce latency and processing times.

The above described embodiments of the present invention are presented for purposes of illustration and not of limitation, and the present invention is limited only by the claims which follow.

What is claimed is:

1. A method for navigating about an interactive media guidance application, the method comprising:

displaying, on a screen having a surface normal, a row of media guidance objects in which a first of the media guidance objects is positioned between second and third of the media guidance objects, wherein each of the media guidance objects corresponds to a live video feed, a recorded video feed, or a program listing arranged sequentially according to predetermined criteria, wherein the program listing includes an image representation of associated program video, and wherein the predetermined criteria is at least one of time, the alphabet, channel, source, genre, relevance, and category;

rotating, in a clockwise direction towards the surface normal, a first portion of the row that includes the second media guidance object while a second portion of the row that includes the first media guidance object remains stationary, wherein a first crease appears between the first and second portions of the row as a result of rotating the first portion of the row;

rotating, in a clockwise direction towards the surface normal, a third portion of the row that includes the third media guidance object while the second portion of the row remains stationary, wherein a second crease appears between the third and second portions of the row as a result of rotating the third portion of the row;

sliding the second media guidance object through the first crease from the first portion of the row into the second portion of the row; and selecting the second media guidance application object that is displayed in the second portion of the row.

2. The method of claim 1 wherein the first portion is rotated to an angle having a value greater than zero degrees but less than ninety degrees relative to a line that is perpendicular to the surface normal and wherein the third portion is rotated to an angle having a value greater than 180 degrees but less than 270 degrees relative to the line.

3. The method of claim 1 wherein:

the second media guidance object in the first portion of the row appears to be going into the screen;

the first media guidance object in the second portion of the row appears to be flat on the screen; and the third media guidance object in the third portion of the row appears to be coming out of the screen.

4. The method of claim 1, further comprising:

sliding the first media guidance object through the second crease from the second portion of the row into the third portion of the row.

5. The method of claim 1, wherein a first crease appears between the first and second portions of the row as a result of rotating the second portion of the row, further comprising:

moving instantaneously the second media guidance object from the first portion of the row into the second portion of the row; and selecting the second media guidance application object that is displayed in the second portion of the row.

6. A system for navigating about an interactive media guidance application, the system comprising:

a display screen having a surface normal; and processing circuitry configured to:

display on the display screen a row of media guidance objects in which a first of the media guidance objects is positioned between second and third of the media guidance objects, wherein each of the media guidance objects corresponds to a live video feed, a recorded video feed, or a program listing arranged sequentially according to predetermined criteria, wherein the program listing includes an image representation of associated program video, and wherein the predetermined criteria is at least one of time, the alphabet, channel, source, genre, relevance, and category;

rotate, in a clockwise direction towards the surface normal, a first portion of the row that includes the second media guidance object while a second portion of the row that includes the first media guidance object remains stationary, wherein a first crease appears between the first and second portions of the row as a result of rotating the first portion of the row;

rotate, in a clockwise direction towards the surface normal, a third portion of the row that includes the third media guidance object while the second portion of the row remains stationary, wherein a second crease appears between the third and second portions of the row as a result of rotating the third portion of the row;

slide the second media guidance object through the first crease from the first portion of the row into the second portion of the row; and select the second media guidance application object that is displayed in the second portion of the row.

7. The system of claim 6 wherein the first portion is rotated to an angle having a value greater than zero degrees but less than ninety degrees relative to a line that is perpendicular to the surface normal and wherein the third portion is rotated to an angle having a value greater than 180 degrees but less than 270 degrees relative to the line.

8. The system of claim 6 wherein:
the second media guidance object in the first portion of the row appears to be going into the screen;
the first media guidance object in the second portion of the row appears to be flat on the screen; and
the third media guidance object in the third portion of the row appears to be coming out of the screen.

9. The method of claim 6, wherein the processing circuitry is further configured to:
slide the first media guidance object through the second crease from the second portion of the row into the third portion of the row.

10. The system of claim 6, wherein a first crease appears between the first and second portions of the row as a result of rotating the second portion of the row, wherein the processing circuitry is further configured to:
move instantaneously the second media guidance object from the first portion of the row into the second portion of the row; and
select the second media guidance application object that is displayed in the second portion of the row.

* * * * *